United States Patent [19]
Maughan et al.

[11] Patent Number: 5,140,329
[45] Date of Patent: Aug. 18, 1992

[54] TRAJECTORY ANALYSIS RADAR SYSTEM FOR ARTILLERY PIECE

[75] Inventors: Jeffrey D. Maughan, Los Angeles; Yair Alon, Agoura; Bao Nguyen, Santa Monica; Dominique Armal, Los Angeles, all of Calif.

[73] Assignee: Lear Astronics Corporation, Santa Monica, Calif.

[21] Appl. No.: 690,719

[22] Filed: Apr. 24, 1991

[51] Int. Cl.⁵ .............................................. G01S 13/00
[52] U.S. Cl. ...................................................... 342/67
[58] Field of Search ............ 364/423; 89/41.03, 41.07; 235/417; 342/67

[56] References Cited

U.S. PATENT DOCUMENTS

| | | | |
|---|---|---|---|
| 3,182,319 | 4/1963 | Brown et al. | 342/67 |
| 3,265,866 | 8/1966 | Teiling | 364/423 X |
| 3,604,912 | 9/1971 | Frohock, Jr. | 235/417 |
| 3,758,052 | 9/1973 | McAlexander et al. | 342/67 |
| 3,918,061 | 11/1975 | Elgaard . | |
| 4,547,949 | 10/1985 | Heller et al. . | |
| 4,679,748 | 7/1987 | Blomqvist et al. . | |
| 4,837,718 | 6/1989 | Alon . | |
| 4,922,802 | 5/1990 | Gropp | 89/41.07 |

Primary Examiner—Mark Hellner
Attorney, Agent, or Firm—Pretty, Schroeder, Brueggemann & Clark

[57] ABSTRACT

A low cost easily deployed, yet highly accurate weapon mounted trajectory analysis radar system uses optimized Doppler radar signals to detect the actual trajectory of a projectile fired from an artillery piece such as a 155 mm Howitzer. The actual trajectory data is used to determine an atmospheric model that may be used to aim the weapon for future firings. The system includes a Doppler radar system having a turret mounted antenna that tracks the projectile, a digital signal processor using a FFT to convert radar pulses to trajectory data and a data processing system that analyzes the trajectory data to develop a true atmospheric model.

16 Claims, 4 Drawing Sheets

TRAJECTORY ANALYSIS RADAR SYSTEM FOR ARTILLERY PIECE

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

As weapons systems have developed, there have been substantial increases in both range and accuracy. However, systems that provide the greatest accuracy are extremely expensive, cumbersome to deploy and subject to failure because of their complexity. A need thus arises for a comparatively inexpensive weapons system that is reliable and accurate, yet lightweight and easy to use and deploy.

The trajectory of motion and hence the impact point of a nonguided projectile fired from an artillery piece such as a 155 mm Howitzer is determined by a relatively small number of parameters that are fairly well understood. These include the projectile shape, gun barrel characteristics, initial velocity of the projectile and atmospheric conditions. Typically all of these parameters will vary slowly over time, but if they can be determined accurately from one firing they will remain reasonably stable for a second firing shortly thereafter.

For example, the gun barrel typically contains helical grooves or rifling that causes the projectile to spin and attain greater stability and predictability as it exits that gun barrel. As the grooves wear, the impact on the projectile will change and the flight characteristics will gradually change with time.

Similarly, the exact initial muzzle velocity will change gradually with barrel characteristics, with temperature and with the powder charge that is used. The powder charge will be quite consistent within a manufacturing batch so that the initial muzzle velocities for two consecutive firings will be nearly the same. Atmospheric conditions including air density and wind velocity at different altitudes will tend to vary more rapidly than some of the other parameters. However, even atmospheric conditions will usually remain reasonably stable for many minutes at a time.

Radar systems have been developed to improve the accuracy of projectile firings. These systems tend to follow one of two configurations. One is a muzzle velocity radar system (MVR) that accurately determines the initial muzzle velocity. The other is a trajectory measurement radar system that tracks the trajectory of the projectile from firing to impact.

The muzzle velocity radar system is compact, lightweight and relatively inexpensive. However, it only provides accurate information as to one of the many parameters that determine the final impact point, namely initial muzzle velocity. This information significantly improves the accuracy of a firing, but leaves many important parameters to be approximated by other means. Examples of this type of system can be found in U.S. Pat. No. 4,837,718 to Alon and U.S. Pat. 3,918,061 to Elgaard.

The trajectory measurement radar systems use tracking radar systems with multiple sensor points located some distance from a weapon. These systems are large, complex and difficult to properly deploy, especially under battle conditions where time may be critical. Because of the complexity of these systems and the distances over which they must be deployed, their reliability is questionable. The high power radar signals that track the small projectiles from a substantial distance are subject to detection and tracking by enemy forces. However, because these systems track the complete trajectory of a projectile, they can be used to compile extremely accurate estimations of all of the parameters that affect the accuracy and final impact point of a projectile fired from a gun.

U.S. Pat. No. 4,679,748 to Blomqvist et al. discloses a system that monitors the trajectory of a guidable projectile. The projectile has flight control surfaces that are controlled in response to actual tracking information to guide the projectile to a desired impact point. The antenna is located off axis from the trajectory to provide the required trajectory information.

SUMMARY OF THE INVENTION

A relatively inexpensive, lightweight trajectory analysis radar system for an artillery piece in accordance with the invention includes a gun mounted radar antenna tracking the trajectory of a projectile, a radar system sending radar pulses to and receiving radar reflections from the antenna, a signal processor analyzing the radar reflection signals to produce a representation of the projectile trajectory at least to the peak of the trajectory and a data processing system analyzing the trajectory data to determine initial muzzle velocity and atmospheric data. This data can then be output to a fire control computer system to enable the impact point for a next firing to be more accurately predicted.

An advantageous trajectory analysis algorithm operates in a feedback loop using piecewise linear representation of an atmospheric model in selected elevation increments. The model is used to calculate a trajectory that is compared to the actual trajectory. Errors between the calculated and actual trajectory are used to update the atmospheric model for a next calculation iteration.

Test simulation results suggest that two iterations will typically produce an atmospheric model : that represents actual atmospheric conditions with sufficient accuracy. Atmospheric conditions may be assumed with adequate accuracy to be the same for both the rising and falling portion of the trajectory. Analysis of only the first half trajectory from firing to the peak is therefore all that is necessary to create an adequate atmospheric model.

The predictable and relatively constant projectile physical and flight characteristics enable the radar system to be optimized with respect to size and power requirements, while minimizing the possibility of the tracking radar signals being detected by enemy radar units and used to determine the location of a weapon.

For example, mounting of the radar antenna on a recoilless portion of a gun turret with an approximate line of site along the gun barrel assures that the antenna will face the relatively large radar cross section of the trailing end of a projectile. The expected flight trajectory can be used to adjust radar power in accordance with increasing distance from the antenna and the phasing of transmitted pulses can be selected to prevent reflected pulses from interfering with transmitted pulses as the distance of the projectile from the antenna changes. Any required elevation control over the antenna can be limited and easily predicted in advance, while azimuth control may or may not be necessary, depending upon the requirements of any given application. The predictable velocity and position of the projectile can be used to eliminate the detection of false targets and thus improve the accuracy of the radar flight trajectory data.

BRIEF DESCRIPTION OF THE DRAWINGS

A better understanding of the invention may be had from a consideration of the following Detailed Description, taken in conjunction with the accompanying drawings in which.

DETAILED DESCRIPTION OF THE INVENTION

Figure 1:
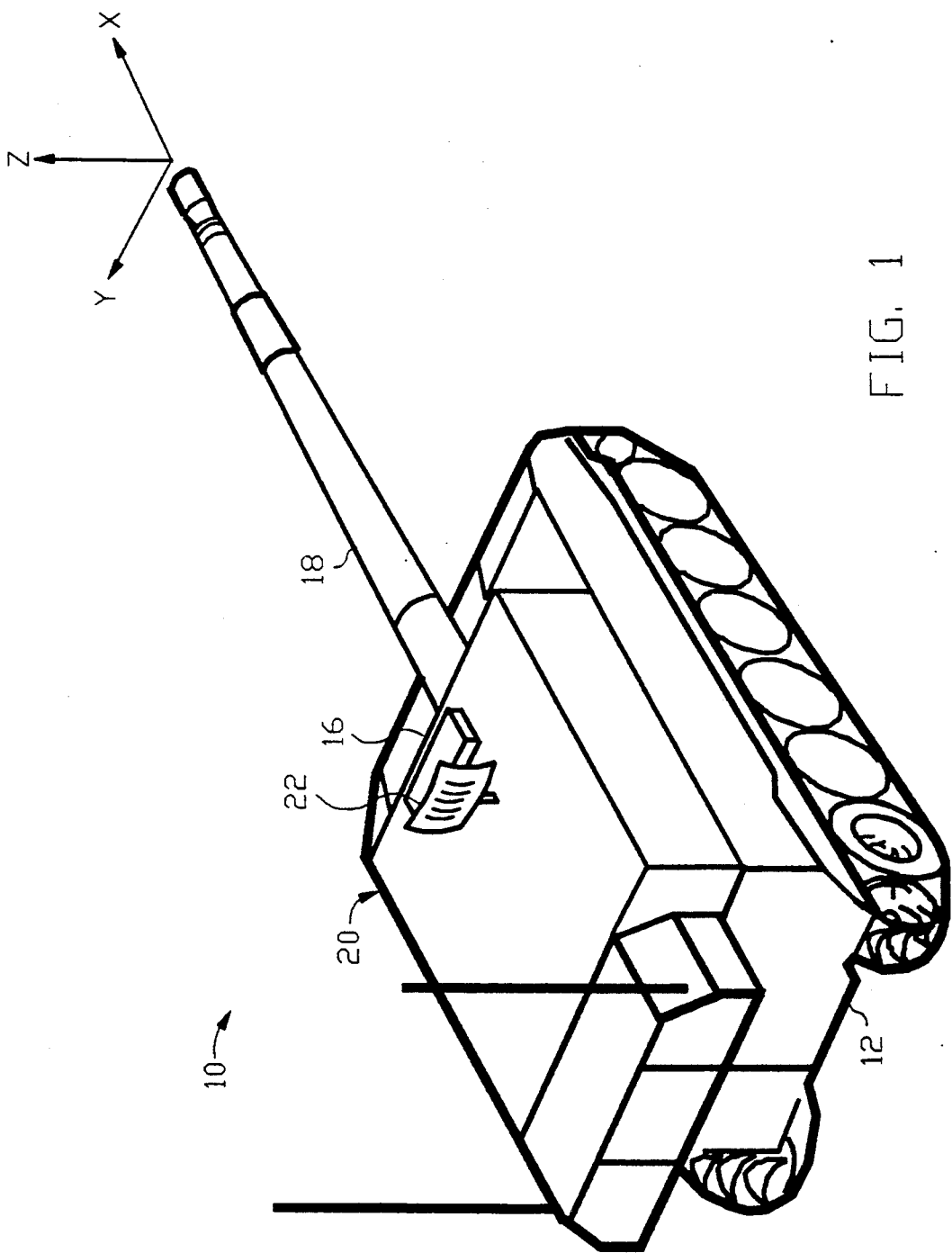
FIG. 1 is a perspective view of an artillery piece having a trajectory analysis radar system in accordance with the invention.

Referring now to FIG. 1, a weapons system 10 in accordance with the invention includes an artillery piece in the form of a 155 mm Howitzer 12 having a track transport system 14 supporting a recoilless gun turret 16 having a recoiling, rifled gun barrel 18 mounted thereon. Mounted on the artillery piece 12 is a trajectory analysis radar system 20 having shown in FIG. 1 only an antenna 22.

Antenna 22 is used to both transmit and receive radar frequency pulses for tracking a projectile that is fired from the barrel 18. Antenna 22 is preferably mounted on a recoilless portion of turret 16 and directed approximately along the line of sight of barrel 18. Conventional azimuth and elevation motion controls are provided for antenna 22, which may be constructed to transmit a narrow angle beam that tracks a reasonably predictable trajectory of a fired projectile. If the beam width is sufficient to assure tracking of a projectile through all atmospheric conditions, it may be possible to eliminate azimuth motion control for antenna 22 in some circumstances.

As a first shot is fired, the radar system 20 tracks the projectile after it exits barrel 18 until it reaches the apex point of its trajectory. Tracking beyond the apex point is possible, but the information gathered tends to be redundant. At the same time, the radar power must be increased as the distance of the projectile from the antenna 22 increases. The increased operating time and the increased power would significantly increase the probability of enemy detection without significantly increasing the accuracy of future rounds.

Enemy detection can be further minimized by having one weapon 10 fire a test round and then communicating the collected meteorological data to other units via secure radio transmissions either directly or indirectly through a fire control center.

Once data has been collected for one or two test rounds, further tracking would typically be discontinued until a significant change in the azimuth or peak elevation of the trajectory occurs or a significant period of time passes that might suggest a change in meteorological conditions along a contemplated trajectory. Even when full tracking is not used, the radar system 20 would typically be operated under low power for a short time of typically less than one second to develop muzzle velocity information for each round. As each round is fired, the latest data for initial muzzle velocity for the same type of ammunition is used to predict muzzle velocity for the next round.

Figure 2:
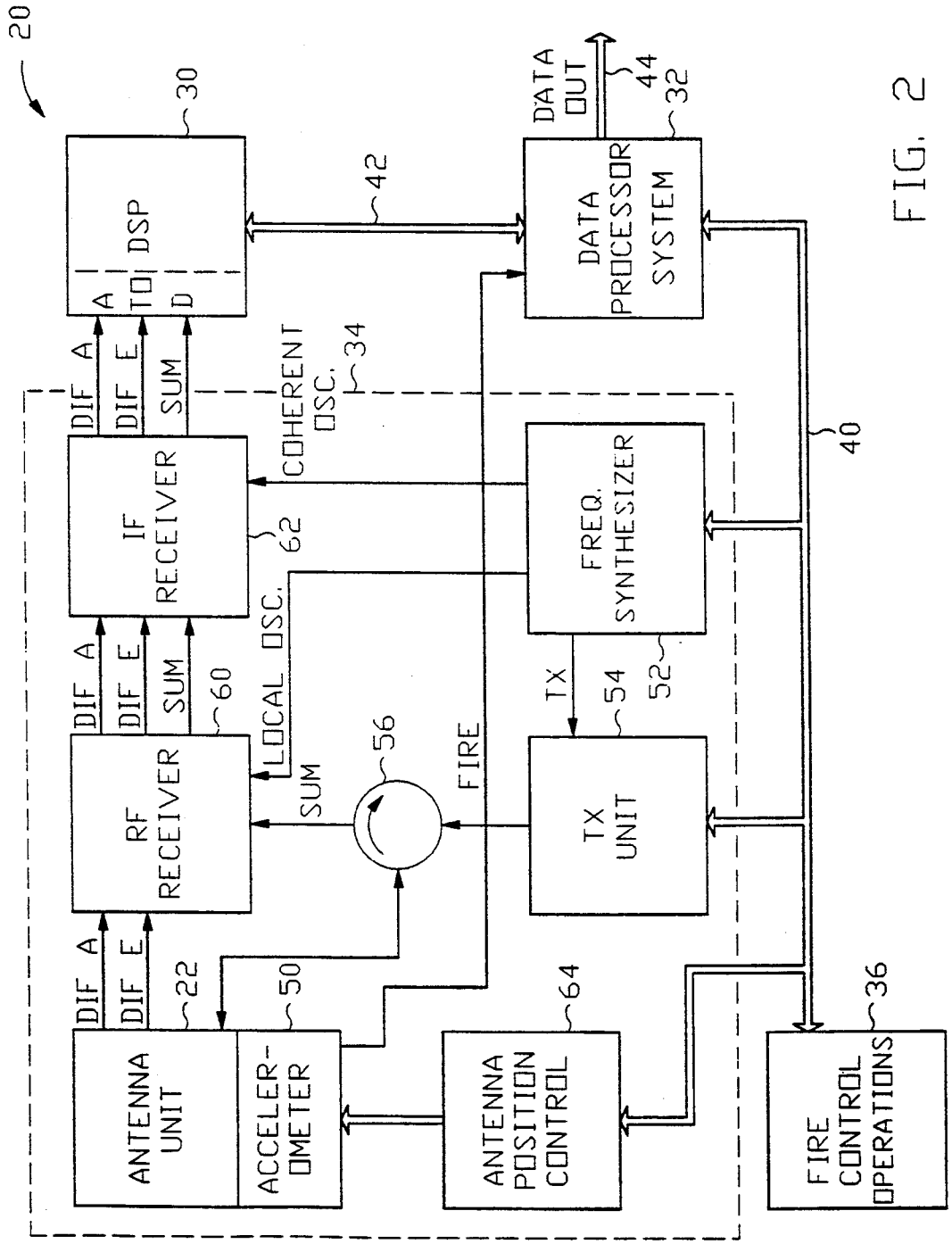
FIG. 2 is a block diagram representation of a trajectory analysis radar system for a weapons system in accordance with the invention.

Referring now to FIG. 2, the trajectory analysis radar system 20 includes a digital signal processor 30 which converts radar data to a numeric coordinate data format based upon the center line of the transmitted radar signal, a fire control data processor system 32 and a doppler effect radar system 34. A main system data bus 40 couples data processor system 32 to various functional units within the radar system 34 as well as to general fire control functions of weapons system 10 as represented by fire control operations 36. These fire control operations would typically include elevation and azimuth positioning of turret 16 and barrel 18 of weapons system 10. Data processor system 32 is also coupled by a communication data bus 42 to digital signal processor 30 and to a data output communication channel 44 which might, for example, connect to a secure digital radio transmitter/receiver.

In preparation for firing an initial round, fire control data processor system 32 calculates an appropriate trajectory using the best available meteorological and initial muzzle velocity data and commands fire control operations 36 to position barrel 18 in accordance with the calculated data. The initial round can be either a first attempt at an effective round on target or a purely test round that is fired at a high elevational angle in the direction of the target. A high elevation purely test round would have the advantage of providing meteorological data over a maximum altitude range and would be exploded shortly after reaching the apex of the trajectory. The highly accurate meteorological data derived from the test round could then be utilized to calculate with high accuracy the required trajectory for an effective round on target.

In either event, the barrel 18 is positioned and a round is fired. An accelerometer 50 or similar device such as an acoustic wave detector detects the firing of the weapon system 10 and generates in response thereto a firing signal which is communicated to fire control data processor system 32 to establish time zero with respect to the firing of the round.

As soon as the firing of a round is detected, data processor system 32 commands frequency synthesizer 52 and transmitter unit 54 within radar unit 34 to become operational and begin transmitting radar pulse signals through a circulator 56 to antenna unit 22. Initially the projectile will be quite close to the antenna 22 and both the transmitted power and pulse width of the radar signals can be relatively low. As the distance of the projectile from the antenna 22 increases, the transmitted power and transmitted pulse width can both be increased to maintain adequate signal to noise ratios in the energy pulses reflected from the projectile back to the antenna for receipt thereby. In addition, as the projectile follows its normal trajectory, the phase and repetition rate of the transmitted radar pulses can be varied to assure that the reflected radar signals are received at a time window between transmitted radar pulses and to assure that a current pulse is not being transmitted at the same time that a reflection from a previously transmitted pulse is being received.

In a preferred embodiment, the radar pulses have a frequency in the 16-17 GigaHertz range with a pulse width of 0.5-2.0 microseconds. A pulse repetition frequency of 50-100 kHz results in a new pulse being produced every 10 to 20 microseconds. The initial power may be as low as 1 watt and is increased to as much as 200 watts as the projectile reaches its apex. The antenna preferably has a gain of about 39 dB with an elevation beam width of approximately 1.70 degrees. It will be appreciated that other suitable frequencies and parameters could be used as well and can be optimized for any given situation.

As the weapon 10 is fired the firing of the charge creates an initial ionization zone around the barrel 18. During this initial ionization period, the transmitter unit 54 goes through a warmup period and reaches the full commanded power and the digital signal processor 30 ignores any return signals. After approximately 100 milliseconds this initial ionization dissipates and data processor system 32 issues a command over bus 42 to cause digital signal processor 30 to begin receiving and analyzing reflected radar signal data.

The reflected radar signals received by antenna unit 22 include an azimuth difference signal, DIF A, an elevation difference signal, DIF E, and a sum signal. The DIF A and DIF E signals are communicated directly to an RF receiver 60, while the sum signal is communicated through circulator 50 to RF receiver 60. Receiver 60 mixes the three signals with a local oscillator signal from frequency synthesizer 52 with the resultant signals being communicated at an intermediate frequency of approximately 500 kHz to an intermediate frequency receiver 62 for further amplification. IF receiver 62 mixes the signals with a coherent oscillator signal from frequency synthesizer 52 to obtain conventional velocity dependent Doppler signals and communicates the three signals to an analog to digital converter at the input of digital signal processor 30.

The azimuth and elevation difference signals provide indications of position error of the projectile from the center of line of sight of antenna unit 22. This information is in turn utilized during the course of flight of the projectile to command antenna position control 64 to reposition antenna 22 so as to maintain the projectile near the center of its line of sight. Antenna position control 64 may in turn provide back to data processing system 32 current actual antenna position data which can be combined with relative position data received from DSP 30 over bus 42 to permit calculation of the actual trajectory of the projectile relative to the outer tip of barrel 18.

Digital signal processor 30 processes signal SUM with a 1000-2000 point fast Fourier transform FFT) to obtain velocity data from the doppler information of signal SUM. In addition, the time of occurrence of each reflection after transmission of the radar pulse signal corresponding thereto and the strength of the received reflected signal relative to the transmitted energy are utilized by digital signal processor 30 to generate range information that is converted to position information in an XYZ coordinate system utilizing the muzzle tip of barrel 18 as the origin.

The three dimensional position and velocity data are calculated by digital signal processor 30 in response to the transmitted pulse repetition rate of approximately 50-100 kHz. This high frequency data is smoothed by digital signal processor 30 with any data points being completed by interpolation of data on either side thereof and utilized to generate data points at a much lower frequency of approximately 100 Hz which are communicated to data processor system 32. Data processor 32 stores these data points for later trajectory analysis and also utilizes the data points on a real time basis to control the positioning of antenna 20 through antenna position control 64, to control the power of the transmitted radar signals, and to control the pulse repetition rate and pulse duration of the transmitted radar signals so as to optimize the efficiency of radar unit 34. As is conventional, digital signal processor 42 communicates to data processor system 32 sampled data point information at a rate of approximately 100 times per second. The data for each sampled data point for the observed trajectory includes three dimensional velocity data, three dimensional position data, and a probability value indicating the probability that the communicated data point falls within a selected range of accuracy. Information concerning the approximate and expected position and velocity of the projectile can be utilized by digital signal processor 30 to eliminate erroneous, noise induced false detections of projectile position or velocity to improve the probability and effectiveness of detecting true position and velocity.

If the data processor system 32 is fast enough to keep up with communication and antenna positioning requirements and still have additional processing time, it may immediately begin analyzing the trajectory data received from digital signal processor 30 to determine initial muzzle velocity and accurate meteorological data. However, more typically, the data processor system 32 is an Intel 80386 based microprocessor system that does not have sufficient speed and capacity to do both functions simultaneously. Furthermore, it is sufficient that the analysis data be available within a few tens of seconds after the projectile reaches its apex and there is no need for simultaneous computation of both antenna positioning control and trajectory analysis.

The first 32 valid data points that are detected after firing are used to compute projectile muzzle velocity by performing a least squares error fit of the 32 data points to a straight line. Since the initial 32 data points will commence about 100 milliseconds after firing, the straight line is then used to extrapolate the velocity from the 32 data points back to firing time zero to establish the initial muzzle velocity. This value is stored and utilized to calculate the desired trajectory for the next round. Typically the muzzle velocity will be determined for each round and used to update information for the next round, even when a full half trajectory is not being tracked.

The trajectory data, sampled at 10 millisecond intervals, is then analyzed to establish the meteorological data including X and Y component wind velocity and air density at a plurality of different elevation points in the vicinity of weapon system 10. Meteorological data is typically calculated for sample points at 1000 foot elevation intervals. Polynomial approximation and moving average techniques are used to smooth the meteorological data resulting from the trajectory analysis and linear interpolation is utilized to estimate meteorological conditions between the meteorological sample data points which are stored for the different sample elevation points. In the coordinate system used herein X indicates a down range direction, Y indicates a cross range direction and Z indicates elevation.

Figure 3:
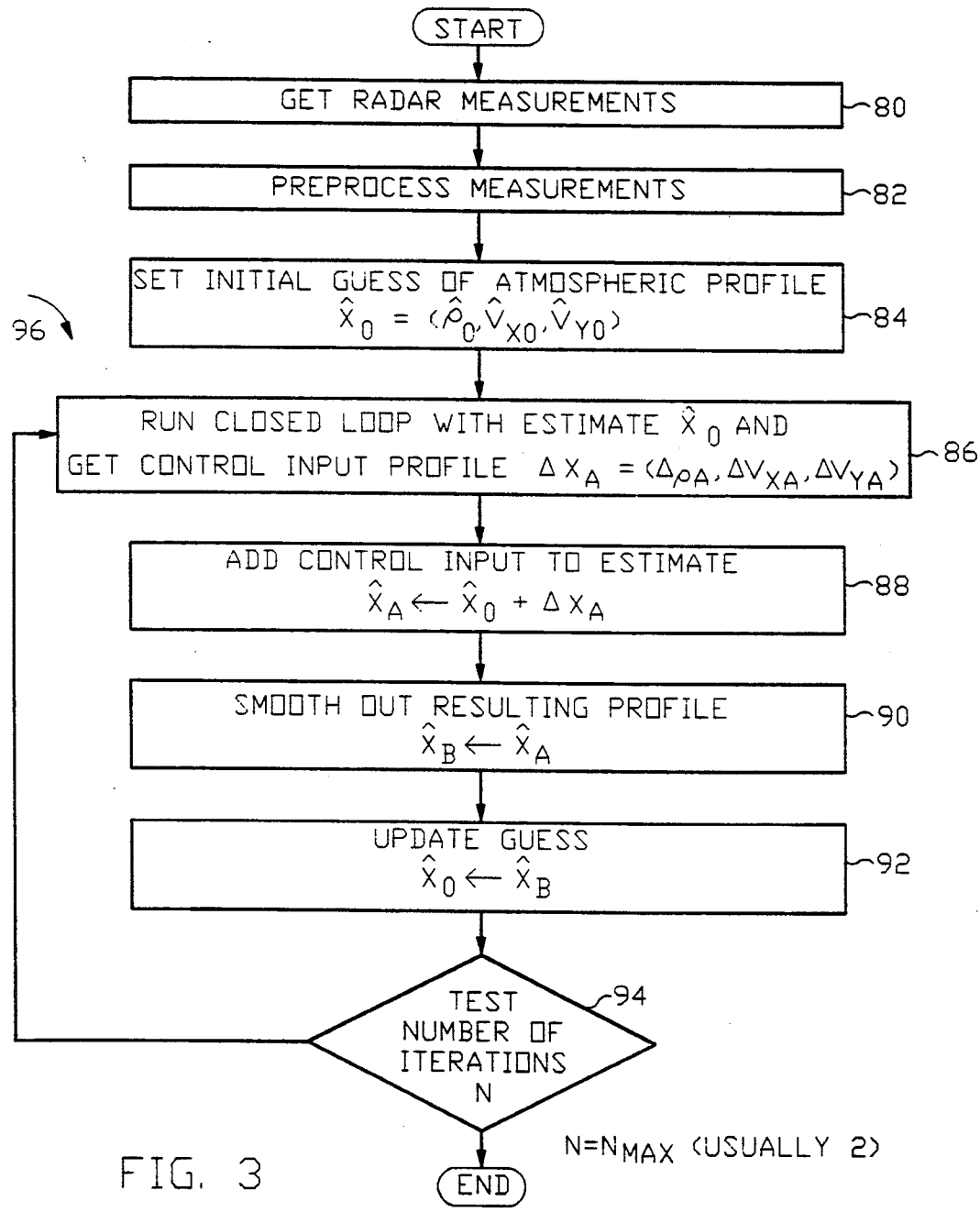
FIG. 3 is a flow chart illustrating a computer program for analyzing trajectory data to derive atmospheric data in accordance with the invention.

An algorithm for collecting the radar data and generating updated meteorological data is illustrated in accordance with the invention in FIG. 3, to which reference is now made. At steps 80 and 82 the actual projectile flight radar measurements are received and conventionally processed by digital signal processor 30 in real time during the actual flight of the projectile.

At step 80 the digital signal processor 30 analyzes the received radar data to produce sample points containing range, range rate, azimuth angle, elevation angle and probability of detection at a rate of 100 points per second. The data is determined relative to the center line of the radar beam. Data processor system 32 keeps track of antenna position data received from position control 64 and later adds any offsets that result from motion of antenna 22. The data processor system 32 then continues to preprocess the converted data by selecting points having a probability of detection less than a certain threshold and replacing these points with estimated data derived from curve fitting a polynomial line through valid points on either side of the missing points. The completed data is then prefiltered using integration and moving average techniques to smooth out any radar induced noise from the sample data points. The three dimensional position and velocity information for the actual projectile trajectory is then used to derive accurate atmospheric information by in effect determining what wind and air density conditions would have caused the detected trajectory.

Once the projectile has reached the apex of its trajectory, the fire control data processor 32 is freed of its real time control functions and begins processing the stored actual trajectory data at step 84. The trajectory analysis proceeds at step 84 by establishing initial values for an atmospheric model or profile at selected small elevation intervals with respect to air density, $\rho$, cross range wind velocity $V_y$, and down range wind velocity $V_x$. The initial atmospheric profile is desirably made as accurate as possible and may be derived from any one of a variety of techniques. For example, conditions can be determined at ground zero and then initially it can be assumed that the ground zero conditions exist at each data point elevation level. Alternatively, the data derived from the last test firing can be utilized as the initial data. Another technique for initializing the atmospheric data may be to receive test fire determined data from a neighboring weapon system, from a fire control center or from other atmospheric data sources.

A closed loop iterative process to generate more accurate atmospheric data is then begun at step 86 by deriving a calculated trajectory for the fired projectile using the initial muzzle velocity determined from the radar measured actual trajectory of the projectile and the initial atmospheric profile $X_0$. The calculated trajectory produces position and velocity data at 0.01 second intervals corresponding to the 0.01 second data point intervals at which actual trajectory data is produced from the digital signal processor 30 processing of received radar data. At each of the corresponding data points, both position and velocity error for each of the three axial directions are calculated and this data is utilized to generate atmospheric error values for density, cross wind and down range wind at an altitude corresponding to the data point.

Each of the six error parameters $\Delta X$, $\Delta Y$, $\Delta Z$, $\Delta V_x$, $\Delta V_y$, and $\Delta V_z$ is passed through a digital filter having the form $$(K/(1+\tau\alpha s))\Delta\alpha \qquad (1)$$

where K is a gain parameter, $\tau$ is a time constant, $\alpha$ is the current value of the parameter being filtered, $\Delta\alpha$ is the error value of the parameter being filtered and s is the LaPlace operator. In a preferred implementation of the invention, K and $\tau$ have the values shown in TABLE I:

TABLE I

| | Filter Parameter Values | |
|---|---|---|
| | K | $\tau$ |
| $\Delta X$ | 0.05 (m/s)/m | 0.1 sec. |
| $\Delta V_x$ | 10.00 (m/s)/(m/s) | 2.0 sec. |
| $\Delta Y$ | 0.05 (m/s)/m | 0.1 sec. |
| $\Delta V_y$ | 10.00 (m/s)/(m/s) | 2.0 sec. |
| $\Delta Z$ | 0.01 (kg/m³)/m | 0.1 sec. |
| $\Delta V_z$ | 0.20 (kg/m³)/(m/s) | 1.0 sec. |

Still within step 86 the two filtered X direction error values for position and velocity, $\Delta XF$ and $\Delta VXF$, are added to obtain a down range wind velocity error value $\Delta VWX$. The two filtered Y direction error values for position and velocity, $\Delta YF$ and $\Delta VYF$, are added to obtain a cross range wind velocity error value $\Delta VWY$ and the two filtered vertical error values for position and velocity, $\Delta ZF$ and $\Delta VZF$, are added to obtain an air density error value $\Delta\rho$.

These atmospheric model error values are then used at step 88 to update the current atmospheric model. During the first pass or iteration through loop 96, the current model is the starting model. The algorithm for updating the current atmospheric model adds the error values to the values of the current atmospheric model. Typically the negative error feedback would be a subtraction, but it will be apparent that whether one adds or subtracts is merely a matter of the sign used for the error values. Those skilled in the art can use the proper combination of sign changes and addition or subtraction to implement a negative feedback loop and cause the atmospheric data model to converge toward the true atmospheric conditions.

At the end of a test firing sequence represented by get radar measurements 80 in FIG. 3, the data processor system 32 has received and stored data from DSP 30 at 10 millisecond intervals defining the following parameters for the ballistic projectile:
 range
 range rate
 azimuth angle
 elevation angle
 probability of detection The data begins with the capture of valid data following the initial ionization interval and continues to at least the top of the ballistic trajectory curve.

The initial data format received from the DSP 30 is then converted to three dimensional 6 degrees of freedom position and velocity format that places the origin at the projectile and produces for each 10 millisecond sampled data point a set of position and velocity values relative to the firing point. The data produced is:
 $P_x$ position (down range)
 $P_y$ position (cross range)
 $P_z$ position (elevation)
 $V_x$ velocity (down range)

$V_y$ velocity (cross range)
$V_z$ velocity (elevation)

This transformed data is computed from the original data for the corresponding sampled data points together with any offsets that occur as a result of positioning of antenna 22 during the course of the trajectory. Relative antenna 22 position for each of the data points is received from antenna position control 64 and stored by data processor system 32 in such a way that the antenna 22 position data can be correlated at this time with the radar analysis 10 millisecond sampled data point data. If antenna 22 is mounted on a turret of transport system 14, then any turret motion must be similarly considered. Using ordinary geometric relationships the position and velocity data can be calculated as follows:

$$P_x = R \cdot \cos(El) \cdot \cos(Az) \qquad (1)$$

$$P_y = R \cdot \cos(El) \cdot \sin(Az) \qquad (2)$$

$$P_z = R \cdot \sin(El) \qquad (3)$$

$$V_x = \dot{R} \cdot \cos(El) \cdot \cos(Az) - \qquad (4)$$
$$R \cdot \dot{El} \cdot \sin(El) \cdot \cos(Az) -$$
$$R \cdot \dot{Az} \cdot \cos(El) \cdot \sin(Az)$$

$$V_y = \dot{R} \cdot \cos(El) \cdot \sin(Az) - \qquad (5)$$
$$R \cdot \dot{El} \cdot \sin(El) \cdot \sin(Az) +$$
$$R \cdot \dot{Az} \cdot \cos(El) \cdot \cos(Az)$$

$$V_z = \dot{R} \cdot \sin(El) + R \cdot \dot{El} \cdot \cos(El) \qquad (6)$$

$$V_z = \dot{R} \cdot \sin(El) + R \cdot \dot{El} \cdot \cos(El) \qquad (6)$$

where R denotes range, $\dot{R}$ denotes range rate, El elevation angle, $\dot{El}$ elevation angle rate, Az azimuth angle, and $\dot{Az}$ azimuth angle rate. The angular rates, $\dot{El}$ and $\dot{Az}$, are computed as the difference of a new measurement data point and the previous data point divided by the sampling time of 10 milliseconds.

As the position and velocity data is calculated from the radar responses, a probability of detection value is determined from the signal to noise ratio of the reflected radar signal as calculated by isp 30. If the signal to noise ratio is less than or equal to 4 dB, the probability of detection is assigned a value of zero. For a s-n ratio greater than 4 dB and less than or equal to 6 dB, the value is 0.1. If greater than 6 dB but less than or equal to 8 dB, the value is 0.3. If greater than 8 dB but less than or equal to 10 dB, the value is 0.65. If greater than 10 dB but less than or equal to 12 dB, the value is 0.85. If greater than 12 dB but less than or equal to 14 dB, the value is 0.99. If the signal to noise ratio is greater than 14 dB, a value of 0.99 is assigned to the probability of detection.

As data for a sample point is processed, a random number is generated to create an event having a probability of occurrence equal to the probability of detection. For example, a random number between 0 and 1 is generated and compared to the probability of detection. If the random number is less than or equal to the probability of detection, the event is deemed to have occurred and the corresponding sample data point is treated as valid. If the probability event does not occur, the sample data point is discarded and the missing point is determined from other points, either by a curve fit algorithm or by interpolation. A conventional least square curve fit of a polynomial to several points surrounding the missing point is preferred. In this way data at sampled points is used on a statistical basis in proportion to the probability that the data represents a valid trajectory point.

An automatic weighing function is thus established where the data defining the sampled trajectory is weighed in favor of points having a higher probability of detection. However, points having a lower probability of detection are not completely ignored.

Once three dimensional position and velocity sample data points have been calculated for each 10 millisecond interval, the 6 sets of data are each independently smoothed by a suitable filtering technique such as use of integration or a moving average. The resulting smoothed data thus represents the actual, measured trajectory of the projectile at 10 millisecond intervals. This completes the processing of the actual trajectory data at step 82 in FIG. 3.

At step 84 an initial estimate of the atmospheric model is established. The closer the initial estimate is to the true actual atmospheric conditions, the faster the determined atmospheric model will converge to the actual atmospheric conditions in response to processing using the actual trajectory data. One technique is to initially assume that ground conditions exist at all elevations of interest. Alternatively, the initial estimate can be derived from a previous firing at the same or a neighboring location, from weather reports or forecasts, from observations or simply from a pre-established arbitrary estimate such as a typical air density profile and zero wind velocity.

The initial atmospheric data is established for air density; down range or X wind velocity $VWX^0$ and cross range or Y wind velocity $VWY^0$. Temperature, T degrees, at the firing point is also established to enable future adjustment of air density and ballistic weapon parameters in response to temperature. However, the temperature is assumed to be correct and is not modified in response to the actual trajectory data. The atmospheric values are stored in a table in small elevation increments beginning with the firing point as elevation, Z, equals zero. Typically data is stored at an elevation corresponding to each sample data point along the projectile trajectory and interpolation is used to find atmospheric data at elevations between these sample data points. Data could alternatively be stored for fixed elevation increments. Increments of no more than 1000 feet are preferred.

Linear interpolation is used to obtain atmospheric parameters at elevations between the stored elevation points. A more sophisticated interpolation or curve fitting could be used if desired, but linear interpolation is convenient and is sufficiently accurate to produce good results.

In the present model the atmospheric conditions vary only with altitude and for a given altitude are assumed constant and uniform throughout the range of the weapons system 10.

Figure 4:
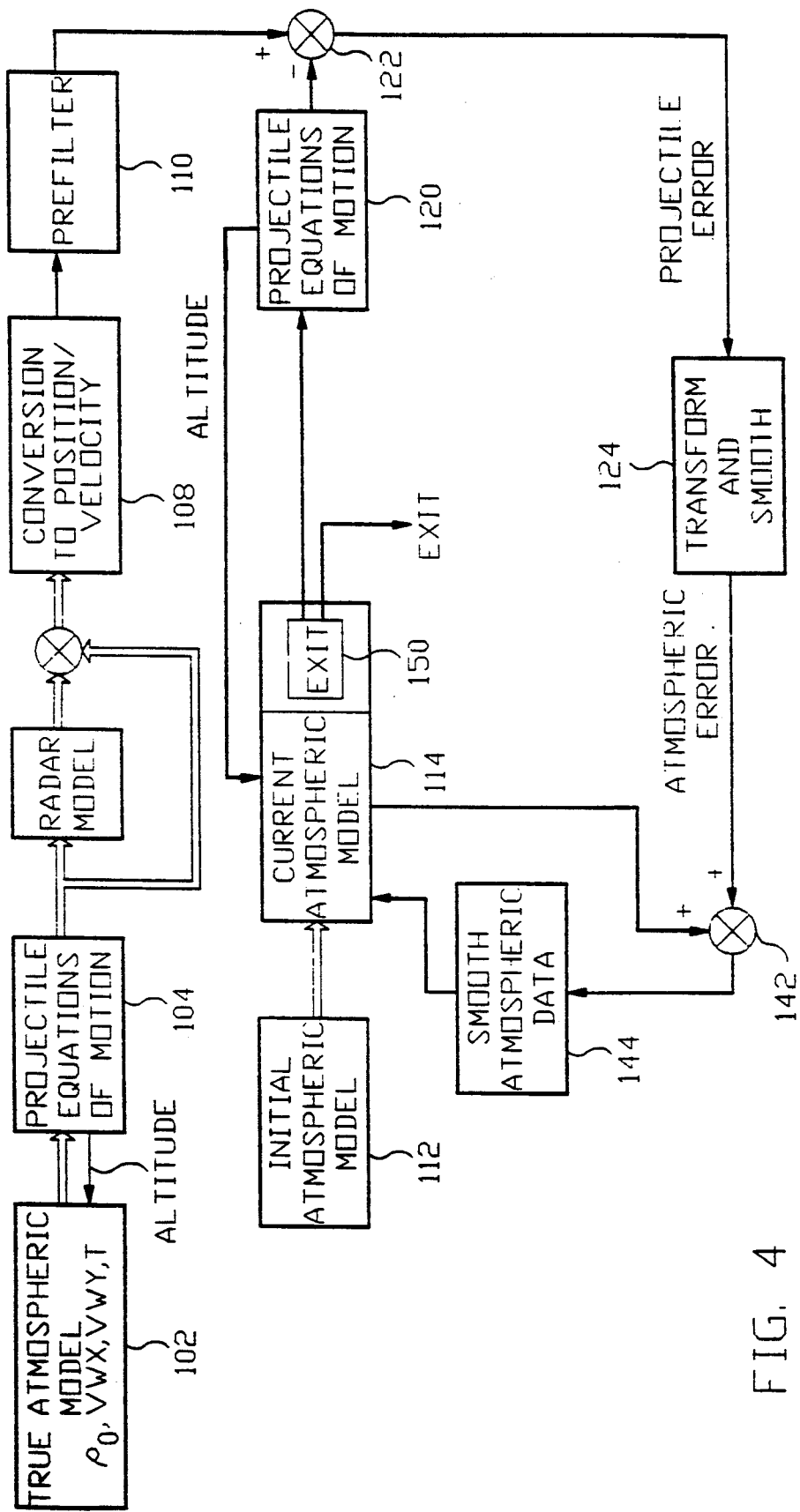
FIG. 4 is a block diagram illustration of a method of analyzing projectile trajectory data in accordance with the invention.

The method of starting with an initial estimate of an atmospheric model and causing the model to converge toward an accurate true atmospheric model is analogous to a digital position feedback servo system as illustrated in FIG. 4. The converging process can be more clearly understood by examining the same process from two different perspectives as illustrated in FIGS. 3 and 4.

FIG. 4 represents a computer simulation of a method in accordance with the invention of developing an atmospheric model in the vicinity of a weapons system 10. At block 102 a current, accurate true atmospheric model of temperature, air density, down range wind velocity and cross range wind velocity is assumed.

At step 104 the projectile equations of motion are used to calculate a simulated actual trajectory that would occur given the true atmospheric model assumed at step 102. A 6 degree of freedom (DOF) mathematical model has been developed for all major weapons systems including the 155 mm Howitzer weapons system which is representative of the weapons system 10. This model permits the assumption of any initial condition such as temperature, muzzle velocity, azimuth angle, elevation angle, projectile spin rate for each different aerodynamic projectile shape or other physical characteristics. The model is conventionally applied to an atmospheric model to calculate a projectile trajectory. One well known model is the BRL aerodynamic model from the Ballistic Research Laboratory at the Aberdeen Proving Grounds.

In any event, at step 104 the selected projectile model is applied to the atmospheric model established at step 102 to generate simulated sample data points at 10 millisecond intervals representing in three dimensions the position and velocity of a fired projectile such as a 155 mm projectile.

Subsequently at step 106 the position velocity data of step 102, 104 is converted to a radar representation format and a radar model is applied to the calculated trajectory to superimpose simulated radar noise and probability of detection information. Some of the probability information is below the detection threshold, necessitating the estimation of missing points from surrounding data, just as would occur in the generation of true radar analysis data. Steps 102, 104 and 106 of FIG. 4 thus correspond to step 80 in FIG. 3.

At steps 108 and 110 the radar simulated trajectory data is converted to a position, velocity format and smoothed by a prefilter step 110. The resulting data is a set of simulated dated points at 10 millisecond intervals that simulates the output from process measurements step 82 of FIG. 3.

An initial estimate of an atmospheric model is then established at step 84 in FIG. 3 and at a corresponding step 112 in FIG. 4. These initial values are used to initialize a current model data set at step 114 of FIG. 4. The initialized current atmospheric model from step 84 of FIG. 3 is applied to a loop 96 and similarly the current atmospheric model from step 114 of FIG. 4 is applied to a loop 116 that corresponds to loop 96 of FIG. 3.

The loops 96 and 116 are functionally identical and operate on the current atmospheric model to cause the values represented thereby to converge toward the true correct atmospheric model represented by true atmospheric conditions in FIG. 3 and by atmospheric conditions simulated at step 102 of FIG. 4.

At step 86 of FIG. 3 an aerodynamic model of the projectile is applied to the current estimate of the atmospheric model to calculate a ballistic trajectory. The calculated ballistic trajectory is then compared with the true trajectory data developed at step 82 and the position and velocity difference or error information can be used to calculate error values for the current atmospheric model. The error data added to the current atmospheric model values at step 88 to form a new, rough atmospheric model. The new, rough atmospheric model is smoothed at step 90 and transferred to form a new current atmospheric model at step 92.

At step 94 of FIG. 3, an exit criterion is tested. In the present instance it is determined that loop 96 has experienced only one iteration and control returns to step 86 to execute a new iteration with the smoothed new atmospheric model from steps 90 and 92 being used as the current atmospheric model.

When the exit criteria is met at step 94, the loop 96 is exited and the then existing current atmospheric model becomes the assumed actual atmospheric model to be used in aiming calculations for subsequent firings of weapons system 10 and neighboring weapons systems.

The loop 116 of FIG. 4 is functionally identical to loop 96 of FIG. 3 and begins at step 120 with the application of a projectile model to the current atmospheric model from step 114. Step 120 is identical to step 104 except that a different atmospheric model is used to calculate the trajectory. The trajectory from step 120 is subtracted from the calculated true trajectory at subtraction step 122 to produce trajectory error values that are applied to a transformation and smoothing step 124 that generates atmospheric model error values $\Delta VWX$, $\Delta VWY$ and $\Delta \rho$.

The transforming and smoothing function 124 uses the equivalent of position plus velocity feedback to filter and sum the trajectory error values to produce the atmospheric model error values. Although not explicitly shown, it will be understood that the atmospheric error values are determined for the elevations computed by block 120 at 10 millisecond intervals.

Transformation step 124 applies to each of the 6 trajectory error positions and velocity error values a low pass filter function 130-135 represented in LaPlace notation by $$E^* = (K^*/(1+\tau^* s))\Delta^* \quad (7)$$

where $E^*$ is one of the 6 trajectory error values, $K^*$ is a scaling or weighting value, $\tau$ is a time constant and s is the LaPlace operator.

An adder 136 sums the weighted and low pass filtered X position and velocity trajectory error values to produce an X component wind velocity error value $\Delta VWX$. An adder 138 sums the weighted and low pass filtered Y position and velocity trajectory error values to produce a Y component wind velocity error value $\Delta VWY$. An adder 140 sums the weighted and low pass filtered Z position and velocity trajectory error value to produce an air density error value $\Delta \rho$. Subtracter 122 and transformer 124 thus correspond to step 86 of FIG. 3.

These filter equations are set forth below using the weighting values and time constants set forth in TABLE I.

$$\Delta VWX = \Delta XF + \Delta VXF \quad (8)$$

$$\Delta VWY = \Delta YF + \Delta VWY \quad (9)$$

$$\Delta \rho = \Delta ZF + \Delta VZF \quad (10)$$

where, $$\Delta XF = (0.05/(1+0.1x\,s))\Delta x \quad (11)$$

$$\Delta VXF = (10/(1+2V_x\,s))\Delta V_x \quad (12)$$

$$\Delta YF = (0.05/(1+0.1y\,s))\Delta y \quad (13)$$

$$\Delta VYF = (10/(1+2V_y s))\Delta V_y \qquad (14)$$

$$\Delta ZF = (0.01/(1+0.1z\, s))\Delta z \qquad (15)$$

$$\Delta VZF = (0.2/(1+1V_z s))\Delta V_z \qquad (16)$$

An adder step 142 corresponds to step 88 of FIG. 3 to add the atmospheric error data to the current atmospheric data to produce new atmospheric data that is smoothed at step 144 and applied to the current atmospheric model at step 114 to replace the original current data with the new, smoothed atmospheric data. An exit substep 150 is then performed within step 114 to test for exit conditions. Upon exiting, the current atmospheric data of step 114 becomes the data used for aiming calculations for weapons system 10.

It will be noted that the adder 142 of FIG. 4 corresponds to the update step 88 of FIG. 3, that smoothing step 144 of FIG. 4 corresponds to smoothing step 90 of FIG. 3 and that transfer of the new atmospheric model to the current atmospheric model at step 114 of FIG. 4 corresponds to step 92 of FIG. 3. Test 150 of FIG. 4 corresponds to exit test 94 of FIG. 3.

In computer simulations of the present invention, it was found that two iterations of loops 96, 116 were sufficient to cause the current atmospheric model to adequately represent the true atmospheric model. A greater or lesser number of iterations could of course be used as the exit criteria. Alternatively, exiting could be based on the magnitudes of the trajectory or atmospheric error values; i.e., when these values drop below a selected threshold.

A trajectory analysis radar system simulation program written in the Fortran programming language using the ACSL (Advanced Continuous Simulation Language) to implement the projectile equations of motion 120 and the low pass filter function 124 is set forth in APPENDIX A hereto.

While particular arrangements of a trajectory analysis radar system have been shown and described for the purpose of enabling a person of ordinary skill in the art to make and use the invention, it will be appreciated that the invention is not limited thereto. Accordingly, any modifications, variation or equivalent arrangements within the scope of the attached claims should be considered to be within the scope of the invention.

APPENDIX A

```
*****************************************************
      FILE NAME - ANALYSIS:[ARMAL.TAR]TAR18.MEM;1
*****************************************************

PRINTED FROM NODE - VAX2

AT TIME =   16-OCT-1990 15:07:03.81

FILE CREATION DATE - 16-OCT-1990 15:05:26.96

LAST REVISION DATE - 16-OCT-1990 15:06:09.19

BLOCK SIZE OF FILE - 341

COPYRIGHT (C) LEAR ASTRONICS CORPORATION 1991

File: RADAR_COM18.FOR

C********************************************************************
C
C INCLUDE FILE FOR RADAR COMPUTATIONS              02-MAY-1990
C name: RADAR_COM18.FOR
C
C********************************************************************
      IMPLICIT NONE

INTEGER ISEED/2234567/

C------ Radar parameter definitions and units

! The dB unit of X is defined as 10*LOG10(X)

! Variables set by user via routine RADARSET           Units:
      ! ---------------------------------------------        -----
      ! RADAR_POWER    : radar power                         W
      ! ANTENNA_GAIN   : antenna gain                        dB
      ! WAVE_LENGTH    : wave length                         m
      ! RECEIVER_FREQ  : receiver frequency                  Hz
      ! NOISE_FIGURE   : system noise figure                 dB
      ! TOTAL_LOSSES   : system losses                       dB
      ! FFT_LENGTH     : fft length used                     n/a
      ! WEATHER        : clear (0) or 4 mm/Hr rain (1)       0/1
```

```
! Variables coming from the ACSL portion
! ---------------------------------------
! PROJ_DIAMETER  : projectile diameter                          m ! Variables computed in routine RADARSET
! ---------------------------------------
! SECTION        : projectile section area                      m**2
! ELEV_BEAMWIDTH : elevation beamwidth                          rad
! AZIM_BEAMWIDTH : azimuth beamwidth                            rad
! RANGE_RES      : range resolution                             m
! RRATE_RES      : range rate resolution                        m/s
! RCSMAX         : maximum radar cross section                  m**2
! RCSMAXDB       :     "      "      "      "                   dBsm
! STN_0          : free space S/N at 1 NM for max RCS           dB
! RCS_NORM       : normalized RCS ([0,1])                       n/a
! STNDB          : S/N ratio                                    dB
! PROB_DETECTION : probability of detection                     n/a
! ATTENUATION    : attenuation due to weather                   db/km C------ Declare radar parameter types REAL
              RADAR_POWER      , ANTENNA_GAIN    , WAVE_LENGTH
         .,   PROJ_DIAMETER    , RECEIVER_FREQ   , NOISE_FIGURE
         .,   TOTAL_LOSSES     , FFT_LENGTH      , ELEV_BEAMWIDTH
         .,   AZIM_BEAMWIDTH   , WEATHER         , SECTION
         .,   RANGE_RES        , RRATE_RES       , RCSMAX
         .,   RCSMAXDB         , STN_0           , RCS_NORM
         .,   STNDB            , PROB_DETECTION  , ATTENUATION
         .,   X_BAND(2)        , KU_BAND(2)      , K_BAND(2)
         .,   KA_BAND(2)       , Q_BAND(2)       , V_BAND(2)
         .,   W_BAND(2)

C------ Common block for radar parameters

COMMON /RADAR_COM/
              RADAR_POWER      , ANTENNA_GAIN    , WAVE_LENGTH
         .,   PROJ_DIAMETER    , RECEIVER_FREQ   , NOISE_FIGURE
         .,   TOTAL_LOSSES     , FFT_LENGTH      , ELEV_BEAMWIDTH
         .,   AZIM_BEAMWIDTH   , WEATHER         , SECTION
         .,   RANGE_RES        , RRATE_RES       , RCSMAX
         .,   RCSMAXDB         , STN_0           , RCS_NORM
         .,   STNDB            , PROB_DETECTION  , ISEED
         .,   ATTENUATION      , X_BAND          , KU_BAND
         .,   K_BAND           , KA_BAND         , Q_BAND
         .,   V_BAND           , W_BAND

C------ Default values for radar parameters

DATA
              RADAR_POWER      , ANTENNA_GAIN    , WAVE_LENGTH
         .,   PROJ_DIAMETER    , RECEIVER_FREQ   , NOISE_FIGURE
         .,   TOTAL_LOSSES     , FFT_LENGTH      , ELEV_BEAMWIDTH
         .,   AZIM_BEAMWIDTH   , WEATHER         , SECTION        /
         .    200.             , 39.0            , 1.76E-2
         .,   155.E-3          , 0.5E6           , 2.
         .,   9.               , 2048.           , 0.0301
         .,   0.0301           , 0.              , 0.01887        /

DATA
              X_BAND           /  8.E9 ,  12.E9 /
         .,   KU_BAND          / 12.E9 ,  18.E9 /
         .,   K_BAND           / 18.E9 ,  27.E9 /
         .,   KA_BAND          / 27.E9 ,  40.E9 /
         .,   Q_BAND           / 36.E9 ,  46.E9 /
         .,   V_BAND           / 46.E9 ,  56.E9 /
         .,   W_BAND           / 56.E9 , 100.E9 /

C------ Constants

C------                   convention :
C------              x (m)   = y (nm)  * NM2M
C------              y (rad) = x (deg) * DEG2RAD
C------              x (deg) = y (rad) * RAD2DEG REAL
              PI               , TWOPI           , NM2M
         .,   DEG2RAD          , RAD2DEG         , LIGHTSPEED
```

```
      DATA
     .          PI                , TWOPI             , NM2M
     .,         DEG2RAD           , RAD2DEG           , LIGHTSPEED /
     .          3.141592654       , 6.283185307       , 1853.
     .,         17.4532925E-3     , 57.2957795        , 3.E8           /

C****************************************************************************

File: TAR_COM18.FOR

C****************************************************************************
C
C VARIABLE DECLARATION AND COMMON BLOCK FOR TAR_MAIN PROGRAM
C TAR_COM18.FOR    ! 02-MAY-1990
C
C****************************************************************************
      CHARACTER*10    ICOFILE, ICFILE, TMPFILE

INTEGER         OPTION, RUNFLG, RADFLG, RNSEED/223457/
     1,                       SLAYER, NLAYER, MLAYER, ILAYER, KLAYER
     1,                       IMAX, JMAX, KMAX, I, J, K, NCOST(40)
     1,                       ISEED

REAL            RHOTAB (40), VWXTAB (40), VWYTAB (40)
     1,               RHOTAB0(40), VWXTAB0(40), VWYTAB0(40)
     1,               RHOUL  (40), VWXUL  (40), VWYUL  (40)
     1,               RHOLL  (40), VWXLL  (40), VWYLL  (40)
     1,               RHOPCT (40), VWXPCT (40), VWYPCT (40)
     1,               COSTVX (40), COSTVY (40), COSTVZ (40)
     1,               LAYER, LVX, LVY, LVZ, COSTVZMIN, COSTVZTH
     1,               RHOSTEP, VWXSTEP, VWYSTEP, XRHO, RHOMIN
     1,               VWXH0, VWXA0, VWXH1, VWXA1, COSTVZTHSL
     1,               VWYH0, VWYA0, VWYH1, VWYA1
     1,               KXER, KVXER, KAXER
     1,               KYER, KVYER, KAYER
     1,               KZER, KVZER, KAZER, KRGER, KRRER

COMMON / TARCOM1 /
     1                        OPTION, RUNFLG, RADFLG, RNSEED
     1,                       SLAYER, NLAYER, MLAYER, ILAYER, KLAYER
     1,                       IMAX, JMAX, KMAX, NCOST
     1,               RHOTAB          , VWXTAB          , VWYTAB
     1,               RHOTAB0         , VWXTAB0         , VWYTAB0
     1,               RHOUL           , VWXUL           , VWYUL
     1,               RHOLL           , VWXLL           , VWYLL
     1,               RHOPCT          , VWXPCT          , VWYPCT
     1,               COSTVX          , COSTVY          , COSTVZ
     1,               LAYER, LVX, LVY, LVZ
     1,               RHOSTEP, VWXSTEP, VWYSTEP, RHOMIN
     1,               VWXH0, VWXA0, VWXH1, VWXA1
     1,               VWYH0, VWYA0, VWYH1, VWYA1
     1,               KXER, KVXER, KAXER
     1,               KYER, KVYER, KAYER
     1,               KZER, KVZER, KAZER, KRGER, KRRER
     1,               ISEED

DATA OPTION, RADFLG / 2 , 2 /

DATA ICOFILE, ICFILE, TMPFILE / 'ICO', 'IC', 'TMP' /

DATA LAYER / 1000. /

DATA (RHOTAB0(I),I=1,20)
     1/ 1.2245, 1.1095, 1.0051, 0.9082, 0.8184
     1, 0.7357, 0.6559, 0.5872, 0.5218, 0.4656
     1, 0.4112, 0.3616, 0.3118, 0.2629, 0.2259
     1, 0.1929, 0.1640, 0.1423, 0.1206, 0.1029
     1/

DATA VWXH0, VWXA0, VWXH1, VWXA1 / 2200., 10., 5100., 20. /

DATA VWYH0, VWYA0, VWYH1, VWYA1 / 2300.,  5., 3800., 15. /

DATA LVX, LVY, LVZ / 1., 1., 1. /

DATA IMAX, JMAX, KMAX / 50, 20, 20 /
```

```
    DATA (RHOUL(I),I=1,20)
      1/   1.3000, 1.2000, 1.1000, 1.0000, 0.9000
      1,   0.8000, 0.7500, 0.7000, 0.6000, 0.8000
      1,   0.8000, 0.8000, 0.8000, 0.8000, 0.8000
      1,   0.8000, 0.8000, 0.8000, 0.8000, 0.8000
      1/

DATA (RHOLL(I),I=1,20)
      1/   1.1000, 1.0000, 0.9000, 0.8000, 0.7000
      1,   0.6000, 0.5500, 0.5000, 0.4000, 0.4000
      1,   0.2000, 0.2000, 0.2000, 0.2000, 0.2000
      1,   0.0500, 0.0500, 0.0500, 0.0500, 0.0500
      1/

DATA (VWXUL(I),I=1,20)   / 20*25. /

DATA (VWXLL(I),I=1,20)   / 20*  0. /

DATA (VWYUL(I),I=1,20)   / 20*20. /

DATA (VWYLL(I),I=1,20)   / 20*  0. /

DATA COSTVZTHSL / 0.1 /

DATA KXER, KVXER, KAXER  / 0.05, 10.,  0. /
    DATA KYER, KVYER, KAYER  / 0.05, 10.,  0. /
    DATA KZER, KVZER, KAZER  / 0.01, 0.2,  0. /
    DATA KRGER, KRRER        / 0.,   0.        /
```

File: TAR_MAIN18.FOR

```
PROGRAM TAR_MAIN18                              ! 02-MAY-1990
C*****************************************************************************
C
C MAIN PROGRAM FOR TRAJECTORY ANALYSIS RADAR (TAR).
C
C OPTION  =(1)              RUN OPTIMIZATION
C         = 2               RUN NOMINAL AND FINAL(s) ONLY
C         = 3               RUN PARAMETER GRID IN ONE LAYER
C
C RUNFLG  = 1               RUN NOMINAL TRAJECTORY, SAVE NOM VARIABLES
C         = 2               RUN SPECIFIC LAYERS FOR ESTIMATION OR GRID
C         = 3               RUN COMPLETE TRAJECTORY WITH BEST ESTIMATE
C         = 4               RUN CLOSED-LOOP ESTIMATION
C
C RADFLG  = 0 or (1)        NO RADAR RANDOM NOISE
C         = 2               RANDOM NOISE ACTIVATED
C
C THIS PROGRAM CONTROLS 'TAR_SIM.CSL' ACSL DYNAMIC SIMULATION PROGRAM:
C
C    - SPECIFY A 'ZZCOM' ICFILE TO INITIALIZE ACSL RUN
C    - DETERMINE RUN PARAMETERS (EG, WIND AND RHO PROFILES)
C    - SET RUN PARAMETERS THRU SET_ACSL_PARAM SUBROUTINE
C    - RUN ACSL (CALL ZZSIML) WITH THOSE SET PARAMETERS
C    - RETRIEVE DATA FROM ACSL THRU GET_ACSL_PARAM SUBROUTINE
C
C PARAMETERS PASSED TO TAR_SIM BEFORE EACH RUN (SET_ACSL_PARAM):
C
C RUNFLG              AFFECT TERMT AND DATA LOGGING IN ACSL RUN
C RADFLG, RNSEED      RANDOM NOISE ACTIVATION AND SEED
C NLAYER              NUMBER OF ATMOSPHERIC LAYERS TO BE RUN
C LAYER               SIZE (IN METERS) OF EACH ATMOSPHERIC LAYER
C RHOTAB              BREAKPOINT TABLE FOR DYNAMIC PRESSURE RHO
C VWXTAB              BREAKPOINT TABLE FOR WIND IN GUN PLANE
C VWYTAB              BREAKPOINT TABLE FOR WIND NORMAL TO GUN PLANE
C LVX, LVY, LVZ       WEIGHTS OF VELOCITY ERRORS IN COST FUNCTIONS
C
C PARAMETERS RETRIEVED FROM TAR_SIM AFTER EACH RUN (GET_ACSL_PARAM):
C
C MLAYER              LAYER INDEX OF (NOMINAL RUN) APEX
C COSTVX              RMS OF X-AXIS ERROR (POS AND VEL), PER LAYER
C COSTVY              RMS OF Y-AXIS ERROR (POS AND VEL), PER LAYER
C COSTVZ              RMS OF Z-AXIS ERROR (POS AND VEL), PER LAYER
C NCOST               POINTS PER LAYER USED IN COST CALCULATION
C
C KEY ESTIMATION PARAMETERS DISPLAYED:
C
```

```
C  RHOPCT                          PERCENT ERROR IN RHO
C  VWXPCT                          PERCENT ERROR IN VWX
C  VWYPCT                          PERCENT ERROR IN VWY
C  DIMPAC                          HORIZONTAL RANGE ERROR AT GROUND IMPACT
C
C  CONSTRAINTS ON PARAMETER SPACE ARE:
C
C  RHOUL, RHOLL
C  VWXUL, VWXLL
C  VWYUL, VWYLL
C
C  NOMINAL WIND BREAKPOINTS COMPUTED FROM A SMOOTH CURVE:
C
C  VWXH0, VWXA0            WIND X:  A0 IS CST WIND AMPLITUDE BELOW ALT H0,
C  VWXH1, VWXA1
C
C  VWYH0, VWYA0            WIND Y:  A0 IS CST WIND AMPLITUDE BELOW ALT H0,
C  VWYH1, VWYA1
C
C*********************************************************************

C*********************************************************************
C
C  IMPORTANT ATMOSPHERIC LAYER INDEXES AND TERMINOLOGIES:
C
C  VARIABLE        SOURCE              DEFINITION
C  --------        ------              ----------
C
C  LAYER           TAR_MAIN            SIZE OF EACH LAYER IN METERS
C  MLAYER          TAR_SIM             LAYER OF (NOMINAL RUN) APEX
C  SLAYER          TAR_MAIN            STARTING LAYER INDEX (1-MLAYER) FOR SIM
C
C  ICFILE          TAR_MAIN            ZZCOM FILE TO START @ LAYER 1
C  TMPFILE         TAR_MAIN            ZZCOM FILE TO START @ LAYER "SLAYER"
C  NEWRUN          Arg to RUN_ACSL     REGENERATE 'TMPFILE' TO RUN @ "SLAYER"
C
C  ILAYER          TAR_MAIN            CURRENT LAYER INDEX (1-MLAYER)
C  KLAYER          TAR_MAIN            ILAYER + 1, INDEX TO MET TABLES
C
C*********************************************************************

IMPLICIT NONE
      INCLUDE 'TAR_COM18.FOR'

C---------------------------------------------------------------------
C------ Initialize ACSL
C---------------------------------------------------------------------

CALL ZZDLOC
      RUNFLG = 1         ! Always run Nominal first

C---------------------------------------------------------------------
C------ User defined run parameters
C---------------------------------------------------------------------

100     CALL GET_USER_PARAM

C*********************************************************************
C------ Perform Nominal Run first time (RUNFLG=1) only
C*********************************************************************

IF (RUNFLG.EQ.1) THEN

PRINT 501
  501       FORMAT(1X,70('-'),/,1X,'Nominal run',/,1X,70('-'))
        CALL RUN_ACSL(0)              ! Load Param/Run ACSL/Get MLAYER, ...

END IF

GOTO (1000, 2000, 3000) OPTION

C*********************************************************************
C------ Run Optimization/Parameter Estimate if OPTION = 1
C*********************************************************************

1000     PRINT    502
  502      FORMAT(1X,70('-'),/,1X,'Estimation Run',/,1X,70('-'))
```

```
C----------------------------------------------------------------
C------    Run 3-axis closed-loop estimation of rho and wind
C----------------------------------------------------------------

RUNFLG = 4
      IMAX   = 2

C------ Number of iterations in DO loop

PRINT    *, ' Change number of iterations IMAX ? ', IMAX
      READ(5,*) IMAX

C------ Guess of rho

PRINT    *,' Enter first guess of RHOTAB ?'
      PRINT  10, 'RHOTAB   =', (RHOTAB (I),I=1,20)      ! Current Estimate
      READ(5,*)  (RHOTAB(I),I=1,20)

C------ Guess of wind

PRINT.   *,' Enter first guess of VWXTAB and VWYTAB ?'
      PRINT  10, 'VWXTAB   =', (VWXTAB (I),I=1,20)      ! Current Estimate
      READ(5,*)  (VWXTAB(I),I=1,20)
      PRINT  10, 'VWYTAB   =', (VWYTAB (I),I=1,20)      ! Current Estimate
      READ(5,*)  (VWYTAB(I),I=1,20)

10        FORMAT(1X,A11,3X,10(F5.2,1X),:,2(/15X,10(F5.2,1X)))

C------ Perform 1st closed-loop run

I = 1
      PRINT 511, I
511       FORMAT(1X,70('-'),/,1X,'Iteration ',I)

CALL RUN_ACSL(0)              ! Load Param/Run ACSL/Get Cost Function

C------ Perform remaining runs

DO I = 2, IMAX                ! Maximum number of iterations
         PRINT 511, I
         CALL RUN_ACSL(1)           ! Load Param/Run ACSL/Get Cost Function
      END DO C*****************************************************************
C------ Run Final(s)
C*****************************************************************

2000      PRINT    503
503       FORMAT(1X,70('-'),/,1X,'Final Run',/,1X,70('-'))

RUNFLG = 3

C 2050    CALL SET METS
      CALL RUN_ACSL(0)

C GOTO 2050                    ! Select METS again

PRINT *, ' TAR> Rerun nominal ? (1:yes, 0:no) : '
      READ(5,*) I

IF (I.EQ.1) THEN
         CALL ZZSVRS2(0, ICOFILE)   ! restore startup values
         RUNFLG = 1
      ELSE
         CALL ZZSVRS2(0, ICFILE)    ! restart estimation from clean TMPFILE
         CALL ZZSVRS2(1, TMPFILE)
      END IF CALL GET_ACSL_PARAM (
     1       MLAYER    , COSTVX  , COSTVY   , COSTVZ   , NCOST
     1,      KXER      , KVXER   , KAXER    , KYER     , KVYER
     1,      KAYER     , KZER    , KVZER    , KAZER    , KRGER
     1,      KRRER     , RHOTAB  , VWXTAB   , VWYTAB   )

GOTO 100

C*****************************************************************
C------ Run KLAYER layer grid if OPTION = 3n, n = KLAYER
C*****************************************************************
```

```
3000    PRINT   * , ' TAR> Grid Run ......... '
        WRITE(40,*), ' TAR> Grid Run ......... '
        RUNFLG = 2

C------ First, Re-generate TMPFILE up to SLAYER

PRINT   * , ' TAR> Which layer to run grid ? '
        READ(5,*) ILAYER

PRINT   * , ' TAR> Generating TMPFILE to start @ layer ', SLAYER
        WRITE(40,*), ' TAR> Generating TMPFILE to start @ layer ', SLAYER PRINT   81 , ' Change RHOTAB = ', (RHOTAB(I),I=1,ILAYER)
        READ(5,*) (RHOTAB(I),I=1,ILAYER)

PRINT   81 , ' Change VWXTAB = ', (VWXTAB(I),I=1,ILAYER)
        READ(5,*) (VWXTAB(I),I=1,ILAYER)

PRINT   81 , ' Change VWYTAB = ', (VWYTAB(I),I=1,ILAYER)
        READ(5,*) (VWYTAB(I),I=1,ILAYER)

81      FORMAT(/A18,<ILAYER>F10.3,' ?')

SLAYER = 1                      ! Start @ layer 1
        NLAYER = ILAYER - 1             ! Run up to SLAYER
        CALL RUN_ACSL(1)                ! Generate TMPFILE C------ Grid run at layer SLAYER

SLAYER = ILAYER
        KLAYER = ILAYER + 1
        NLAYER = 1

PRINT  91, IMAX, JMAX, KMAX
        READ(5,*)  IMAX, JMAX, KMAX
91      FORMAT(/1X,'TAR> Enter IMAX, JMAX, KMAX for Grid Run :',3I5)

PRINT  92, RHOSTEP, VWXSTEP, VWYSTEP
        READ(5,*)  RHOSTEP, VWXSTEP, VWYSTEP
92      FORMAT(/1X,'TAR> Enter RHOSTEP, VWXSTEP, VWYSTEP :',3F10.3)

PRINT  93, RHOLL(KLAYER), VWXLL(KLAYER), VWYLL(KLAYER), KLAYER
        READ(5,*)  RHOLL(KLAYER), VWXLL(KLAYER), VWYLL(KLAYER)
93      FORMAT(/1X,'TAR> Enter RHOLL, VWXLL, VWYLL        :',3F10.3)

DO 3200 I = 0, IMAX-1
        DO 3200 J = 0, JMAX-1
        DO 3200 K = 0, KMAX-1

IF (IMAX.GT.1) RHOTAB(KLAYER) = RHOLL(KLAYER) + RHOSTEP*I
        IF (JMAX.GT.1) VWXTAB(KLAYER) = VWXLL(KLAYER) + VWXSTEP*J
        IF (KMAX.GT.1) VWYTAB(KLAYER) = VWYLL(KLAYER) + VWYSTEP*K

CALL RUN_ACSL(0)    ! Load Param/Run ACSL/Get Cost Function
        CALL PRNT_COST(4)   ! Print results of grid run

3200    CONTINUE

GOTO 100            ! Select OPTION again

END

SUBROUTINE RUN_ACSL(NEWRUN)

C***********************************************************************
C
C SUBROUTINE TO INTERFACE WITH ACSL DYNAMIC SIMULATION TAR_SIM PROGRAM:
C
C - PERFORM AN 'ACSL> RESTORE' FILE (STARTING POINT)
C - LOAD RELEVANT OPTIMIZATION PARAMETERS
C - RUN ACSL
C - RETRIEVE COST FUNCTION DATA FROM ACSL RUN
C
C TWO WAYS TO CHANGE ACSL PARAMETERS PRIOR TO A RUN:
C
C - INTERACTIVE THRU ACSL, ONLY FOR 1ST RUN AND SENSITIVITY RUNS
C - METS PARAMETERS THRU SET_ACSL_PARAM
C
C PARAMETER NEWRUN:
C
C       0:      NO ZZCOM FILE SAVED
C       1:      ZZCOM SAVED INTO TMPFILE
C
C***********************************************************************
```

```fortran
      IMPLICIT NONE
      INCLUDE 'TAR_COM18.FOR'
      INTEGER  NEWRUN
      CHARACTER*10 FILE
      INTEGER ICORRECT/1/, NBFMAX/1600/
      LOGICAL CLMET/.FALSE./
      REAL TSTP/-35./

C----------------------------------------------------------------------
C------    ZZCOM File handling prior to run ACSL
C----------------------------------------------------------------------

C------ RUNFLG=1:  Allow user to make parameter changes directly in ACSL

IF (RUNFLG.EQ.1) THEN
         CLMET = .FALSE.
      END IF

C------ RUNFLG=2:  Restore TMPFILE file

IF (RUNFLG.EQ.2) THEN
            FILE = TMPFILE
            IF (ILAYER.EQ.1) FILE=ICFILE
         CALL ZZSVRS2(0, FILE)          ! Restor file
      END IF C------  RUNFLG=3:  Restore ICFILE file, allow temporary ACSL changes IF (RUNFLG.EQ.3) THEN
         IF (CLMET) THEN
            FILE  = TMPFILE
            TSTP  = 200.
            CLMET = .FALSE.
         ELSE
            FILE = ICFILE
         END IF
         CALL ZZSVRS2(0, FILE)          ! Equ to ACSL> RESTOR 'ICFILE'
      END IF C------  RUNFLG=4:  Restore TMPFILE file, allow temporary ACSL changes IF (RUNFLG.EQ.4) THEN
         CLMET = .TRUE.
C        IF (NEWRUN.EQ.0) THEN
C           PRINT *, ' TAR> Enter TSTP for closed-loop runs:', TSTP
C           READ(5,*) TSTP
C        END IF
         FILE = TMPFILE
         CALL ZZSVRS2(0, FILE)          ! Equ to ACSL> RESTOR 'TMPFILE'
      END IF C----------------------------------------------------------------------
C------ Load MET param into ZZCOM / Run ACSL / Get Cost Function Data from
C----------------------------------------------------------------------

CALL SET_ACSL_PARAM (
     1        RUNFLG   , RADFLG   , RNSEED   , NLAYER   , RHOTAB
     1,       VWXTAB   , VWYTAB   , LVX      , LVY      , LVZ
     1,       VWXH0    , VWXA0    , VWXH1    , VWXA1    , VWYH0
     1,       VWYA0    , VWYH1    , VWYA1    , CLMET    , TSTP
     1,       KXER     , KVXER    , KAXER    , KYER     , KVYER
     1,       KAYER    , KZER     , KVZER    , KAZER    , KRGER
     1,       KRRER    )

IF (RUNFLG.NE.2) CALL ZZEXEC        ! ACSL user interface

IF (RUNFLG.EQ.1) THEN
         CALL ZZSVRS2(1, ICFILE)        ! Equ to ACSL> SAVE 'ICFILE'
         CALL ZZSVRS2(1, ICOFILE)       ! Equ to ACSL> SAVE 'ICOFILE'
         CALL ZZSVRS2(1, TMPFILE)       ! Equ to ACSL> SAVE 'TMPFILE'
      END IF

CALL ZZSIML                       ! Run ACSL dynamic simulation

CALL GET_ACSL_PARAM (
     1        MLAYER   , COSTVX   , COSTVY   , COSTVZ   , NCOST
     1,       KXER     , KVXER    , KAXER    , KYER     , KVYER
     1,       KAYER    , KZER     , KVZER    , KAZER    , KRGER
     1,       KRRER    , RHOTAB   , VWXTAB   , VWYTAB   )

IF (RUNFLG.EQ.1 .OR. RUNFLG.EQ.3) CALL ZZEXEC     ! ACSL user inter
```

```
C------------------------------------------------------------------
C------   ZZCOM File handling after completion of ACSL run
C------------------------------------------------------------------

IF (RUNFLG.EQ.1) THEN
              CALL SAVENOMINAL( ICFILE )   ! Save all xxxNOM arrays into ZZCOM
         ! Make TMPFILE identical to ICFILE
         CALL ZZSVRS2(0, ICFILE)
         CALL ZZSVRS2(1, TMPFILE)
      END IF IF (CLMET) THEN
         CALL SAVECORRECTION( TMPFILE , NBPMAX , NEWRUN )
         CALL GET_ACSL_PARAM (
     1            MLAYER  , COSTVX  , COSTVY  , COSTVZ  , NCOST
     1,           KXER    , KVXER   , KAXER   , KYER    , KVYER
     1,           KAYER   , KZER    , KVZER   , KAZER   , KRGER
     1,           KRRER   , RHOTAB  , VWXTAB  , VWYTAB  )
      ELSE IF (NEWRUN.EQ.0) THEN
         RETURN
      ELSE
         CALL ZZSVRS2(1, TMPFILE)
      END IF

RETURN
      END

SUBROUTINE GET_USER_PARAM

C*********************************************************************
C
C REQUESTS THE FOLLOWING RUN PARAMETERS:
C
C OPTION                          RUN OPTION
C RADFLG, RNSEED                  NOISE OPTION AND SEED FOR RN GEN
C RHOUL, RHOLL                    RHO LIMITS FOR EACH LAYER
C VWXUL, VWXLL                    VWX LIMITS FOR EACH LAYER
C VWYUL, VWYLL                    VWY LIMITS FOR EACH LAYER
C VWXH0, VWXA0                    WIND PROFILE PARAMETERS
C VWXH1, VWXA1                    WIND PROFILE PARAMETERS
C VWYH0, VWYA0                    WIND PROFILE PARAMETERS
C VWYH1, VWYA1                    WIND PROFILE PARAMETERS
C
C THE FOLLOWING PARAMETERS CAN BE CHANGED 1ST TIME ONLY (RUNFLG=1):
C
C LAYER                           ALTITUDE LAYER SIZE
C LVX, LVY, LVZ                   VELOCITY ERROR WEIGHTS IN COST FCTS
C
C*********************************************************************

IMPLICIT NONE
      INCLUDE 'TAR_COM18.FOR'

OPTION = 1
      PRINT   1, OPTION, RADFLG, RNSEED
      READ(5,*)  OPTION, RADFLG, RNSEED

IF (OPTION.EQ.0) STOP
C     IF (RUNFLG.EQ.1) THEN
C     PRINT   5, LAYER, LVX, LVY, LVZ, COSTVZTHSL
C     READ(5,*)  LAYER, LVX, LVY, LVZ, COSTVZTHSL
C     END IF

1     FORMAT(/1X,'OPTION =',I2,5X,'RADFLG =',I2,3X,'RNSEED  ='
     1,    I10,'?')
    5     FORMAT(/1X,'LAYER =',F5.0,2X,'LVX, LVY, LVZ, COSTVZTHSL ='
     1,    3(F5.1,2X),F10.5,'?')

C------ RHO Limits

IF (RUNFLG.EQ.1) THEN
              DO I = 1, 40
                 RHOTAB(I) = RHOTAB0(I)
              END DO
      END IF

C PRINT   *,' Enter RHOUL and RHOLL ?'
C PRINT  10, 'RHOUL    =', (RHOUL  (I),I=1,20)   ! Upper limits
C PRINT  10, 'RHOTAB0  =', (RHOTAB0(I),I=1,20)   ! True RHO
C PRINT  10, 'RHOTAB   =', (RHOTAB (I),I=1,20)   ! Current Estimate
C PRINT  10, 'RHOLL    =', (RHOLL  (I),I=1,20)   ! Lower limits
```

```
C      READ(5,*) (RHOUL  (I),I=1,20)
C      READ(5,*) (RHOLL  (I),I=1,20)
 10           FORMAT(1X,A11,3X,10(F5.2,1X),:,2(/15X,10(F5.2,1X)))

C------ VWX, VWY Nominal and Limits

PRINT 15, VWXH0, VWXA0, VWXH1, VWXA1
       READ(5,*)  VWXH0, VWXA0, VWXH1, VWXA1
       PRINT 16, VWYH0, VWYA0, VWYH1, VWYA1
       READ(5,*)  VWYH0, VWYA0, VWYH1, VWYA1
       CALL GET_WIND_TABLE(RUNFLG-1)

15           FORMAT(/1X,' (VWXH0 VWXA0), (VWXH1 VWXA1) =', 2(F10.0,F7.2),'?')
 16           FORMAT(/1X,' (VWYH0 VWYA0), (VWYH1 VWYA1) =', 2(F10.0,F7.2),'?')

C      PRINT  *,' Enter VWXUL and VWXLL ?'
C      PRINT 10, 'VWXUL    =', (VWXUL  (I),I=1,20)    ! Upper limits
C      PRINT 10, 'VWXTAB0  =', (VWXTAB0(I),I=1,20)    ! True VWX
C      PRINT 10, 'VWXTAB   =', (VWXTAB (I),I=1,20)    ! Current Estimate
C      PRINT 10, 'VWXLL    =', (VWXLL  (I),I=1,20)    ! Lower limits
C      READ(5,*) (VWXUL  (I),I=1,20)
C      READ(5,*) (VWXLL  (I),I=1,20)

C              PRINT *,' Enter VWYUL and VWYLL ?'
C      PRINT 10, 'VWYUL    =', (VWYUL  (I),I=1,20)    ! Upper limits
C      PRINT 10, 'VWYTAB0  =', (VWYTAB0(I),I=1,20)    ! True VWY
C      PRINT 10, 'VWYTAB   =', (VWYTAB (I),I=1,20)    ! Current Estimate
C      PRINT 10, 'VWYLL    =', (VWYLL  (I),I=1,20)    ! Lower limits
C      READ(5,*) (VWYUL  (I),I=1,20)
C      READ(5,*) (VWYLL  (I),I=1,20)

RETURN
       END

SUBROUTINE GET_WIND_TABLE(K)

C*****************************************************************
C
C SUBROUTINE TO COMPUTE BREAKPOINTS FOR VWXTAB AND VWYTAB, BASED ON
C
C - LAYER
C - VWXH0, VWXA0
C - VWXH1, VWYH1
C
C USING polynomial CURVE SHAPE.
C
C IF K=0, LOAD VWXTAB INTO VWXTAB0 AND VWYTAB INTO VWYTAB0.
C
C*****************************************************************

IMPLICIT NONE
       INCLUDE 'TAR_COM18.FOR'
       REAL ALT, DA, DH

C------ VWXTAB

DA   = VWXA1 - VWXA0

DO I=1,20                ! Loop on Breakpoints

ALT = LAYER*(I-1)                     ! Altitude at breakpoint
          DH  = (ALT-VWXH0)/(VWXH1-VWXH0)
          IF (ALT.LT.VWXH0) THEN
             VWXTAB(I)=VWXA0                    ! Constant wind below H0
          ELSE IF (ALT.GT.VWXH1) THEN
             VWXTAB(I)=VWXA1                    ! Constant wind above H1
          ELSE
             VWXTAB(I)=VWXA0 + 3*DA*(DH)**2 - 2*DA*(DH)**3
          END IF IF (K.EQ.0) VWXTAB0(I) = VWXTAB(I)  ! True wind parameters

END DO

C------ VWYTAB

DA   = VWYA1 - VWYA0

DO I=1,20                ! Loop on Breakpoints
```

```fortran
        ALT = LAYER*(I-1)                       ! Altitude at breakpoint
           DH  = (ALT-VWYH0)/(VWYH1-VWYH0)
        IF (ALT.LT.VWYH0) THEN
              VWYTAB(I)=VWYA0                   ! Constant wind below H0
        ELSE IF (ALT.GT.VWYH1) THEN
              VWYTAB(I)=VWYA1                   ! Constant wind above H1
        ELSE
           VWYTAB(I)=VWYA0 + 3*DA*(DH)**2 - 2*DA*(DH)**3
        END IF IF (K.EQ.0) VWYTAB0(I) = VWYTAB(I)   ! True wind

END DO

RETURN
     END

SUBROUTINE PRNT_COST(K)

C***********************************************************************
C
C  SUBROUTINE TO PRINT RESULTS AT LAYER "KLAYER"
C
C***********************************************************************

IMPLICIT NONE
     INCLUDE 'TAR_COM18.FOR'

I = KLAYER       ! Index to table

RHOPCT(I) = (RHOTAB(I)-RHOTAB0(I))/RHOTAB0(I)
     VWXPCT(I) = (VWXTAB(I)-VWXTAB0(I))/VWXTAB0(I)
     VWYPCT(I) = (VWYTAB(I)-VWYTAB0(I))/VWYTAB0(I)

GOTO (100, 200, 300, 400) K

100      PRINT     991 , K, ILAYER, RHOPCT(I), SQRT(COSTVZ(ILAYER))
     WRITE(40,991), K, ILAYER, RHOPCT(I), SQRT(COSTVZ(ILAYER))
     RETURN

200      PRINT     991 , K, ILAYER, VWXPCT(I), SQRT(COSTVX(ILAYER))
     WRITE(40,991), K, ILAYER, VWXPCT(I), SQRT(COSTVX(ILAYER))
     RETURN

300      PRINT     991 , K, ILAYER, VWYPCT(I), SQRT(COSTVY(ILAYER))
     WRITE(40,991), K, ILAYER, VWYPCT(I), SQRT(COSTVY(ILAYER))
     RETURN

400      PRINT     995 , K, ILAYER
     1,               RHOPCT(I), SQRT(COSTVZ(ILAYER))
     1,               VWXPCT(I), SQRT(COSTVX(ILAYER))
     1,               VWYPCT(I), SQRT(COSTVY(ILAYER))

991      FORMAT(I2,I4,4X,2F10.3,';')
995      FORMAT(I2,I4,4X,6F10.3,';')

RETURN
     END

SUBROUTINE SET_METS

C***********************************************************************
C
C  THIS SUBROUTINE ALLOWS CHANGE TO MET PARAMETERS FOR COMPARISON
C  RUN TO NOMINAL
C
C***********************************************************************

IMPLICIT NONE
     INCLUDE 'TAR_COM18.FOR'
     INTEGER IANS

PRINT *, ' MODIFY WIND PARAM (0) OR TAB (1) '
     READ(5,*) IANS

C------ Wind

IF (IANS.EQ.1) GOTO 100
```

```fortran
1       FORMAT(/A45,2(F8.1,2X,F5.2))

PRINT 1, ' TAR> MODIFY (VWXH0 VWXA0), (VWXH1 VWXA1) ? '
  1    1, VWXH0, VWXA0, VWXH1, VWXA1

READ(5,*) VWXH0, VWXA0, VWXH1, VWXA1

PRINT 1, ' TAR> MODIFY (VWYH0 VWYA0), (VWYH1 VWYA1) ? '
  1    1, VWYH0, VWYA0, VWYH1, VWYA1

READ(5,*) VWYH0, VWYA0, VWYH1, VWYA1

CALL GET_WIND_TABLE(1)
   GOTO 200

C------
  2       FORMAT(/A20,10F5.2,:,2(/20X,10(F5.2,1X)))

100       PRINT 2, ' TAR> VWX = ? ',(VWXTAB(I),I=1,20)
   READ(5,*)  (VWXTAB(I),I=1,20)

PRINT 2, ' TAR> VWY = ?',(VWYTAB(I),I=1,20)
   READ(5,*)  (VWYTAB(I),I=1,20)

C------ Change RHO

200       PRINT 2, ' TAR> RHO = ?',(RHOTAB(I),I=1,20)
   READ(5,*)  (RHOTAB(I),I=1,20)

RETURN
   END
C***********************************************************************

C***********************************************************************
C
C       REAL FUNCTION FLNEAR( NBPMAX, NBP , TAB , INP )
C
C       NBPMAX : maximum number of breakpoints
C       NBP    : current number of breakpoints
C       TAB    : table of breakpoints
C                TAB(1:NBPMAX)            : values of dependent variable
C                TAB(NBPMAX+1:2*NBPMAX)   : values of independent variable
C       INP    : input value of independent variable
C       The output is the dependent variable value corresponding to INP.
C
C***********************************************************************

IMPLICIT NONE
   REAL TAB(*), INP
   INTEGER NBPMAX, NBP, I

C---- Interpolate/extrapolate using the first slope

IF (INP.LE.TAB(NBPMAX+2)) THEN
       FLNEAR = TAB(1) + (INP-TAB(NBPMAX+1)) * (TAB(2)-TAB(1))
  .                    / (TAB(NBPMAX+2)-TAB(NBPMAX+1))
       RETURN
   END IF

C---- Find index of independent variable value greater than input value

DO I = 3 , NBP-1
       IF (INP.LE.TAB(NBPMAX+I)) GOTO 100
   END DO

C---- Interpolate (extrapolation using last slope for input values
C---- larger than last breakpoint value)

100 CONTINUE
   FLNEAR = TAB(I-1) + (INP-TAB(NBPMAX+I-1)) * (TAB(I)-TAB(I-1))
  .                  / (TAB(NBPMAX+I)-TAB(NBPMAX+I-1))

RETURN
   END
C***********************************************************************
```

```fortran
C*******************************************************************************
C
      SUBROUTINE LSQ_POLY2( C , A , B , N )
C
C This routine computes the coefficients of the quadratic polynomial
C solution of a least square approximation of the specified data
C points (Ai,Bi).
C
C Output:
C
C C[3]   = vector of polynomial coefficients
C                poly(a) = C(3) + C(2)*a + C(1)*a**2
C
C Inputs:
C
C A[N]   : vector of values of independent variable
C
C B[N]   : vector of values of dependent variable
C
C N      : number of data points
C
C*******************************************************************************

IMPLICIT NONE

INTEGER N
      REAL C(3), A(N), B(N)

REAL AMAT(3,3), BMAT(3), AMAT_INV(3,3), DET_AMAT
      INTEGER I, K

C-------------------------------------------------------------------------------
C------ Compute AMAT
C-------------------------------------------------------------------------------

C------ Compute 1st column of AMAT

DO K = 1 , 3
         AMAT(K,1) = 0.0
         DO I = 1 , N
            AMAT(K,1) = AMAT(K,1) + A(I)**(5-K)
         END DO ! I
      END DO ! K

C------ Compute 2nd column of AMAT

AMAT(1,2) = AMAT(2,1)
      AMAT(2,2) = AMAT(3,1)
      AMAT(3,2) = 0.0
      DO I = 1 , N
         AMAT(3,2) = AMAT(3,2) + A(I)
      END DO ! I

C------ Compute last column of AMAT

AMAT(1,3) = AMAT(2,2)
      AMAT(2,3) = AMAT(3,2)
      AMAT(3,3) = N

C-------------------------------------------------------------------------------
C------ Compute BMAT
C-------------------------------------------------------------------------------

BMAT(1) = 0.0
      BMAT(2) = 0.0
      BMAT(3) = 0.0
      DO I = 1 , N
         BMAT(1) = BMAT(1) + B(I)*A(I)**2
         BMAT(2) = BMAT(2) + B(I)*A(I)
         BMAT(3) = BMAT(3) + B(I)
      END DO ! I

C-------------------------------------------------------------------------------
C------ Invert AMAT
C-------------------------------------------------------------------------------

CALL INVERT3BY3( AMAT , AMAT_INV , DET_AMAT )

C-------------------------------------------------------------------------------
C------ Compute polynomial coefficients
C-------------------------------------------------------------------------------
```

```
      DO I = 1 , 3
         C(I) = 0.0
         DO K = 1 , 3
            C(I) = C(I) + AMAT_INV(I,K)*BMAT(K)
         END DO ! K
      END DO ! I

RETURN
      END
C*******************************************************************************

C*******************************************************************************
C
      SUBROUTINE INVERT3BY3( A , A_INV , DET_A )
C
C This routine inverts a 3x3 matrix A and returns:
C - A_INV, the matrix inverse of A
C - DET_A, the determinant of A; DET_A is set to zero if A is almost
C   singular.
C
C*******************************************************************************

IMPLICIT NONE

REAL A(3,3), A_INV(3,3), DET_A
      REAL*8 D_A(3,3), D_DET_A
      REAL*8 COF(3,3), EPSILON/1.D-20/
      INTEGER I, J

C------ Transfer matrix A into work array

DO I = 1 , 3
      DO J = 1 , 3
         D_A(I,J) = A(I,J)
      END DO
      END DO

C------ Compute determinant of A

D_DET_A =   D_A(1,1)*D_A(2,2)*D_A(3,3)
     1          + D_A(2,1)*D_A(3,2)*D_A(1,3)
     1          + D_A(1,2)*D_A(2,3)*D_A(3,1)
     1          - D_A(3,1)*D_A(2,2)*D_A(1,3)
     1          - D_A(2,1)*D_A(1,2)*D_A(3,3)
     1          - D_A(3,2)*D_A(2,3)*D_A(1,1)

DET_A   = D_DET_A

C------ Test for singularity

IF (ABS(D_DET_A).LE.EPSILON) THEN
         DET_A = 0.0
         RETURN
      END IF

C------ Compute the matrix of cofactors of A

COF(1,1) =   D_A(2,2)*D_A(3,3) - D_A(3,2)*D_A(2,3)
      COF(2,1) = - D_A(1,2)*D_A(3,3) + D_A(3,2)*D_A(1,3)
      COF(3,1) =   D_A(1,2)*D_A(2,3) - D_A(2,2)*D_A(1,3)
      COF(1,2) = - D_A(2,1)*D_A(3,3) + D_A(3,1)*D_A(2,3)
      COF(2,2) =   D_A(1,1)*D_A(3,3) - D_A(3,1)*D_A(1,3)
      COF(3,2) = - D_A(1,1)*D_A(2,3) + D_A(2,1)*D_A(1,3)

COF(1,3) =   D_A(2,1)*D_A(3,2) - D_A(3,1)*D_A(2,2)
      COF(2,3) = - D_A(1,1)*D_A(3,2) + D_A(3,1)*D_A(1,2)
      COF(3,3) =   D_A(1,1)*D_A(2,2) - D_A(2,1)*D_A(1,2)

C------ Compute the matrix inverse of A

DO I = 1 , 3
      DO J = 1 , 3
         A_INV(I,J) = COF(J,I)/D_DET_A
      END DO
      END DO

RETURN
      END
C*******************************************************************************
```

```
C****************************************************************************
C
      SUBROUTINE PLOTSMOOTHED( SMOOTHED, X, Y, N)
C
C Inputs:
C
C SMOOTHED : smoothed dependent variable (dim N)
C X        : independent variable (dim N)
C Y        : dependent variable before smoothing (dim N)
C
C****************************************************************************

INCLUDE 'COMPLOT'

INTEGER N
      REAL SMOOTHED(*), X(*), Y(*)
      DATA DATLEN/1600/

NAME(115) = 'XSMOOTH'
      NAME(116) = 'YSMOOTH'
      NAME(117) = 'YNONSM'

DO I = 1 , N
         CALL SAVEDATA( X(I)       , DATLEN, I, 115)
         CALL SAVEDATA( SMOOTHED(I), DATLEN, I, 116)
         CALL SAVEDATA( Y(I)       , DATLEN, I, 117)
      END DO ! I

CALL PLOTROUTINE

RETURN
      END
C****************************************************************************

C****************************************************************************
C
      SUBROUTINE MOV_AVERAGE( Y1, Y0, N, WP, P)
C
C This routine compute the sequence Y1 as follows:
C
C Y0(i), i=1,N : input sequence
C W(j), j=1,M  : weights
C
C Y1(1) = sum{ Y0(j)*W(j) , j=1,3 } / sum{ W(k), k=1,3 }
C Y1(N) = sum{ Y0(N-j+1)*W(j) , j=1,3 } / sum{ W(k), k=1,3 }
C
C Y1(i) = [ Y0(i)*WP(i) + sum{ Y0(i-j+1)*W(j) , j=2,min(P,i-1) }
C         + sum{ Y0(i+j-1)*W(j) , j=2,min(P,N-i+1) } ] /
C         [ WP(1) +  sum{ W(k), k=2,min(P,i-1) }
C         + sum{ W(k), k=2,min(P,N-i+1) } ]        for 2 =< i =< N-1
C
C****************************************************************************

IMPLICIT NONE

INTEGER N, P
      REAL Y0(N), Y1(N), WP(P)

INTEGER I, J
      REAL W0, W1

C------ Initialize output sequence

DO I = 1 , N
         Y1(I) = 0.0
      END DO

C------ Compute sum of weights

W0 = 0.0
      DO J = 1 , P
         WP(J) = ABS(WP(J))
         W0    = W0 + WP(J)
      END DO
      IF (W0.EQ.0.0) RETURN

C------ Compute output sequence Y1

Y1(1) = 0.0
```

```
      Y1(N) = 0.0
      W1    = 0.0
      DO J = 1 , 3
         Y1(1) = Y1(1) + Y0(J)*WP(J)
         Y1(N) = Y1(N) + Y0(N-J+1)*WP(J)
         W1    = W1 + WP(J)
      END DO
      IF (W1.NE.0.0) THEN
         Y1(1) = Y1(1) / W1
         Y1(N) = Y1(N) / W1
      END IF

DO I = 2 , N-1
         Y1(I) = Y0(I)*WP(1)
         W1    = WP(1)
         DO J = 2 , MIN(P,I-1)
            Y1(I) = Y1(I) + Y0(I-J+1)*WP(J)
            W1    = W1 + WP(J)
         END DO
         DO J = 2 , MIN(P,N-I+1)
            Y1(I) = Y1(I) + Y0(I+J-1)*WP(J)
            W1    = W1 + WP(J)
         END DO
         IF (W1.NE.0.0) Y1(I) = Y1(I) / W1
      END DO

RETURN
      END
C*****************************************************************

C*****************************************************************
C
      SUBROUTINE RADARSET( PROJ_DIAM, KSEED, SETFLAG)
C
C This routine calculates:
C - the range resolution,
C - the radial velocity resolution due to FFT,
C - and the free space S/N at a standartd range of one nautical mile.
C
C*****************************************************************

INCLUDE 'RADAR_COM18.FOR'
      INTEGER KSEED, SETFLAG
      REAL TRF, PRF, DF
      REAL PROJ_DIAM, AG

C------ Store argument values into common block

PROJ_DIAMETER = PROJ_DIAM
      ISEED = KSEED

C------ Ask user radar settings

IF (SETFLAG.EQ.1) THEN

PRINT *, ' WEATHER 0 (clear) 1 (rain) : ', WEATHER
         PRINT *, ' WAVE LENGTH    (m)         : ', WAVE_LENGTH
         PRINT *, ' RECEIVER FREQ  (Hz)        : ', RECEIVER_FREQ
         PRINT *, ' RADAR POWER    (W)         : ', RADAR_POWER
         PRINT *, ' ANTENNA GAIN   (dB)        : ', ANTENNA_GAIN
         PRINT *, ' NOISE FIGURE   (dB)        : ', NOISE_FIGURE
         PRINT *, ' TOTAL LOSSES   (dB)        : ', TOTAL_LOSSES
         PRINT *, ' FFT LENGTH                 : ', FFT_LENGTH READ(5,*) WEATHER,    WAVE_LENGTH,  RECEIVER_FREQ
     .,            RADAR_POWER, ANTENNA_GAIN, NOISE_FIGURE
     .,            TOTAL_LOSSES, FFT_LENGTH

SETFLAG = 0

END IF

C------ Compute beamwidths assuming they are equal in azimuth and elevation

AG = 10.**(0.1*ANTENNA_GAIN)
      AZIM_BEAMWIDTH = SQRT( 27000./AG ) * DEG2RAD
      ELEV_BEAMWIDTH = AZIM_BEAMWIDTH

C------ Compute range resolution

RANGE_RES = 150.E6 / RECEIVER_FREQ
```

```
C------ Compute radial velocity (range rate) resolution (for 20% duty cycle

TRF = 5.E6 / RECEIVER_FREQ
   PRF = 1.E6 / TRF
   DF  = PRF / FFT_LENGTH

RRATE_RES = 0.5 * WAVE_LENGTH * DF

C PRINT *, ' DF ', DF, '    DV ', RRATE_RES

C------- Compute maximum radar cross section

SECTION  = 0.25 * PI * PROJ_DIAMETER**2
   RCSMAX   = 0.4 * PI * SECTION**2 / WAVE_LENGTH**2
   RCSMAXDB = 10. * ALOG10(RCSMAX)

C------ Compute free space S/N ratio at 1 nautical mile range for maximum F

STN_0 = 10. * ALOG10(RADAR_POWER) + 2. * ANTENNA_GAIN
   .      + 20. * ALOG10(WAVE_LENGTH*100.) + RCSMAXDB
   .      - 10. * ALOG10(RECEIVER_FREQ*1.E-6) - 60. - NOISE_FIGURE
   .      - TOTAL_LOSSES + 10. * ALOG10(FFT_LENGTH)

C PRINT *, ' RCSMAXDB ', RCSMAXDB !!
C PRINT *, ' STN_0    ', STN_0    !!

C------ Save values for display

CALL SAVEINFO( 31
   ., WEATHER,      WAVE_LENGTH,   RECEIVER_FREQ
   ., RADAR_POWER,  ANTENNA_GAIN,  NOISE_FIGURE
   ., TOTAL_LOSSES, FFT_LENGTH,    ELEV_BEAMWIDTH
   ., AZIM_BEAMWIDTH )

CALL INFONAMES

C------ Identify frequency band

IF ( WAVE_LENGTH.LE.LIGHTSPEED/KA_BAND(1) .AND.
   .     WAVE_LENGTH.GT.LIGHTSPEED/KA_BAND(2) ) THEN
       PRINT *, 'KA BAND, wavelength = ', WAVE_LENGTH
   ELSE IF ( WAVE_LENGTH.LE.LIGHTSPEED/K_BAND(1) .AND.
   .     WAVE_LENGTH.GT.LIGHTSPEED/K_BAND(2) ) THEN
       PRINT *, 'K BAND, wavelength = ', WAVE_LENGTH
   ELSE IF ( WAVE_LENGTH.LE.LIGHTSPEED/KU_BAND(1) .AND.
   .     WAVE_LENGTH.GT.LIGHTSPEED/KU_BAND(2) ) THEN
       PRINT *, 'KU BAND, wavelength = ', WAVE_LENGTH
   ELSE IF ( WAVE_LENGTH.LE.LIGHTSPEED/X_BAND(1) .AND.
   .     WAVE_LENGTH.GT.LIGHTSPEED/X_BAND(2) ) THEN
       PRINT *, 'X BAND, wavelength = ', WAVE_LENGTH
   ELSE IF ( WAVE_LENGTH.LE.LIGHTSPEED/Q_BAND(1) .AND.
   .     WAVE_LENGTH.GT.LIGHTSPEED/Q_BAND(2) ) THEN
       PRINT *, 'Q BAND, wavelength = ', WAVE_LENGTH
   ELSE IF ( WAVE_LENGTH.LE.LIGHTSPEED/V_BAND(1) .AND.
   .     WAVE_LENGTH.GT.LIGHTSPEED/V_BAND(2) ) THEN
       PRINT *, 'V BAND, wavelength = ', WAVE_LENGTH
   ELSE IF ( WAVE_LENGTH.LE.LIGHTSPEED/W_BAND(1) .AND.
   .     WAVE_LENGTH.GT.LIGHTSPEED/W_BAND(2) ) THEN
       PRINT *, 'W BAND, wavelength = ', WAVE_LENGTH
   ELSE
       PRINT *, 'FREQUENCY BAND NOT IN DATA BASE FOR'
       PRINT *, 'WAVELENGTH ', WAVE_LENGTH
   END IF C------ Compute attenuation due to the weather IF (WEATHER.EQ.1) THEN
       IF (WAVE_LENGTH.LE.LIGHTSPEED/KA_BAND(1)) THEN
           ATTENUATION = 2.0                           ! KA BAND AND ABOVE
       ELSE IF (WAVE_LENGTH.LE.LIGHTSPEED/K_BAND(1)) THEN
           ATTENUATION = 1.0                           ! K BAND
       ELSE IF (WAVE_LENGTH.LE.LIGHTSPEED/KU_BAND(1)) THEN
           ATTENUATION = 0.4                           ! KU BAND
       ELSE
           ATTENUATION = 0.1                           ! X BAND AND BELOW
       END IF
   ELSE
       ATTENUATION = 0.0
   END IF

PRINT *, 'ATTENUATION = ', ATTENUATION

RETURN
   END
C*********************************************************************
```

```fortran
C*********************************************************************
C
      SUBROUTINE RADARMEAS( RADAR_FLAG, ASPECT_ANGLE, HM
     .,               RCS_DB,      STN_DB,       KSIGMA
     .,               RANGE,       RANGE_RATE,  ELEVATION,  AZIMUTH
     .,               RGMEAS,      RRMEAS,       ELMEAS,     AZMEAS
     .,               RGNOISE,     RRNOISE,      ELNOISE,    AZNOISE)
C
C*********************************************************************

INCLUDE 'RADAR_COM18.FOR'
      REAL ANG, STNF
      REAL RN, HM, SQNINV, STN, GAUSS, RCS_DB, STN_DB, KSIGMA

REAL
     .    RADAR_FLAG, ASPECT_ANGLE
     ., RANGE,       RANGE_RATE,  ELEVATION, AZIMUTH
     ., RGMEAS,      RRMEAS,       ELMEAS,    AZMEAS
     ., RGNOISE,     RRNOISE,      AZNOISE,   ELNOISE

C------ Test for RADAR_FLAG

IF (RADAR_FLAG.EQ.0.0) THEN
         HM      = 1.
         RGNOISE = 0.0
         RRNOISE = 0.0
         ELNOISE = 0.0
         AZNOISE = 0.0
         RGMEAS  = RANGE
         RRMEAS  = RANGE_RATE
         ELMEAS  = ELEVATION
         AZMEAS  = AZIMUTH
         RETURN
      END IF

C------ Compute the normalized radar cross section, RCS_NORM

ANG    = PI * PROJ_DIAMETER / WAVE_LENGTH
     .              * SIN(ASPECT_ANGLE) + 1.E-5

RCS_NORM = ABS( SIN(ANG)/ANG ) + 0.01
      RCS_DB   = 10.*ALOG10(RCS_NORM)

C PRINT *, ' RCS_NORM ', RCS_NORM     !!

C------ Compute attenuation due to the weather
C------     Moved to routine RADARSET and
C------     variable ATTENUATION is passed via a common block C IF (WEATHER.EQ.1) THEN
C    IF (WAVE_LENGTH.LT.1.) THEN
C       ATTENUATION = 2.0
C    ELSE IF (WAVE_LENGTH.LE.1.5) THEN
C       ATTENUATION = 1.0
C    ELSE IF (WAVE_LENGTH.LE.3.) THEN
C       ATTENUATION = 0.4
C    ELSE
C       ATTENUATION = 0.1
C    END IF
C ELSE
C    ATTENUATION = 0.0
C END IF C------ Compute the actual S/N ratio STNF  = STN_0 + 2.*RCS_DB
     .                - 40.*ALOG10((RANGE+1.E-6)/NM2M)
      STNDB = STNF - 1.E-3 * ATTENUATION * RANGE
      STN_DB= STNDB

C PRINT *, 'STNDB ' , STNDB

C------ Compute the probability of detection

IF (STNDB.LE.4.) THEN
         PROB_DETECTION = 0.0
      ELSE IF (STNDB.LE.6.) THEN
         PROB_DETECTION = 0.1
      ELSE IF (STNDB.LE.8.) THEN
         PROB_DETECTION = 0.3
```

```
      ELSE IF (STNDB.LE.10.) THEN
          PROB_DETECTION = 0.65
      ELSE IF (STNDB.LE.12.) THEN
          PROB_DETECTION = 0.85
      ELSE IF (STNDB.LE.14.) THEN
          PROB_DETECTION = 0.92
      ELSE
          PROB_DETECTION = 0.99
      END IF

C------ Set randomly the Hit/Miss flag

RN = RAN(ISEED)

IF (PROB_DETECTION.GT.RN) THEN
          HM = 1.0
      ELSE
          HM = 0.001
      END IF

C------ If RADAR_FLAG=1, only HM flag is used (no noise)

IF (RADAR_FLAG.EQ.1.) THEN
          RGMEAS = RANGE
          RRMEAS = RANGE_RATE
          ELMEAS = ELEVATION
          AZMEAS = AZIMUTH
          RETURN
      END IF

C------ Limit the system S/N ratio to 30 dB (to limit the system accuracy
C------ to a realistic value) for the range rate signal

STN = 10.**(0.1*MIN(30.,STNDB))
      SQNINV = 0.5 / SQRT(STN)

C------ Compute the error on range rate measurement due to gaussian noise

RN = RAN(ISEED)                              ! uniform dist.
      IF (RN.LT.1.E-5) RN = 1.E-5
      GAUSS = SQRT(-2.*LOG(RN)) * COS(TWOPI*RN)    ! gaussian dist.

C IF (ABS(GAUSS).GT.KSIGMA) HM = 0.
C GAUSS = SIGN( MIN(KSIGMA,ABS(GAUSS)) , GAUSS )

RRNOISE = GAUSS * RRATE_RES * SQNINV

C------ Limit the system S/N ratio to 40 dB (to limit the system accuracy
C------ to a realistic value) for the range, elevation angle and azimuth
C------ angle signals

IF (STNDB.GT.40.) STNDB = 40.

STN = 10.**(0.1*STNDB)
      SQNINV = 0.5 / SQRT(STN)

C------ Compute the error on range measurement due to gaussian noise

RN = RAN(ISEED)                              ! uniform dist.
      IF (RN.LT.1.E-5) RN = 1.E-5
      GAUSS = SQRT(-2.*LOG(RN)) * COS(TWOPI*RN)    ! gaussian dist.

C IF (ABS(GAUSS).GT.KSIGMA) HM = 0.
C GAUSS = SIGN( MIN(KSIGMA,ABS(GAUSS)) , GAUSS )

RGNOISE = GAUSS * RANGE_RES * SQNINV

C------ Compute the error on azimuth measurement due to gaussian noise

RN = RAN(ISEED)                              ! uniform dist.
      IF (RN.LT.1.E-5) RN = 1.E-5
      GAUSS = SQRT(-2.*LOG(RN)) * COS(TWOPI*RN)    ! gaussian dist.

C IF (ABS(GAUSS).GT.KSIGMA) HM = 0.
C GAUSS = SIGN( MIN(KSIGMA,ABS(GAUSS)) , GAUSS )

AZNOISE = GAUSS * AZIM_BEAMWIDTH * SQNINV
```

```
C------ Compute the error on elevation measurement due to gaussian noise
      RN = RAN(ISEED)                                    ! uniform dist.
      IF (RN.LT.1.E-5) RN = 1.E-5
      GAUSS = SQRT(-2.*LOG(RN)) * COS(TWOPI*RN)          ! gaussian dist.

C     IF (ABS(GAUSS).GT.KSIGMA) HM = 0.
C     GAUSS = SIGN( MIN(KSIGMA,ABS(GAUSS)) , GAUSS )

ELNOISE = GAUSS * ELEV_BEAMWIDTH * SQNINV

C------ Set radar measurements

RGMEAS = RANGE       + RGNOISE
      RRMEAS = RANGE_RATE  + RRNOISE
      ELMEAS = ELEVATION   + ELNOISE
      AZMEAS = AZIMUTH     + AZNOISE

RETURN
      END
C*******************************************************************

C*******************************************************************
C
      SUBROUTINE INFONAMES
C
C*******************************************************************

INCLUDE 'COMPLOT'

INFO(31) = 'WEATHER'
      INFO(32) = 'WAVELENGTH'
      INFO(33) = 'RCVR_FREQ'
      INFO(34) = 'RADARPOWER'
      INFO(35) = 'ANTEN_GAIN'
      INFO(36) = 'NOISE_FIG'
      INFO(37) = 'LOSSES'
      INFO(38) = 'FFT_LENGTH'
      INFO(39) = 'EL_BWIDTH'
      INFO(40) = 'AZ_BWIDTH'

RETURN
      END
C*******************************************************************

C*******************************************************************
C
      SUBROUTINE LSQ_POLY( X, Y, W, N, P1, C, IER)
C
C This routine computes the coefficients of the polynomial of order
C P1-1 that is the best approximation of the set of data (X,Y) in the
C least-square sense.
C
C Inputs
C ------
C 1) X    : vector of size N containing the independent variable values.
C 2) Y    : vector of size N containing the dependent variable values.
C 3) W    : vector of size N containing the weights for each data point.
C 4) N    : number of data points.
C 5) P1   : number of coefficients (i.e., polynomial order + 1).
C
C Output
C ------
C 1) C    : vector of size P1 containing the polynomial coefficients.
C 2) IER  : IMSL error parameter
C           0   = no error
C           129 = matrix A algorithmically singular
C           34  = accuracy test failed (number of accurate digits IDGT
C                 not achieved)
C
C Internal variables needed for the IMSL routine LEQT1F
C -----------------------------------------------------
C The IMSL routine solves the equation A*C=B for C.
C 1) A(10,10)   : matrix of coefficients
C 2) B(10)      : vector of right-hand side values
C 3) WKAREA(10) : work area
C 4) IDGT       : number of accurate digits for the values of A and B.
C                 (hardcoded as 3)
C
C*******************************************************************
```

```
      IMPLICIT NONE

INTEGER N, P1
      REAL X(N), Y(N), W(N), C(P1)

REAL A(10,10), B(10)
      INTEGER I, K, L, K1, K2, J
      REAL WKAREA(10), XX
      INTEGER IDGT, IER

C------ Compute the elements of the first column of A

DO K = 1 , P1
         A(K,1) = 0.0
         DO I = 1 , N
            J = 2*P1-1-K
            IF (J.EQ.0 .AND. X(I).EQ.0.) THEN
               XX = 1.0
            ELSE
               XX = X(I)**J
            END IF
            A(K,1) = A(K,1) + W(I)*XX
         END DO
      END DO

C------ Compute the elements of the last column of A

DO K = 1 , P1
         A(K,P1) = 0.0
         DO I = 1 , N
            J = P1-K
            IF (J.EQ.0 .AND. X(I).EQ.0.) THEN
               XX = 1.0
            ELSE
               XX = X(I)**J
            END IF
            A(K,P1) = A(K,P1) + W(I)*XX
         END DO
      END DO

C------ Compute the upper left elements of A

DO L = 2 , P1-1
      DO K = 1 , P1+1-L
         K1 = K+L-1
         A(K,L) = A(K1,1)
      END DO
      END DO

C------ Compute the lower right elements of A

DO L = 2 , P1-1
      DO K = P1+2-L , P1
         K2 = K+L-P1
         A(K,L) = A(K2,P1)
      END DO
      END DO

C------ Compute the vector B

DO K = 1 , P1
         B(K) = 0.0
         DO I = 1 , N
            J = P1-K
            IF (J.EQ.0 .AND. X(I).EQ.0.) THEN
               XX = 1.0
            ELSE
               XX = X(I)**J
            END IF
            B(K) = B(K) + Y(I)*W(I)*XX
         END DO
      END DO
```

```
C------ Solve for C:   A*C = B

IDGT = 3

CALL LEQT1F( A, 1, P1, 10, B, IDGT, WKAREA, IER)

DO I = 1 , P1
      C(I) = B(I)
   END DO

RETURN
   END
C****************************************************************
```

TAR_SIM18.CSL

PROGRAM TRAJECTORY SIMULATION                TAR_SIM18.CSL   02-MAY-1990

```
"****************************************************************"
"                                                                  "
"- This program solves 6DOF projectile equations + implements control"
"  laws for identification of METs parameters. Driven by TAR_MAIN18 "
"  Fortran program.                                                 "
"                                                                   "
"  Modifications:                                                   "
"                                                                   "
"- Compilation :                                                    "
"    o  Requires the macro file NONE                                "
"                                                                   "
"  Internal Units:   All angles are in radians                      "
"                    All distances in metres                        "
"                    All velocities are in metres per second        "
"                    or rad/sec                                     "
"                                                                   "
"  External Units:   All angles are in degrees                      "
"                    All distances in metres                        "
"                    All velocities are in metres per second        "
"                    or deg/sec                                     "
"                                                                   "
"- Source :                                                         "
"    1) J. Spacecraft v10, n6 June 1973, pp384-88.                  "
"****************************************************************"
```
RUNOFF-W-IIF, `L ignored
   on output page 34; on input line 28 of page 27 of file "ANALYSIS:[ARMAL."

```
"****************************************************************"
"                          Utility macros                          "
"****************************************************************"

"----------------------------------------------------------------"
MACRO FKDA( KDA, MACH, KDAMAC, KDA1, KDA2, KDA3, KDA4, KDA5)
"
" Version: 16-AUG-1989
" This macro computes the aerodynamic coefficient KDA as a polynomial
" function of Mach number.
"
" Inputs:
" - MACH       : Mach number
" - KDAMAC     : Array of breakpoints for Mach number
" - KDA1-KDA5  : Arrays of polynomial coefficients
"
" Output:
" - KDA        : Aerodynamic coefficient
"
MACRO RELABEL L1, L2, L3, L4, LEND
PROCEDURAL( KDA = MACH )

IF ( MACH .GT. KDAMAC(1) ) GOTO L1
           KDA = KDA1(1)
           GOTO LEND
        L1..CONTINUE
        IF ( MACH .GT. KDAMAC(2) ) GOTO L2
           KDA = KDA2(1) + MACH * ( KDA2(2) + MACH * ( KDA2(3) ...
                         + MACH * ( KDA2(4) + MACH * KDA2(5) ) ) )
           GOTO LEND
        L2..CONTINUE
        IF ( MACH .GT. KDAMAC(3) ) GOTO L3
           KDA = KDA3(1) + MACH * ( KDA3(2) + MACH * ( KDA3(3) ...
                         + MACH * ( KDA3(4) + MACH * KDA3(5) ) ) )
```

```
            GOTO LEND
    L3..CONTINUE
    IF ( MACH .GT. KDAMAC(4) )   GOTO L4
        KDA = KDA4(1) + MACH * ( KDA4(2) + MACH * ( KDA4(3) ...
                    + MACH * ( KDA4(4) + MACH * KDA4(5) ) ) )
        GOTO LEND
    L4..CONTINUE
        KDA = KDA5(1) + KDA5(2)*MACH
    LEND..CONTINUE

END $ " of PROCEDURAL "
    MACRO END
"--------------------------------------------------------------------"
```

RUNOFF-W-IIF, ^L ignored
   on output page 35; on input line 78 of page 27 of file "ANALYSIS:[ARMAL.`

```
"--------------------------------------------------------------------"
MACRO FKD0( KD0, MACH, KD0MAC, KD01, KD02, KD03, KD04, KD05, KD06, KD07)

" Version: 16-AUG-1989
" This macro computes the aerodynamic coefficient KD0 as a polynomial
" function of Mach number.

" Inputs:
" - MACH        : Mach number
" - KD0MAC      : Array of breakpoints for Mach number
" - KD01-KD07   : Arrays of polynomial coefficients " Output:
" - KD0         : Aerodynamic coefficient

MACRO RELABEL L1, L2, L3, L4, L5, L6, LEND
PROCEDURAL( KD0 = MACH )

IF ( MACH .GT. KD0MAC(1) )   GOTO L1
        KD0 = KD01(1)
        GOTO LEND
    L1..CONTINUE
    IF ( MACH .GT. KD0MAC(2) )   GOTO L2
        KD0 = KD02(1) + MACH * ( KD02(2) + MACH * ( KD02(3) ...
                    + MACH * ( KD02(4) + MACH * KD02(5) ) ) )
        GOTO LEND
    L2..CONTINUE
    IF ( MACH .GT. KD0MAC(3) )   GOTO L3
        KD0 = KD03(1) + MACH * ( KD03(2) + MACH * ( KD03(3) ...
                    + MACH * ( KD03(4) + MACH * KD03(5) ) ) )
        GOTO LEND
    L3..CONTINUE
    IF ( MACH .GT. KD0MAC(4) )   GOTO L4
        KD0 = KD04(1) + MACH * ( KD04(2) + MACH * ( KD04(3) ...
                    + MACH * ( KD04(4) + MACH * KD04(5) ) ) )
        GOTO LEND
    L4..CONTINUE
    IF ( MACH .GT. KD0MAC(5) )   GOTO L5
        KD0 = KD05(1) + MACH * ( KD05(2) + MACH * ( KD05(3) ...
                    + MACH * ( KD05(4) + MACH * KD05(5) ) ) )
        GOTO LEND
    L5..CONTINUE
    IF ( MACH .GT. KD0MAC(6) )   GOTO L6
        KD0 = KD06(1) + MACH * ( KD06(2) + MACH * ( KD06(3) ...
                    + MACH * ( KD06(4) + MACH * KD06(5) ) ) )
        GOTO LEND
    L6..CONTINUE
        KD0 = KD07(1) + MACH * ( KD07(2) + MACH * ( KD07(3) ...
                    + MACH * ( KD07(4) + MACH * KD07(5) ) ) )
    LEND..CONTINUE

END $ " of PROCEDURAL "
    MACRO END
"--------------------------------------------------------------------"
```

RUNOFF-W-IIF, ^L ignored
   on output page 36; on input line 135 of page 27 of file "ANALYSIS:[ARMAI

```
"--------------------------------------------------------------------"
MACRO FKL0( KL0, MACH, KL0MAC, KL01, KL02, KL03, KL04, KL05)

" Version: 16-AUG-1989
" This macro computes the aerodynamic coefficient KL0 as a polynomial
" function of Mach number.
```

```
" Inputs:
" - MACH         : Mach number
" - KL0MAC       : Array of breakpoints for Mach number
" - KL01-KL05    : Arrays of polynomial coefficients
"
" Output:
" - KL0          : Aerodynamic coefficient

MACRO RELABEL L1, L2, L3, L4, LEND
PROCEDURAL( KL0 = MACH )

IF ( MACH .GT. KL0MAC(1) )  GOTO L1
        KL0 = KL01(1) + KL01(2)*MACH
        GOTO LEND
    L1..CONTINUE
    IF ( MACH .GT. KL0MAC(2) )  GOTO L2
        KL0 = KL02(1) + MACH * ( KL02(2) + MACH * ( KL02(3) ...
                     + MACH * ( KL02(4) + MACH * KL02(5) ) ) )
        GOTO LEND
    L2..CONTINUE
    IF ( MACH .GT. KL0MAC(3) )  GOTO L3
        KL0 = KL03(1) + MACH * ( KL03(2) + MACH * ( KL03(3) ...
                     + MACH * ( KL03(4) + MACH * KL03(5) ) ) )
        GOTO LEND
    L3..CONTINUE
    IF ( MACH .GT. KL0MAC(4) )  GOTO L4
        KL0 = KL04(1) + MACH * ( KL04(2) + MACH * ( KL04(3) ...
                     + MACH * ( KL04(4) + MACH * KL04(5) ) ) )
        GOTO LEND
    L4..CONTINUE
        KL0 = KL05(1) + KL05(2)*MACH
    LEND..CONTINUE

END $ " of PROCEDURAL "
MACRO END
"------------------------------------------------------------"
RUNOFF-W-IIF, ^L ignored
    on output page 37; on input line 181 of page 27 of file "ANALYSIS:[ARMAL.
" "

"------------------------------------------------------------"
MACRO FKM( KM, MACH, KMMAC, KM1, KM2, KM3, KM4, KM5, KM6, KM7, KM8, KM9)
"
" Version: 16-AUG-1989
" This macro computes the aerodynamic coefficient KM as a polynomial
" function of Mach number.
"
" Inputs:
" - MACH         : Mach number
" - KMMAC        : Array of breakpoints for Mach number
" - KM1-KM9      : Arrays of polynomial coefficients
"
" Output:
" - KM           : Aerodynamic coefficient

MACRO RELABEL L1, L2, L3, L4, L5, L6, L7, L8, LEND
PROCEDURAL( KM = MACH )

IF ( MACH .GT. KMMAC(1) )  GOTO L1
        KM = KM1(1)
        GOTO LEND

L1..CONTINUE
    IF ( MACH .GT. KMMAC(2) )  GOTO L2
        KM = KM2(1) + MACH * ( KM2(2) + MACH * ( KM2(3) ...
                    + MACH * ( KM2(4) + MACH * KM2(5) ) ) )
        GOTO LEND
    L2..CONTINUE
    IF ( MACH .GT. KMMAC(3) )  GOTO L3
        KM = KM3(1) + MACH * ( KM3(2) + MACH * ( KM3(3) ...
                    + MACH * ( KM3(4) + MACH * KM3(5) ) ) )
        GOTO LEND
    L3..CONTINUE
    IF ( MACH .GT. KMMAC(4) )  GOTO L4
        KM = KM4(1) + MACH * ( KM4(2) + MACH * ( KM4(3) ...
                    + MACH * ( KM4(4) + MACH * KM4(5) ) ) )
        GOTO LEND
    L4..CONTINUE
    IF ( MACH .GT. KMMAC(5) )  GOTO L5
        KM = KM5(1) + MACH * ( KM5(2) + MACH * ( KM5(3) ...
                    + MACH * ( KM5(4) + MACH * KM5(5) ) ) )
```

```
            GOTO LEND
      L5..CONTINUE
      IF ( MACH .GT. KMMAC(6) )   GOTO L6
          KM = KM6(1) + MACH * ( KM6(2) + MACH * ( KM6(3) ...
                     + MACH * ( KM6(4) + MACH * KM6(5) ) ) )
            GOTO LEND
      L6..CONTINUE
      IF ( MACH .GT. KMMAC(7) )   GOTO L7
          KM = KM7(1) + MACH * ( KM7(2) + MACH * ( KM7(3) ...
                     + MACH * ( KM7(4) + MACH * KM7(5) ) ) )
            GOTO LEND
      L7..CONTINUE
      IF ( MACH .GT. KMMAC(8) )   GOTO L8
          KM = KM8(1) + MACH * ( KM8(2) + MACH * ( KM8(3) ...
                     + MACH * ( KM8(4) + MACH * KM8(5) ) ) )
            GOTO LEND
      L8..CONTINUE
          KM = KM9(1) + MACH * ( KM9(2) + MACH * ( KM9(3) ...
                     + MACH * ( KM9(4) + MACH * KM9(5) ) ) )
      LEND..CONTINUE

END $ " of PROCEDURAL "
MACRO END
"----------------------------------------------------------------"
```

IRUNOFF-W-IIF, ^L ignored
    on output page 38; on input line 248 of page 27 of file "ANALYSIS:[ARMA

```
"----------------------------------------------------------------"
MACRO FKA( KA, MACH, KAMAC, KA1, KA2)

" Version: 16-AUG-1989
" This macro computes the aerodynamic coefficient KA as a polynomial
" function of Mach number.
"
" Inputs:
"  - MACH        : Mach number
"  - KAMAC       : Array of breakpoints for Mach number
"  - KA1-KA9     : Arrays of polynomial coefficients
"
" Output:
"  - KA          : Aerodynamic coefficient
"
MACRO RELABEL L1, LEND
PROCEDURAL( KA = MACH )

IF ( MACH .GT. KAMAC(1) )   GOTO L1
          KA = KA1(1) + MACH * ( KA1(2) + MACH * ( KA1(3) ...
                     + MACH * ( KA1(4) + MACH * KA1(5) ) ) )
        GOTO LEND
      L1..CONTINUE
          KA = KA2(1) + MACH * ( KA2(2) + MACH * ( KA2(3) ...
                     + MACH * ( KA2(4) + MACH * KA2(5) ) ) )
      LEND..CONTINUE

END $ " of PROCEDURAL "
MACRO END
"----------------------------------------------------------------"
```

RUNOFF-W-IIF, ^L ignored
    on output page 39; on input line 281 of page 27 of file "ANALYSIS:[ARMAL.

```
"****************************************************************"
"                          ACSL   TABLES                          "
"****************************************************************"
```

"----- Earth coordinates of wind velocity relative to the Earth (m/sec)"

```
      TABLE VWXTAB, 1, 20 /
      0.     , 1000.  , 2000.  , 3000.  , 4000.  , ...
      5000.  , 6000.  , 7000.  , 8000.  , 9000.  , ...
      1.0E4  , 1.1E4  , 1.2E4  , 1.3E4  , 1.4E4  , ...
      1.5E4  , 1.6E4  , 1.7E4  , 1.8E4  , 1.9E4  , ...
      7.07   , 7.07   , 7.07   , 7.07   , 7.07   , ...
      7.07   , 7.07   , 7.07   , 7.07   , 7.07   , ...
      7.07   , 7.07   , 7.07   , 7.07   , 7.07   , ...
      7.07   , 7.07   , 7.07   , 7.07   , 7.07   /
```

```
        TABLE VWYTAB, 1, 20 /
        0.     , 1000.  , 2000.  , 3000.  , 4000.  , ...
        5000.  , 6000.  , 7000.  , 8000.  , 9000.  , ...
        1.0E4  , 1.1E4  , 1.2E4  , 1.3E4  , 1.4E4  , ...
        1.5E4  , 1.6E4  , 1.7E4  , 1.8E4  , 1.9E4  , ...
        7.07   , 7.07   , 7.07   , 7.07   , 7.07   , ...
        7.07   , 7.07   , 7.07   , 7.07   , 7.07   , ...
        7.07   , 7.07   , 7.07   , 7.07   , 7.07   , ...
        7.07   , 7.07   , 7.07   , 7.07   , 7.07   /
```

"----- Air density (kg/m**3) "

```
        TABLE RHOTAB, 1, 20 /
        0.     , 1000.  , 2000.  , 3000.  , 4000.  , ...
        5000.  , 6000.  , 7000.  , 8000.  , 9000.  , ...
        1.0E4  , 1.1E4  , 1.2E4  , 1.3E4  , 1.4E4  , ...
        1.5E4  , 1.6E4  , 1.7E4  , 1.8E4  , 1.9E4  , ...
        1.2245, 1.1095, 1.0051, 0.9082, 0.8184, ...
        0.7357, 0.6559, 0.5872, 0.5218, 0.4656, ...
        0.4112, 0.3616, 0.3118, 0.2629, 0.2259, ...
        0.1929, 0.1640, 0.1423, 0.1206, 0.1029/
```

"----- Temperature (degK) "

```
        TABLE TMPTAB, 1, 20 /
        0.     , 1000.  , 2000.  , 3000.  , 4000.  , ...
        5000.  , 6000.  , 7000.  , 8000.  , 9000.  , ...
        1.0E4  , 1.1E4  , 1.2E4  , 1.3E4  , 1.4E4  , ...
        1.5E4  , 1.6E4  , 1.7E4  , 1.8E4  , 1.9E4  , ...
        288.20, 281.69, 275.20, 268.70, 262.20, ...
        255.70, 249.10, 242.63, 236.35, 229.70, ...
        223.25, 216.75, 215.05, 216.65, 216.70, ...
        216.70, 216.70, 216.70, 216.70, 216.70/
```

"----- Correction for wind coordinates and air density "

```
        TABLE VWXCOR, 1, 1600 / 0., 1599*1.E6, 1600*0. /
        TABLE VWYCOR, 1, 1600 / 0., 1599*1.E6, 1600*0. /
        TABLE RHOCOR, 1, 1600 / 0., 1599*1.E6, 1600*0. /
```

RUNOFF-W-IIF, ^L ignored
 on output page 40; on input line 340 of page 27 of file "ANALYSIS:[ARMAL "*********************************************************************"
"            Communication interval and miscellaneous constants        "
"*********************************************************************"

```
        CINTERVAL   CINT = 0.1

CONSTANT    DTORAD = 57.295779
        CONSTANT    G      = 9.80665                $ " BRL CONSTANT  C1 "
        CONSTANT    PI     = 3.1415926

CONSTANT DUM = 0.0
        CONSTANT LFTFAC = 1.  $ "0.9627 BRL multiplier on KL0 and KLA "
        CONSTANT CLPFAC = 1.0 , CX0FAC = 1.0 , CX2FAC = 1.0
```

RUNOFF-W-IIF, ^L ignored
 on output page 40; on input line 357 of page 27 of file "ANALYSIS:[ARMAL.

"*********************************************************************"
"                              INITIAL                                 "
"*********************************************************************"

"----- BRL Aero data from BRL FCI-155 "

```
        ARRAY KDA1(1), KDA2(5), KDA3(5), KDA4(5), KDA5(2), KDAMAC(4)
        ARRAY KD01(1), KD02(5), KD03(5), KD04(5), KD05(5), KD06(5)
        ARRAY KD07(5), KD0MAC(6)
        ARRAY KL01(2), KL02(5), KL03(5), KL04(5), KL05(2), KL0MAC(4)
        ARRAY KM1(1),  KM2(5),  KM3(5),  KM4(5),  KM5(5),  KM6(5)
        ARRAY KM7(5),  KM8(5),  KM9(5),  KMMAC(8)
        ARRAY KA1(5),  KA2(5),  KAMAC(1)
```

"- Define constants in Aero Data Arrays "

```
        CONSTANT   KDA1  = 2.3
        CONSTANT   KDA2  = -28.981984 , 129.07274 , -187.64977 , ...
                            108.48648 , -18.128487
```

```
CONSTANT  KDA3  = 189.37350    , -694.01933   , 949.29028    , ...
                  -568.33625   , 126.47310
CONSTANT  KDA4  = -37.317582   , 94.483221    , -81.427874   , ...
                  31.613187    , -4.6953080
CONSTANT  KDA5  = 5.6409091    , -0.90909091
CONSTANT  KDAMAC= 0.80         , 0.97         , 1.19         , ...
                  1.80
CONSTANT  KD01  = 0.05
CONSTANT  KD02  = 106.55819    , -495.42480   , 864.31252    , ...
                  -670.28411   , 194.96965
CONSTANT  KD03  = -621.41655   , 2716.0843    , -4439.6671   , ...
                  3216.5548    , -871.42812
CONSTANT  KD04  = 103.02763    , -315.74748   , 321.87224    , ...
                  -109.02406   , 0.0
CONSTANT  KD05  = -1580.9899   , 5951.9060    , -8402.0232   , ...
                  5271.5295    , -1240.2931
CONSTANT  KD06  = -5.2380076   , 16.492312    , -18.761161   , ...
                  9.4212207    , -1.7685151
CONSTANT  KD07  = 0.20694309   , -.0040499634 , -.071698139  , ...
                  0.034380058  , -.0046420421
CONSTANT  KD0MAC= 0.84         , 0.915        , 0.99         , ...
                  1.035        , 1.08         , 1.38
CONSTANT  KL01  = 0.55         , 0.057692308
CONSTANT  KL02  = 5.2834534    , -28.181146   , 63.189386    , ...
                  -62.964179   , 23.626028
CONSTANT  KL03  = 157.96430    , -669.99668   , 1064.1109    , ...
                  -747.59628   , 196.31506
CONSTANT  KL04  = -30.483617   , 105.03552    , -132.91606   , ...
                  75.152710    , -15.991247
CONSTANT  KL05  = 0.71218182   , 0.12727273
CONSTANT  KL0MAC= 0.60         , 0.88         , 1.00         , ...
                  1.23
CONSTANT  KM1   = 1.28
CONSTANT  KM2   = 1.7205997    , -3.2865187   , 8.9650248    , ...
                  -10.862163   , 5.2689872
CONSTANT  KM3   = 546.68334    , -2628.0014   , 4750.3697    , ...
                  -3818.3687   , 1152.1293
CONSTANT  KM4   = 54.348067    , -175.99694   , 192.95224    , ...
                  -69.482520   , 0.0
CONSTANT  KM5   = 7878.3217    , -25448.989   , 27401.966    , ...
                  -9832.7886   , 0.0
CONSTANT  KM6   = 4584.2952    , -18887.324   , 29191.895    , ...
                  -20049.737   , 5162.3900
CONSTANT  KM7   = 1831.4857    , -6837.4301   , 9583.8249    , ...
                  -5972.3512   , 1395.9822
CONSTANT  KM8   = 20.761223    , -56.326884   , 61.499434    , ...
                  -29.895752   , 5.4463004
CONSTANT  KM9   = 2.3778853    , -2.2737848   , 1.8901715    , ...
                  -0.69989459  , 0.090931133
CONSTANT  KMMAC = 0.39         , 0.81         , 0.86         , ...
                  0.939        , 0.946        , 1.02         , ...
                  1.06         , 1.50
CONSTANT  KA1   = 0.007        , -.0026504608 , -.00090103102, ...
                  0.0025286890 , -.0011479416
CONSTANT  KA2   = 0.006724987  , -.0024994776 , .00071838136 , ...
                  -.00012021482, -.00000806355
CONSTANT  KAMAC = 0.90
```

"---------------------------------------------------------------------"

```
LOGICAL    INTERA, COSTLM
CONSTANT   INTERA = .FALSE., COSTLM = .FALSE.
ARRAY      XNOM(1600),    YNOM(1600),    ZNOM(1600)
ARRAY      VXNOM(1600),   VYNOM(1600),   VZNOM(1600)
ARRAY      RHONOM(1600),  VWXNOM(1600),  VWYNOM(1600)
ARRAY      RNGNOM(1600),  RRTNOM(1600),  TIMNOM(1600)
ARRAY      AZMNOM(1600),  ELVNOM(1600)
ARRAY      AZDNOM(1600),  ELDNOM(1600)
ARRAY      VWXPN(1600),   VWYPN(1600)
ARRAY      RGMEAS(1600),  RRMEAS(1600)
ARRAY      AZMEAS(1600),  ELMEAS(1600)
ARRAY      HMFLAG(1600),  MEASW(1600)
CONSTANT   XNOM    = 1600*0.,  YNOM    = 1600*0.,  ZNOM    = 1600*0.
CONSTANT   VXNOM   = 1600*0.,  VYNOM   = 1600*0.,  VZNOM   = 1600*0.
CONSTANT   RHONOM  = 1600*0.,  VWXNOM  = 1600*0.,  VWYNOM  = 1600*0.
CONSTANT   RNGNOM  = 1600*0.,  RRTNOM  = 1600*0.,  TIMNOM  = 1600*0.
CONSTANT   AZMNOM  = 1600*0.,  ELVNOM  = 1600*0.
CONSTANT   AZDNOM  = 1600*0.,  ELDNOM  = 1600*0.
CONSTANT   RGMEAS  = 1600*0.,  RRMEAS  = 1600*0.
CONSTANT   AZMEAS  = 1600*0.,  ELMEAS  = 1600*0.
CONSTANT   HMFLAG  = 1600*0.,  MEASW   = 1600*0.
CONSTANT   COSTTH = 0.9,  PTOL = 0.1,  BTOL = 0.9
CONSTANT   COSTI = 1.E20, TFINAL = 90.0
CONSTANT   LVX = 50, LVY = 50, LVZ = 50

INTEGER    NWEIGH, NMEAS
```

```
CONSTANT     NWEIGH = 360, MXWDSL = 0.02, DBFLAG = 1.
CONSTANT     NMEAS  = 230

ARRAY        COSTVX(40), COSTVY(40), COSTVZ(40), ALTLAY(20)
INTEGER      NCOST(40)
INTEGER      ILAYER, STLAY, PSTLAY, KOUNT, MAXLAY, NLAYER
INTEGER      RUNFLG
CONSTANT     RUNFLG = 1, NLAYER = 1, LAYER = 1000.
CONSTANT     COSTVX = 40*0, COSTVY = 40*0, COSTVZ = 40*0
CONSTANT     NCOST  = 40*0
CONSTANT     ALTLAY = 0.0  , 1.0E3, 2.0E3, 3.0E3, 4.0E3, ...
                      5.0E3, 6.0E3, 7.0E3, 8.0E3, 9.0E3, ...
                      1.0E4, 1.1E4, 1.2E4, 1.3E4, 1.4E4, ...
                      1.5E4, 1.6E4, 1.7E4, 1.8E4, 1.9E4
CONSTANT     TCHNG0 = 0.5

ARRAY        RHOLIM(20,2), VWXLIM(20,2), VWYLIM(20,2)
CONSTANT     RHOLIM = ...
             1.4245, 1.40 , 1.20 , 1.00 , 0.90 , ...
             0.90  , 0.80 , 0.80 , 0.60 , 0.50 , ...
             0.45  , 0.45 , 0.45 , 0.45 , 0.45 , ...
             0.45  , 0.45 , 0.45 , 0.45 , 0.45 , ...
             1.0245, 1.00 , 0.90 , 0.70 , 0.60 , ...
             0.60  , 0.60 , 0.50 , 0.35 , 0.30 , ...
             0.25  , 0.00 , 0.00 , 0.00 , 0.00 , ...
             0.00  , 0.00 , 0.00 , 0.00 , 0.00
CONSTANT     VWXLIM = 20*20, 20*-20
CONSTANT     VWYLIM = 20*20, 20*-20

"------------------------------------------------------------------"
     IF (T.EQ.0.0) ALT = ALTIC
     STLAY  = INT( ALT/LAYER ) + 1
     OLDALT = ALT
     MAXLAY = STLAY
     JLAYER = STLAY
     COUNT  = COUNT - 1
     KOUNT  = 0
"------------------------------------------------------------------"

IF (T.NE.0.0) GO TO 99997

"----- Constants "

A80PI    = 8.0 / PI
     A160PI   = 16.0 / PI

"----- Set seed number "

INTEGER RNSEED, GSEED
     CONSTANT RNSEED = 2234567
     GSEED = RNSEED
     GAUSI(GSEED)

"----- Plot initialization "

COUNT = 0

"----- Descent flag at T=0 is false "

DSCNT0 = .FALSE.

"----- Initial conditions for integrators "

" Using BRL FCT Data   Trajectory 2 :
     " Charge 08 , Vmuzzle = 690.8
     " Elevation = 53.44 deg=950 MILS, SPIN = 220 REV/SEC=79200 DPS "
     "                                        300 REV/SEC=108000 DPS"

CONSTANT ELVDIC =    0.0 , SPIN   = 79200., YAWD   = 0.0
     CONSTANT ELVIC  =   53.44, ROLL   =    0.0 , YAW    = 0.0
     CONSTANT UIC    =  690.8 , VIC    =    0.0 , WIC    = 0.0
     CONSTANT XEIC   =    0.0 , YEIC   =    0.0 , ALTIC  = 0.0

THEIC  = -ELVIC / DTORAD
     PHIIC  =  ROLL  / DTORAD
     PSIIC  =  YAW   / DTORAD

THDTIC = -ELVDIC / DTORAD
     PHDTIC =  SPIN   / DTORAD
     PSDTIC =  YAWD   / DTORAD
```

```
"----- Projectile characteristics "

CONSTANT  MASS = 43.09124     $  " Mass   ( 95 lb )     : kg      "
      CONSTANT  IX   = 0.1477       $  " Inertia about X-axis : kg-m**2 "
      CONSTANT  IY   = 1.8009       $  " Inertia about X-axis : kg-m**2 "
      CONSTANT  L    = .155         $  " Diameter             : m       "

A   = PI*L*L*0.25             $  " Section area         : m**2    "

"----- Constants "

TWOPI =  2. * PI
      L2    =  L * 0.5
      AoMASS=  A / MASS
      IXoIY =  IX / IY
      ALoIX =  A * L / IX
      ALoIY =  A * L / IY
      IXIX  =  IX*IX
      IY2   =  2.*IY
      IY4   =  4.*IY
      ALFMAX=  0.0

"----- Initialize wind velocity and angle of attack "

VWEEX  =  VWXTAB(ALTIC)
      VWEEY  =  VWYTAB(ALTIC)

SINTHE =  SIN(THEIC)
      COSTHE =  COS(THEIC)
      SINPSI =  SIN(PSIIC)
      COSPSI =  COS(PSIIC)

UAEB   =  VWEEX * COSTHE*COSPSI + VWEEY * COSTHE*SINPSI
      VAEB   = -VWEEX * SINPSI        + VWEEY * COSPSI
      WAEB   =  VWEEX * SINTHE*COSPSI + VWEEY * SINTHE*SINPSI

UW     =  UIC - UAEB
      VW     =  VIC - VAEB
      WW     =  WIC - WAEB
      VTW    =  SQRT(UW*UW+VW*VW+WW*WW)

ALFA   =  ACOS(UW/VTW)
      EPS    =  SIN(ALFA)
      EPSSQ  =  EPS*EPS
      VWoVTW =  VW/VTW
      WWoVTW =  WW/VTW
      RHO    =  KRHO * RHOTAB(ALTIC)
      QBAR   =  0.5*RHO*VTW*VTW
      TEMPK  =  KTEMP * TMPTAB(ALTIC)
      VSOND  =  C3 * SQRT( TEMPK )
      MACH   =  VTW / VSOND

UPEE   =  UIC*COSTHE*COSPSI - VIC*SINPSI + WIC*SINTHE*COSPSI
      VPEE   =  UIC*COSTHE*SINPSI + VIC*COSPSI + WIC*SINTHE*SINPSI
      WPEE   = -UIC*SINTHE                     + WIC*COSTHE

AZIM   =  PSIIC
      ELEV   = -THEIC
      XLOSE  =  COS(ELEV)*COS(AZIM)
      YLOSE  =  COS(ELEV)*SIN(AZIM)
      ZLOSE  =  SIN(ELEV)
      RRT    =  UPEE*XLOSE + VPEE*YLOSE + WPEE*ZLOSE
      RNG    =  0.0

DVZF1  = 0.0
      DVXF1  = 0.0
      DVYF1  = 0.0

"----- Set radar parameters "
"       . SETFLG=1:  the routine RADARSET will allow the user to modify "
"                   the values of the radar parameters.                 "
"       . RADFLG=0:  the routine RADARMEAS will set HITMSS to 1, xxNOIS "
"                   to 0 and xxRDAR to nominal values. The feedback    "
"                   signals are DX, DY and DZ.                          "
"       . RADFLG=1:  the routine RADARMEAS will set HITMSS based on the "
"                   radar equation, xxNOIS to 0 and xxRDAR to nominal   "
"                   values.  The feedback signals are DX, DY and DZ.    "
"       . RADFLG=2:  the routine RADARMEAS will set HITMSS based on the "
"                   noise threshold KSIGMA.  The feedback signals are   "
"                   XERR, YERR and ZERR.                                "
"       . KSIGMA:    noise threshold (# of sigmas) for hit/miss decision"

INTEGER SETFLG
      CONSTANT SETFLG = 1, HITMSS = 1., RADFLG = 1.
      CONSTANT KSIGMA = 2.
```

```
IF (RUNFLG.EQ.1) CALL RADARSET( L, RNSEED, SETFLG)

RGNOIS = 0.0 $ RRNOIS = 0.0 $ ELNOIS = 0.0 $ AZNOIS = 0.0
RGRDAR = 0.0 $ RRRDAR = 0.0 $ ELRDAR = 0.0 $ AZRDAR = 0.0
RCSDB  = 0.0 $ STNDB  = 0.0

ADMS = 0.0
EDMS = 0.0
```

"----- Backward rectangular integration of range rate "

```
INTGRR = 0.0

INTEGER NAPEX
NAPEX = 5555
```

RUNOFF-W-IIF, ^L ignored
    on output page 46; on input line 648 of page 27 of file "ANALYSIS:[ARMAL
    END  $ " of INITIAL "

"*****************************************************************"
                              DYNAMIC
"*****************************************************************"

"*************************"
        DERIVATIVE SLOW
"*************************"

"----- Simulation control parameters "

```
NSTEPS       NSTP1 = 1
ALGORITHM    IALG1 = 3
MAXTERVAL    MAXT1 = 0.01
MINTERVAL    MINT1 = 0.01
```

"----- Simulation termination conditions "

```
LOGICAL   OVFLOW
```

"- Overflow prediction "

```
OVFLOW = (ABS(UDOT).GT.UDOT99) .OR. (ABS(VDOT).GT.VDOT99) ...
         .OR. (ABS(WDOT).GT.WDOT99)
```

"----- Atmospheric model, incl inputs for METs closed loop estmation"

```
PROCEDURAL (DRHOFB, DVWXFB, DVWYFB = )

IF (.NOT.CLMET) GO TO NOCL

CONSTANT KZER = .01, KVZER = .2, KAZER = 0.  $ "RHO estim loop"
    CONSTANT KRGER = 0., KRRER = 0.
    " using Z-error or Range-error"
    LOGICAL RBOUND $ CONSTANT RBOUND  = .FALSE.
    DRFBMN = RSW( RBOUND, -KRHO*RHOTAB(ALT)-RHOCOR(ALT), -1.E30)
    DRHOFB = AMAX1( DRFBMN, KZER*DZF + KVZER*DVZF )

CONSTANT KXER =.05, KVXER = 10, KAXER = 0.  $ "VWX estim loop"
    DVWXFB =-KXER*DXF - KVXER*DVXF CONSTANT KYER =.05, KVYER = 10, KAYER = 0.  $ "VWY estim loop"
    DVWYFB =-KYER*DYF - KVYER*DVYF

NOCL..CONTINUE

END $ "OF PROCEDURAL"

CONSTANT KRHO = 1., KVWX = 1., KVWY = 1., KTEMP = 1.
CONSTANT VWEEZ = 0.

RHO   = KRHO * RHOTAB( ALT ) + ...
        RSW(CLMET, DRHOFB, 0.0) + RHOCOR( ALT )
VWEEX = KVWX * VWXTAB( ALT ) + ...
        RSW(CLMET, DVWXFB, 0.0) + VWXCOR( ALT )
VWEEY = KVWY * VWYTAB( ALT ) + ...
        RSW(CLMET, DVWYFB, 0.0) + VWYCOR( ALT )
TEMPK = KTEMP * TMPTAB( ALT )
```

"----- Aerodynamic coefficients "

PROCEDURAL

"- Speed of sound and Mach number "

CONSTANT C3 = 20.0468

VSOND = C3 * SQRT ( TEMPK )
MACH  = VTW / VSOND

"- Spin deceleration coefficient -"

FKA( KA, MACH, KAMAC, KA1, KA2)

CLP   = - KA * A160PI * CLPFAC

"- Pitching moment coefficient -"

FKM( KM, MACH, KMMAC, KM1, KM2, KM3, KM4, KM5, KM6, KM7, KM8,KM9)
CMA  =   KM * A80PI

"- Damping in pitch moment coefficient "

CONSTANT CMQ  = 0.0

"- Magnus moment coefficient "

CONSTANT CNPA = 0.0

"- Axial force coefficient -"

FKD0( KD0, MACH, KD0MAC, KD01, KD02, KD03, KD04,KD05,KD06,KD07)
FKDA( KDA, MACH, KDAMAC, KDA1, KDA2, KDA3, KDA4, KDA5)
CX0 = KD0 * A80PI * CX0FAC
CX2 = KDA * A80PI * CX2FAC
CX  = CX0 + CX2 * EPSSQ

"- Normal force coefficient -"

CONSTANT KLA  = 5.0

FKL0( KL0, MACH, KL0MAC, KL01, KL02, KL03, KL04, KL05)
N0  = KL0 * A80PI
N3  = KLA * A80PI
CNA = ( N0 +  N3 * EPSSQ ) * LFTFAC

"- Magnus force coefficient -"

CONSTANT KF   = 0.13

CYPA =   KF * A160PI

END $ " of PROCEDURAL "

"----- Precession/nutation frequencies "

MU    = QBAR*A*L*CMA
DISC  = IXIX*P2 - IY4*MU

IXP    = IX*P
SQdisc = SQRT(ABS(DISC))

PROCEDURAL

IF (DISC.LT.0.) GO TO LL1
       OMEGA1 = (IXP + SQdisc) / IY2
       OMEGA2 = (IXP - SQdisc) / IY2
       GO TO LL2
    LL1..CONTINUE
       OMEGA1 = 0.0
       OMEGA1 = 0.0
    LL2..CONTINUE END $ " of PROCEDURAL"

"----- Gyroscopic stability factor "

PROCEDURAL
IF (MU.EQ.0.0) SG = 1000.
IF (MU.NE.0.0) SG = IXIX*P2 / IY4 / MU
END $ " of PROCEDURAL"

"----- Filtering velocity error for closed loop MET estimates"

```
        CONSTANT TAURR = 1.
        RRERRF = REALPL( TAURR , RRERR , 0. )

CONSTANT TAUX = 0.1, TAUY = 0.1, TAUZ = 0.1

DXF1 = RSW( RADFLG.EQ.2 , XERR , DX )
        DYF1 = RSW( RADFLG.EQ.2 , YERR , DY )
        DZF1 = RSW( RADFLG.EQ.2 , ZERR , DZ )

DXF = REALPL( TAUX , DXF1 , 0. )
        DYF = REALPL( TAUY , DYF1 , 0. )
        DZF = REALPL( TAUZ , DZF1 , 0. )

CONSTANT TAUVX = 2., TAUVY = 2., TAUVZ = 1.

DVXF1 = RSW( RADFLG.EQ.2 , VXERR , DVX )
        DVYF1 = RSW( RADFLG.EQ.2 , VYERR , DVY )
        DVZF1 = RSW( RADFLG.EQ.2 , VZERR , DVZ )

DVXF = REALPL( TAUVX , DVXF1 , 0. )
        DVYF = REALPL( TAUVY , DVYF1 , 0. )
        DVZF = REALPL( TAUVZ , DVZF1 , 0. )
```

RUNOFF-W-IIF, ^L ignored
    on output page 49; on input line 818 of page 27 of file "ANALYSIS:[ARMAL
END $ " of DERIVATIVE SLOW "

"**************************"
                    DERIVATIVE FAST
"**************************"

"----- Simulation control parameters "

```
        NSTEPS       NSTP2 = 1
        ALGORITHM    IALG2 = 5
        MAXTERVAL    MAXT2 = 0.01
        MINTERVAL    MINT2 = 0.01
```

"----- Dynamic pressure (N/m**2) "

```
        QBAR = 0.5 * RHO * VTW * VTW
```

"----- Angle of attack (deg) and sine of angle of attack "

```
        ALFA    = ACOS(UW/VTW)
        EPS     = SIN(ALFA)
        EPSSQ   = EPS*EPS
        VWoVTW  = VW/VTW
        WWoVTW  = WW/VTW
```

"----- Aerodynamic force (per unit of mass) and gravity (m/sec**2) "

```
        QAM     = QBAR * AoMASS
        PL2V    = P * L2 / VTW

FbxDRG  = -QAM*CX
        FbxG    = G*SINTHE
        Fbx     = FbxDRG + FbxG

FbyNF   = -QAM*CNA*VWoVTW
        FbyMAG  = QAM*PL2V*CYPA*WWoVTW
        Fby     = FbyNF + FbyMAG

FbzNF   = -QAM*CNA*WWoVTW
        FbzMAG  = -QAM*PL2V*CYPA*VWoVTW
        FbzG    = -G*COSTHE
        Fbz     = FbzNF + FbzMAG + FbzG
```

"----- Derivative in body axes of projectile linear velocity relative "
"       to the Earth (m/sec**2)                                      "

```
        UDOT = Fbx - THEDOT*W + PSIDOT*COSTHE*V
        VDOT = Fby - PSIDOT * ( COSTHE*U + SINTHE*W )
        WDOT = Fbz + PSIDOT*SINTHE*V + THEDOT*U
```

"----- Projectile linear velocities relative to the Earth along "
"      the body x,y,z axes (m/sec)                              "

```
    U    = INTEG ( UDOT,UIC )
    V    = INTEG ( VDOT,VIC )
    W    = INTEG ( WDOT,WIC )

VT   = SQRT ( U*U + V*V + W*W )
```

"----- Projectile linear velocities along the Earth axes (m/sec) "

```
    UPEE = U*COSTHE*COSPSI - V*SINPSI + W*SINTHE*COSPSI
    VPEE = U*COSTHE*SINPSI + V*COSPSI + W*SINTHE*SINPSI
    WPEE = -U*SINTHE                  + W*COSTHE
    PRJEE = SQRT( UPEE*UPEE + VPEE*VPEE + WPEE*WPEE )
```

"----- Projectile position in the Earth axes (m) "

```
    XE   = INTEG ( UPEE, XEIC  )
    YE   = INTEG ( VPEE, YEIC  )
    ALT  = INTEG ( WPEE, ALTIC )
```

"----- Ranges (m), line of sight unit vector, range rate (m/s) "

```
    HRANGE = SQRT( XE*XE + YE*YE )
    RNG    = SQRT( HRANGE*HRANGE + ALT*ALT )

PROCEDURAL(AZIM,ELEV,XLOSE,YLOSE,ZLOSE,RRT,AZIMD,ELEVD = ...
               XE,YE,ALT,RNG,UPEE,VPEE,WPEE)
       IF (RNG.EQ.0.0) GOTO LOS1
          XLOSE = XE  / RNG
          YLOSE = YE  / RNG
          ZLOSE = ALT / RNG
          AZIM  = ATAN2(YLOSE,XLOSE)
          ELEV  = ASIN(ZLOSE)
          GOTO LOS2
    LOS1..CONTINUE
          AZIM  = PSIIC
          ELEV  =-THEIC
          XLOSE = COS(ELEV)*COS(AZIM)
          YLOSE = COS(ELEV)*SIN(AZIM)
          ZLOSE = SIN(ELEV)
          AZIMD = 0.0
          ELEVD = 0.0
    LOS2..CONTINUE
    RRT = UPEE*XLOSE + VPEE*YLOSE + WPEE*ZLOSE
    IF (RNG.EQ.0.0) GO TO LOS3
       COSEL = COS(ELEV)
       IF (COSEL.GT.1.E-4) ELEVD = (WPEE-RRT*ZLOSE)/RNG/COSEL
       IF (COSEL.LE.1.E-4) ELEVD = 0.0
       AZIMD = (VPEE-RRT*YLOSE+ELEVD*ALT*SIN(AZIM))/XE
    LOS3..CONTINUE
    END $ " of PROCEDURAL "
```

"----- Aspect angle (rad) "

```
    COSASP = BOUND( -1.,1., XLOSE*COSTHE*COSPSI ...
                          + YLOSE*COSTHE*SINPSI ...
                          - ZLOSE*SINTHE )

ASPECT = ACOS( COSASP )
```

"----- Aerodynamic moments per unit of inertia (N*m)/(Kg*m**2) "

```
    " MSIGN =
    "  1 : Unstable projectile (needs spin to avoid tumbling) "
    " -1 : Stable projectile

CONSTANT MSIGN = 1.

QALIX   = QBAR * ALoIX
    QALIY   = QBAR * ALoIY
    QALIY2  = QALIY*L2

Mbx     = QALIX*PL2V*CLP

MbySM   = MSIGN*QALIY*CMA*WWoVTW
    MbyDM   = QALIY2*CMQ*THEDOT/VTW
    MbyMAG  = -QALIY*PL2V*CNPA*VWoVTW
    Mby     = MbySM + MbyDM + MbyMAG

MbzSM   = -MSIGN*QALIY*CMA*VWoVTW
    MbzDM   = QALIY2*CMQ*PSIDOT*COSTHE/VTW
    MbzMAG  = -QALIY*PL2V*CNPA*WWoVTW
    Mbz     = MbzSM + MbzDM + MbzMAG
```

"----- Projectile angular accelerations (Euler angles) (rad/sec**2) "

```
    PHIDD  = Mbx + PSIDD*SINTHE + THEDOT*PSIDOT*COSTHE

Mgyro1 = -PSIDOT*COSTHE*P*IXoIY
    THEDD  = Mby + Mgyro1 - PSIDOT*COSTHE*PSIDOT*SINTHE Mgyro2 = THEDOT*P*IXoIY
    PSIDD  = ( Mbz + THEDOT*2.*PSIDOT*SINTHE + Mgyro2 ) / COSTHE "THEDD  = Mby - PSIDOT*COSTHE* ( P*IXoIY + PSIDOT*SINTHE  )"
    "PSIDD  = ( Mbz + THEDOT*(2.*PSIDOT*SINTHE + P*IXoIY) ) / COSTHE"
```

"----- Projectile angular velocities (Euler angles) (rad/sec) "

```
    THEDOT = INTEG ( THEDD, THDTIC )
    PHIDOT = INTEG ( PHIDD, PHDTIC )
    PSIDOT = INTEG ( PSIDD, PSDTIC )
```

"----- Projectile attitude angles (Euler angles) (rad) "

```
    THE    = INTEG ( THEDOT, THEIC )
    PHI    = INTEG ( PHIDOT, PHIIC )
    PSI    = INTEG ( PSIDOT, PSIIC )

PROCEDURAL ( = THE, PHI, PSI )

IF ( THE .GT.  PI )  THE = THE - PI
      IF ( THE .LT. -PI )  THE = THE + PI

IF ( PHI .GT.  PI )  PHI = PHI - PI
      IF ( PHI .LT. -PI )  PHI = PHI + PI

IF ( PSI .GT.  PI )  PSI = PSI - PI
      IF ( PSI .LT. -PI )  PSI = PSI + PI

END $ " of PROCEDURAL "
```

"----- Sine/cosine of Euler angles "

```
    SINTHE = SIN ( THE )
    COSTHE = COS ( THE )
    SINPSI = SIN ( PSI )
    COSPSI = COS ( PSI )
```

"----- Projectile spin rate about the longitudal axis (rad/sec) "

```
    P   = PHIDOT - PSIDOT*SINTHE
    P2  = P * P
```

"----- Wind velocity relative to the Earth in body axes (m/sec) "

```
    UAEB =  VWEEX * COSTHE*COSPSI + VWEEY * COSTHE*SINPSI
    VAEB = -VWEEX * SINPSI        + VWEEY * COSPSI
    WAEB =  VWEEX * SINTHE*COSPSI + VWEEY * SINTHE*SINPSI
```

"----- Projectile velocity relative to the atmosphere in body axes "
"      (m/sec)                                                     "

```
    UW = U - UAEB
    VW = V - VAEB
    WW = W - WAEB
```

"----- Total projectile velocity relative to the atmosphere (m/s) "

```
    VTW = SQRT ( UW*UW + VW*VW + WW*WW )
```

"----- Projectile hitting ground "

```
    PROCEDURAL

LOGICAL ALTCND $ CONSTANT ALTSTP = 0.0
    ALTCND = (T.GE.1.) .AND. (ALT.LT.ALTSTP)

LOGICAL COND4
    CONSTANT VZLOW = 10.0

COND4 = (WPEE.LE.VZLOW) .AND. (RUNFLG.EQ.4)

TERMT( ALTCND .OR. COND4 )

END $ "OF PROCEDURAL"
```

RUNOFF-W-IIF, ^L ignored
on output page 54; on input line 1041 of page 27 of file "ANALYSIS:[ARMAL
END $ " of DERIVATIVE FAST "

"----- Layer index "

```
        ILAYER = INT( ALT/LAYER ) + 1
        PSTLAY = INT( OLDALT/LAYER ) + 1
        OLDALT = ALT
        MAXLAY = AMAX0( MAXLAY , ILAYER )
```

"----- Descent "

```
        LOGICAL DESCNT , CHANGE , DSCNT0

CHANGE = (ILAYER.NE.PSTLAY) .AND. ((T-TCHNGE).GE.TCHNG0)
        IF( CHANGE ) TCHNGE = T

DSCNT0 = (PSTLAY.GT.ILAYER) .OR. DSCNT0
        DESCNT = (RUNFLG.EQ.2) .AND. DSCNT0
        IF( CHANGE ) JLAYER = ILAYER
        ICOST = LSW( DSCNT0 , 2*MAXLAY-JLAYER , JLAYER )
```

"----- Simulation termination conditions "

```
        LOGICAL   ENDTIM, ENDLAY, ENDFLG, ENDCLO

CONSTANT TSTP   = 200.0    , WSTOP  = 0.0
        CONSTANT UDOT99 = 1.E20    , VDOT99 = 1.E20    , WDOT99 = 1.E20
```

"- Max sim time reached "

```
        ENDTIM = (T.GT.TSTP)
```

"- End of altitude layer reached "

```
        ENDLAY = (ILAYER.GE.(STLAY+NLAYER)) .AND. (RUNFLG.EQ.2)
```

"- End of closed loop estimation "

```
        ENDCLO = (RUNFLG.EQ.4).AND.(COUNT.GE.NAPEX-1.OR.COUNT.GE.NMEAS-1)

ENDFLG = ENDTIM .OR. DESCNT .OR. ENDLAY .OR. OVFLOW .OR. ENDCLO

TERMT( ENDFLG )
```

"*****************************************************************"

"------------------ SAVE DATA FOR PLOTTING USING PLOT10I"

```
        INTEGER       DATLEN , COUNT , LASTC
        CONSTANT      DATLEN = 1600 , DUMMY = 0.

AZIMdg  = AZIM   * DTORAD
        ELVdeg  = ELEV   * DTORAD
        PSIdeg  = PSI    * DTORAD
        PHIdeg  = PHI    * DTORAD
        ALFdeg  = ALFA   * DTORAD
        SPINdg  = P      * DTORAD
        FREQ1   = OMEGA1 / TWOPI
        FREQ2   = OMEGA2 / TWOPI
        ALFMAX  = AMAX1( ALFMAX , ABS(ALFdeg) )
        THEdeg  = THE    * DTORAD
        ASPdeg  = ASPECT * DTORAD
```

"---- Smooth wind computation "

```
CONSTANT  VWXA1 = 0, VWXA0 = 0, VWXH1 = 5000, VWXH0 = 1000
CONSTANT  VWYA1 = 0, VWYA0 = 0, VWYH1 = 5000, VWYH0 = 1000

DAX = VWXA1 - VWXA0
        DHX = (ALT - VWXH0)/(VWXH1 - VWXH0)

IF (ALT.LT.VWXH0) VWXp = VWXA0
        IF (ALT.GT.VWXH1) VWXp = VWXA1
        IF (ALT.GE.VWXH0.AND.ALT.LE.VWXH1) ...
        VWXp = VWXA0 + 3*DAX*DHX*DHX - 2*DAX*DHX*DHX*DHX

DAY = VWYA1 - VWYA0
        DHY = (ALT - VWYH0)/(VWYH1 - VWYH0)
```

```
IF (ALT.LT.VWYH0) VWYp = VWYA0
IF (ALT.GT.VWYH1) VWYp = VWYA1
IF (ALT.GE.VWYH0.AND.ALT.LE.VWYH1) ...
VWYp = VWYA0 + 3*DAY*DHY*DHY - 2*DAY*DHY*DHY*DHY

COUNT = COUNT + 1

IF (WPEE.LE.VZLOW .AND. RUNFLG.EQ.1 .AND. NAPEX.EQ.5555) ...
NAPEX = COUNT-5
```

"------------------------------------------------------------------"

```
    IF (RUNFLG.NE.1) GOTO NOSAVE

TIMNOM(COUNT) = T

XNOM(COUNT)    = XE
    YNOM(COUNT)    = YE
    ZNOM(COUNT)    = ALT

VXNOM(COUNT)   = UPEE
    VYNOM(COUNT)   = VPEE
    VZNOM(COUNT)   = WPEE

RHONOM(COUNT)  = RHO
    VWXNOM(COUNT)  = VWEEX
VWYNOM(COUNT) = VWEEY

RNGNOM(COUNT)  = RNG
    RRTNOM(COUNT)  = RRT
    AZMNOM(COUNT)  = AZIM
    ELVNOM(COUNT)  = ELEV
    AZDNOM(COUNT)  = AZIMD
    ELDNOM(COUNT)  = ELEVD

CALL RADARMEAS(RADFLG, ASPECT, HITMSS, RCSDB,   ...
                   STNDB,  KSIGMA,  ...
                   RNG,    RRT,    ELEV,   AZIM,    ...
                   RGRDAR, RRRDAR, ELRDAR, AZRDAR, ...
                   RGNOIS, RRNOIS, ELNOIS, AZNOIS)

LOGICAL NOHM $ CONSTANT NOHM = .FALSE.
    IF (NOHM) HITMSS = 1.

CONSTANT ADSIG0 = 0.,    ADSIG1 = 0.    $ "?<SIG<?"
    CONSTANT EDSIG0 = 0.,    EDSIG1 = 0.    $ "?<SIG<?"
    ADNOIS = (1. + ADSIG1*RNG) * GAUSS(0.0,ADSIG0)
    EDNOIS = (1. + EDSIG1*RNG) * GAUSS(0.0,EDSIG0)

IF (COUNT.NE.1) GO TO RADAR
        HITMSS = 1
        RGRDAR = RNG
        RRRDAR = RRT
        ELRDAR = ELEV
        AZRDAR = AZIM
        RGNOIS = 0.0
        RRNOIS = 0.0
        ELNOIS = 0.0
        AZNOIS = 0.0
RADAR..CONTINUE

HMFLAG(COUNT) = HITMSS       $ " 1: HIT, 0.001: MISS"

IF (HITMSS.EQ.1.) GO TO HIT1
        RGMEAS(COUNT) = RNG
        RRMEAS(COUNT) = RRT
        AZMEAS(COUNT) = AZIM
        ELMEAS(COUNT) = ELEV
        GO TO HIT2
HIT1..CONTINUE

RGMEAS(COUNT) = RGRDAR
        RRMEAS(COUNT) = RRRDAR
        AZMEAS(COUNT) = AZRDAR
        ELMEAS(COUNT) = ELRDAR
HIT2..CONTINUE

IF (COUNT.GT.1) INTGRR = INTGRR + 0.5*CINT* ...
                             (RRMEAS(COUNT)+RRMEAS(COUNT-1))

VWXPN (COUNT) = VWXp
    VWYPN (COUNT) = VWYp

NOSAVE..CONTINUE
```

"----- Cost function computation "

```
        IF (CHANGE) KOUNT = 0

KOUNT     = KOUNT + 1

XNOM0     = XNOM(COUNT)
        YNOM0     = YNOM(COUNT)
        ZNOM0     = ZNOM(COUNT)

VXNOM0    = VXNOM(COUNT)
        VYNOM0    = VYNOM(COUNT)
        VZNOM0    = VZNOM(COUNT)

DX        = XE - XNOM0
        DY        = YE - YNOM0
        DZ        = ALT - ZNOM0

DVX       = UPEE - VXNOM0
        DVY       = VPEE - VYNOM0
        DVZ       = WPEE - VZNOM0

RGMS      = RGMEAS(COUNT)
        RRMS      = RRMEAS(COUNT)
        AZMS      = AZMEAS(COUNT)
        ELMS      = ELMEAS(COUNT)

INTEGER NANGLE $ CONSTANT NANGLE = 5
        IF (COUNT.GT.NANGLE) ...
        ADMS = (AZMS-AZMEAS(COUNT-NANGLE))/CINT/NANGLE
        IF (COUNT.GT.NANGLE) ...
        EDMS = (ELMS-ELMEAS(COUNT-NANGLE))/CINT/NANGLE

SINAZ     = SIN(AZMS)
        COSAZ     = COS(AZMS)
        SINEL     = SIN(ELMS)
        COSEL     = COS(ELMS)
        XMEAS     = RGMS * COSEL * COSAZ
        YMEAS     = RGMS * COSEL * SINAZ
        ZMEAS     = RGMS * SINEL

VXMEAS    = RRMS*COSEL*COSAZ - RGMS*EDMS*SINEL*COSAZ ...
                                     - RGMS*ADMS*COSEL*SINAZ
        VYMEAS    = RRMS*COSEL*SINAZ - RGMS*EDMS*SINEL*SINAZ ...
                                     + RGMS*ADMS*COSEL*COSAZ
        VZMEAS    = RRMS*SINEL + RGMS*EDMS*COSEL

XERR      = XE - XMEAS
        YERR      = YE - YMEAS
        ZERR      = ALT - ZMEAS

VXERR     = UPEE - VXMEAS
        VYERR     = VPEE - VYMEAS
        VZERR     = WPEE - VZMEAS

RGERR     = RNG - RGRDAR
        RRERR     = RRT - RRRDAR

IF (RUNFLG.EQ.1) GOTO NOCOST

XCOST2    = XERR*XERR
        YCOST2    = YERR*YERR
        ZCOST2    = ZERR*ZERR

UCOST2    = DVX*DVX
        VCOST2    = DVY*DVY
        WCOST2    = DVZ*DVZ

LCOSTX    = XCOST2 + LVX*UCOST2
        LCOSTY    = YCOST2 + LVY*VCOST2
        LCOSTZ    = ZCOST2 + LVZ*WCOST2

COSTVX(ICOST) = ( (KOUNT-1)*COSTVX(ICOST) + LCOSTX ) / KOUNT
        COSTVY(ICOST) = ( (KOUNT-1)*COSTVY(ICOST) + LCOSTY ) / KOUNT
        COSTVZ(ICOST) = ( (KOUNT-1)*COSTVZ(ICOST) + LCOSTZ ) / KOUNT

IF (OVFLOW) COSTVX(ICOST) = 998001.
        IF (OVFLOW) COSTVY(ICOST) = 998001.
        IF (OVFLOW) COSTVZ(ICOST) = 998001.

COSTX     = SQRT(COSTVX(ICOST))
        COSTY     = SQRT(COSTVY(ICOST))
        COSTZ     = SQRT(COSTVZ(ICOST))

NCOST(ICOST) = KOUNT
```

"------- Feedback loops for control/identification of METs parameters "
```
        LOGICAL   CLMET
        CONSTANT  CLMET = .FALSE.

IF (.NOT.CLMET) GOTO NOCOST

ARRAY ALTC(1600), RHOC(1600), VWXC(1600), VWYC(1600)
            CONSTANT ALTC = 1600*0., RHOC = 1600*0.
            CONSTANT VWXC = 1600*0., VWYC = 1600*0.
            ALTC(COUNT) = ALT
            RHOC(COUNT) = DRHOFB
            VWXC(COUNT) = DVWXFB
            VWYC(COUNT) = DVWYFB

NOCOST..CONTINUE
```
"------------------------------------------------------------------"
```
        IF( ALT .LT. 0.0 ) GOTO NOSAV1

RHOC0 = RHOCOR(ALT)
        VWXC0 = VWXCOR(ALT)
        VWYC0 = VWYCOR(ALT)
        ZHOLE = RSW( HITMSS.EQ.1. , ZMEAS , 0.0 )

CALL SAVEDATAS ( DATLEN, COUNT , 1      ,                 ...
                         ALT   , U     , V       , W     , ELVdeg, ...
                         PSIdeg, PHIdeg, XE      , YE    , T     , ...
                         ALFdeg, QBAR  , VTW     , XMEAS , YMEAS , ...
                         ZMEAS , VWXC0 , VWYC0   , COSTX , UW    )

CALL SAVEDATAS ( DATLEN, COUNT , 21      ,                 ...
                         VW    , WW    , SPINdg, RHO    , THEdeg, ...
                         TEMPK , SQRT(ZCOST2)   , SQRT(WCOST2)   , ...
                         COSTZ , ELNOIS*DTORAD, ...
                         VT    , UAEB  , VAEB    , WAEB  , UPEE  , ...
                         VPEE  , WPEE  , Fbx     , Fby   , Fbz   )

CALL SAVEDATAS ( DATLEN, COUNT , 41     ,                  ...
                         VXMEAS , VYMEAS , VZMEAS , MbySM , ZHOLE, ...
                         DRHOFB, VWEEX , VWXNOM(COUNT) , DVWXFB,   ...
                         XNOM(COUNT), YNOM(COUNT), ZNOM(COUNT),    ...
                         VXNOM(COUNT), VYNOM(COUNT), VZNOM(COUNT), ...
                         RHONOM(COUNT), CX , ELMEAS(COUNT)*DTORAD ,...
                         MACH  , INTGRR )

CALL SAVEDATAS ( DATLEN, COUNT , 61     ,                  ...
                         SG    , RGMEAS(COUNT), RRMEAS(COUNT), ...
                         AZMEAS(COUNT)*DTORAD, RGNOIS, ...
                         RRNOIS, AZNOIS*DTORAD, XERR , YERR , ZERR , ...
                         RCSDB, STNDB, THEDD , PHIDD , PSIDD , ...
                         RNG   , VWXp   , RRT    , VWYp  , AZIMdg )

CALL SAVEDATAS ( DATLEN, COUNT , 81.    ,                  ...
                         VWEEY , VWYNOM(COUNT) , DX    , DY   , DZ    , ...
                         DVX   , DVY    , DVZ    , TIMNOM(COUNT) , ...
                         SQRT(YCOST2) , SQRT(VCOST2)    , DVWYFB , ...
                         RHOC0 , HITMSS , VXERR , VYERR , ...
                         VZERR , VWXPN(COUNT) , VWYPN(COUNT) , ASPdeg )
        NOSAV1..CONTINUE
?.
RUNOFF-W-IIF, ^L ignored
    on output page 60; on input line 1358 of page 27 of file "ANALYSIS:[ARMAL
END $ " of DYNAMIC "
```

"*********************************************************************"
                              TERMINAL
"*********************************************************************"

```
        IF (.NOT.OVFLOW) GOTO NOOVF
            WRITE(20,123) T
            PRINT 123, T
        123..FORMAT(//,1X,35H************************************ , ...
                     /,1X,35H     WARNING ! Overflow prediction   , ...
                     /,1X,35H************************************ , ...
                     /,1X,10H----> T = , F10.3)
        NOOVF..CONTINUE
```

```
    IF (RUNFLG.NE.1) GOTO LEND1

COUNT = COUNT + 1
        LASTC = COUNT

TIMNOM(COUNT) = T

XNOM(COUNT)    = XE
        YNOM(COUNT)    = YE
        ZNOM(COUNT)    = ALT

VXNOM(COUNT)   = UPEE
        VYNOM(COUNT)   = VPEE
        VZNOM(COUNT)   = WPEE

RHONOM(COUNT)  = RHO
        VWXNOM(COUNT)  = VWEEX
 VWYNOM(COUNT) = VWEEY

RNGNOM(COUNT)  = RNG    + RGNOIS
        RRTNOM(COUNT)  = RRT    + RRNOIS
        AZMNOM(COUNT)  = AZIM   + AZNOIS
        ELVNOM(COUNT)  = ELEV   + ELNOIS
        AZDNOM(COUNT)  = AZIMD  + ADNOIS
        ELDNOM(COUNT)  = ELEVD  + EDNOIS
        VWXPN (COUNT)  = VWXp
        VWYPN (COUNT)  = VWYp

HMFLAG(COUNT)  = HITMSS

RGMEAS(COUNT)  = RSW( HITMSS.EQ.1. , RGRDAR , RNG  )
        RRMEAS(COUNT)  = RSW( HITMSS.EQ.1. , RRRDAR , RRT  )
        AZMEAS(COUNT)  = RSW( HITMSS.EQ.1. , AZRDAR , AZIM )
        ELMEAS(COUNT)  = RSW( HITMSS.EQ.1. , ELRDAR , ELEV )

CALL SAVEINFO(1 , XE     , YE     , ALT    , 0.0    , 0.0    , ...
                          0.0    , 0.0    , 0.0    , 0.0    , 0.0    )
        CALL NAMEOFPLOT
        CALL PLOTROUTINE
        IF (.NOT.NOHM) CALL PROCESSMEAS

LEND1..CONTINUE

IF (RUNFLG.NE.3) GOTO LEND2

XNOM0     = XNOM(LASTC)
        YNOM0     = YNOM(LASTC)
        ZNOM0     = ZNOM(LASTC)

VXNOM0    = VXNOM(LASTC)
        VYNOM0    = VYNOM(LASTC)
        VZNOM0    = VZNOM(LASTC)

DX        =   XE  - XNOM0
        DY        =   YE  - YNOM0
        DZ        =   ALT - ZNOM0

DVX       = UPEE - VXNOM0
        DVY       = VPEE - VYNOM0
        DVZ       = WPEE - VZNOM0

DIMPAC = SQRT( DX*DX + DY*DY )

CALL SAVEINFO(11, XE     , YE     , ALT    , DIMPAC, LVX, ...
                          LVY    , LVZ    , DX     , DY     , 0.0    )

CALL NAMEOFPLOT
        CALL PLOTROUTINE

LEND2..CONTINUE

IF (RUNFLG.NE.4) GO TO LEND3
        CALL SAVEINFO(21, KZER, KVZER, TAUVZ, KXER, KVXER, ...
                          TAUVX, KYER, KVYER, TAUVY, 0.0)
```

```
        CALL NAMEOFPLOT
        CALL PLOTROUTINE
    LEND3..CONTINUE

END $ " of TERMINAL "
2
RUNOFF-W-IIF, `L ignored
        on output page 62; on input line 1459 of page 27 of file "ANALYSIS:[ARMAL
    END $ " of PROGRAM "
        SUBROUTINE NAMEOFPLOT

INCLUDE 'COMPLOT'

NAME( 1) = 'ALT    '
        NAME( 2) = 'U      '
        NAME( 3) = 'V      '
        NAME( 4) = 'W      '
        NAME( 5) = 'ELEV   '
        NAME( 6) = 'PSI    '
        NAME( 7) = 'PHI    '
        NAME( 8) = 'XE     '
        NAME( 9) = 'YE     '
        NAME(10) = 'TIME   '
        NAME(11) = 'ALFA   '
        NAME(12) = 'QBAR   '
        NAME(13) = 'VTW    '
        NAME(14) = 'XMEAS  '
        NAME(15) = 'YMEAS  '
        NAME(16) = 'ZMEAS  '
        NAME(17) = 'VWXCOR '
        NAME(18) = 'VWYCOR '
        NAME(19) = 'COSTVX '
        NAME(20) = 'UW     '

NAME(21) = 'VW     '
        NAME(22) = 'WW     '
        NAME(23) = 'SPINRATE'
        NAME(24) = 'RHO    '
        NAME(25) = 'THETA  '
        NAME(26) = 'TEMPK  '
        NAME(27) = 'ZCOST  '
        NAME(28) = 'WCOST  '
        NAME(29) = 'COSTVZ '
        NAME(30) = 'ELNOIS '
        NAME(31) = 'VT     '
        NAME(32) = 'UAEB   '
        NAME(33) = 'VAEB   '
        NAME(34) = 'WAEB   '
        NAME(35) = 'UPEE   '
        NAME(36) = 'VPEE   '
        NAME(37) = 'WPEE   '
        NAME(38) = 'Fbx    '
        NAME(39) = 'Fby    '
        NAME(40) = 'Fbz    '
        NAME(41) = 'VXMEAS '
        NAME(42) = 'VYMEAS '
        NAME(43) = 'VZMEAS '
        NAME(44) = 'MbySM  '
        NAME(45) = 'ZDETECTED'
        NAME(46) = 'DRHOFB '
        NAME(47) = 'VWEEX  '
        NAME(48) = 'VWXNOM '
        NAME(49) = 'DVWXFB '
        NAME(50) = 'XNOM   '
        NAME(51) = 'YNOM   '
        NAME(52) = 'ZNOM   '
        NAME(53) = 'VXNOM  '
        NAME(54) = 'VYNOM  '
        NAME(55) = 'VZNOM  '
        NAME(56) = 'RHONOM '
        NAME(57) = 'CX     '
        NAME(58) = 'ELMEAS '
        NAME(59) = 'MACH   '
        NAME(60) = 'INTGRR '

NAME(61) = 'SG     '
        NAME(62) = 'RGMEAS '
        NAME(63) = 'RRMEAS '
        NAME(64) = 'AZMEAS '
        NAME(65) = 'RGNOIS '
        NAME(66) = 'RRNOIS '
        NAME(67) = 'AZNOIS '
        NAME(68) = 'XERR   '
        NAME(69) = 'YERR   '
```

```
      NAME(70)  = 'ZERR  '
      NAME(71)  = 'RCSDB '
      NAME(72)  = 'STNDB '
      NAME(73)  = 'THEDD '
      NAME(74)  = 'PHIDD '
      NAME(75)  = 'PSIDD '
      NAME(76)  = 'RANG  '
      NAME(77)  = 'VWXp  '
      NAME(78)  = 'RNGRAT'
      NAME(79)  = 'VWYp  '
      NAME(80)  = 'AZIM  '

NAME(81)  = 'VWEEY '
      NAME(82)  = 'VWYNOM'
      NAME(83)  = 'DX    '
      NAME(84)  = 'DY    '
      NAME(85)  = 'DZ    '
      NAME(86)  = 'DVX   '
      NAME(87)  = 'DVY   '
      NAME(88)  = 'DVZ   '
      NAME(89)  = 'TIMNOM'
      NAME(90)  = 'YCOST '
      NAME(91)  = 'VCOST '
      NAME(92)  = 'DVWYFB'
      NAME(93)  = 'RHOCOR'
      NAME(94)  = 'HITMSS'
      NAME(95)  = 'VXERR'
      NAME(96)  = 'VYERR'
      NAME(97)  = 'VZERR'
      NAME(98)  = 'VWXPN'
      NAME(99)  = 'VWYPN'
      NAME(100)= 'ASPECT'

NAME(101)= 'RGMEAS2'
      NAME(102)= 'RRMEAS2'
      NAME(103)= 'ELMEAS2'
      NAME(104)= 'AZMEAS2'

INFO( 1) = 'XIMPC0'
      INFO( 2) = 'YIMPC0'
      INFO( 3) = 'ZIMPC0'
      INFO( 4) = '     '
      INFO( 5) = '     '
      INFO( 6) = '     '
      INFO( 7) = '     '
      INFO( 8) = '     '
      INFO( 9) = '     '
      INFO(10) = '     '
      INFO(11) = 'XIMPC1'
      INFO(12) = 'YIMPC1'
      INFO(13) = 'ZIMPC1'
      INFO(14) = 'DIMPAC'
      INFO(15) = 'LVX'
      INFO(16) = 'LVY'
      INFO(17) = 'LVZ'
      INFO(18) = 'DXIMPAC'
      INFO(19) = 'DYIMPAC'
      INFO(20) = '     '
      INFO(21) = 'KZER  '
      INFO(22) = 'KVZER '
      INFO(23) = 'TAUVZ '
      INFO(24) = 'KXER  '
      INFO(25) = 'KVXER '
      INFO(26) = 'TAUVX '
      INFO(27) = 'KYER  '
      INFO(28) = 'KVYER '
      INFO(29) = 'TAUVY '
      INFO(30) = '     '

RETURN
      END
C****************************************************************************

SUBROUTINE SET_ACSL_PARAM (
     1     RUNFLGi , RADFLGi , RNSEEDi , NLAYERi , RHOTABi
     1,    VWXTABi , VWYTABi , LVXi    , LVYi    , LVZi
     1,    VWXH0i  , VWXA0i  , VWXH1i  , VWXA1i  , VWYH0i
     1,    VWYA0i  , VWYH1i  , VWYA1i  , CLMETi  , TSTPi
     1,    KXERi   , KVXERi  , KAXERi  , KYERi   , KVYERi
     1,    KAYERi  , KZERi   , KVZERi  , KAZERi  , KRGERi
     1,    KRRERi  )
```

```
C*********************************************************************
C
C PASS ARGUMENTS TO ZZCOM
C
C*********************************************************************

$ ZZCOM

INTEGER RUNFLGi, RADFLGi, RNSEEDi, NLAYERi
    REAL    RHOTABi(40), VWXTABi(40), VWYTABi(40)
    REAL    LVXi, LVYi, LVZi
    REAL    TSTPi
    LOGICAL CLMETi
    REAL    KXERi, KVXERi, KAXERi
    REAL    KYERi, KVYERi, KAYERi
    REAL    KZERi, KVZERi, KAZERi
    REAL    KRGERi, KRRERi

RUNFLG  = RUNFLGi
    RADFLG  = RADFLGi
    RNSEED  = RNSEEDi
    NLAYER  = NLAYERi

CLMET   = CLMETi
    IF (TSTPi.GE.0.) TSTP = TSTPi
    KXER    = KXERi
    KVXER   = KVXERi
    KAXER   = KAXERi
    KYER    = KYERi
    KVYER   = KVYERi
    KAYER   = KAYERi
    KZER    = KZERi
    KVZER   = KVZERi
    KAZER   = KAZERi
    KRGER   = KRGERi
    KRRER   = KRRERi

DO I = 1, 20
            RHOTAB(i) = RHOTABi(I)
            VWXTAB(i) = VWXTABi(I)
            VWYTAB(i) = VWYTABi(I)
    END DO

LVX = LVXi
    LVY = LVYi
    LVZ = LVZi

VWXH0  = VWXH0i
    VWXA0  = VWXA0i
    VWXH1  = VWXH1i
    VWXA1  = VWXA1i

VWYH0  = VWYH0i
    VWYA0  = VWYA0i
    VWYH1  = VWYH1i
    VWYA1  = VWYA1i

RETURN
    END

SUBROUTINE GET_ACSL_PARAM (
   1      MLAYERo , COSTVXo , COSTVYo , COSTVZo , NCOSTo
   1,     KXERo   , KVXERo  , KAXERo  , KYERo   , KVYERo
   1,     KAYERo  , KZERo   , KVZERo  , KAZERo  , KRGERo
   1,     KRRERo  , RHOTABo , VWXTABo , VWYTABo )

C*********************************************************************
C
C RETRIEVE VARIABLES FROM ZZCOM
C
C*********************************************************************

$ ZZCOM

INTEGER MLAYERo, NCOSTo(40)
    REAL    COSTVXo(40), COSTVYo(40), COSTVZo(40)
    REAL    KXERo, KVXERo, KAXERo
    REAL    KYERo, KVYERo, KAYERo
    REAL    KZERo, KVZERo, KAZERo
    REAL    KRGERo, KRRERo
    REAL    RHOTABo(40), VWXTABo(40), VWYTABo(40)
```

```
      IF (RUNFLG.EQ.1) MLAYERo = MAXLAY

DO I = 1, 40
               COSTVXo(I) = COSTVX(I)
               COSTVYo(I) = COSTVY(I)
               COSTVZo(I) = COSTVZ(I)
               NCOSTo (I) = NCOST (I)
         RHOTABo(I) = RHOTAB(I)
         VWXTABo(I) = VWXTAB(I)
         VWYTABo(I) = VWYTAB(I)

END DO

KXERo    = KXER
      KVXERo   = KVXER
      KAXERo   = KAXER
      KYERo    = KYER
      KVYERo   = KVYER
      KAYERo   = KAYER
      KZERo    = KZER
      KVZERo   = KVZER
      KAZERo   = KAZER
      KRGERo   = KRGER
      KRRERo   = KRRER

RETURN
      END

C*******************************************************************************
C
      SUBROUTINE SAVENOMINAL( FILE )
C
C*******************************************************************************

$ ZZCOM

CHARACTER*10 FILE

REAL XNOMsav(1600),    YNOMsav(1600),    ZNOMsav(1600)
      REAL VXNOMsav(1600),   VYNOMsav(1600),   VZNOMsav(1600)
      REAL RHONOMsav(1600),  VWXNOMsav(1600),  VWYNOMsav(1600)
      REAL RNGNOMsav(1600),  RRTNOMsav(1600),  TIMNOMsav(1600)
      REAL AZMNOMsav(1600),  ELVNOMsav(1600)
      REAL AZDNOMsav(1600),  ELDNOMsav(1600)
            REAL VWXPNsav(1600),   VWYPNsav(1600)
      REAL RGMEASsav(1600),  RRMEASsav(1600)
      REAL AZMEASsav(1600),  ELMEASsav(1600)
      REAL HMFLAGsav(1600)

INTEGER I, COUNTsav
      INTEGER NAPEXsav

C------ Save current ZZCOM arrays

PRINT *, 'Save nominal values in x.BIN file'

NAPEXsav = NAPEX
      COUNTsav = COUNT

C PRINT *, ' COUNTsav ', COUNTsav

DO I = 1 , COUNTsav
         XNOMsav(I)    = XNOM(I)
         YNOMsav(I)    = YNOM(I)
         ZNOMsav(I)    = ZNOM(I)
         VXNOMsav(I)   = VXNOM(I)
         VYNOMsav(I)   = VYNOM(I)
         VZNOMsav(I)   = VZNOM(I)
         RHONOMsav(I)  = RHONOM(I)
         VWXNOMsav(I)  = VWXNOM(I)
         VWYNOMsav(I)  = VWYNOM(I)
         RNGNOMsav(I)  = RNGNOM(I)
         RRTNOMsav(I)  = RRTNOM(I)
         TIMNOMsav(I)  = TIMNOM(I)
         AZMNOMsav(I)  = AZMNOM(I)
         ELVNOMsav(I)  = ELVNOM(I)
         AZDNOMsav(I)  = AZDNOM(I)
         ELDNOMsav(I)  = ELDNOM(I)
               VWXPNsav(I)   = VWXPN(I)
               VWYPNsav(I)   = VWYPN(I)
```

```
            RGMEASsav(I) = RGMEAS(I)
            RRMEASsav(I) = RRMEAS(I)
            AZMEASsav(I) = AZMEAS(I)
            ELMEASsav(I) = ELMEAS(I)
            HMFLAGsav(I) = HMFLAG(I)
         END DO C------ Restore ZZCOM from FILE

CALL ZZSVRS2( 0, FILE)

C------ Transfer saved arrays into new ZZCOM

LASTC = COUNTsav
         NAPEX = NAPEXsav

DO I = 1 , COUNTsav
            XNOM(I)   = XNOMsav(I)
            YNOM(I)   = YNOMsav(I)
            ZNOM(I)   = ZNOMsav(I)
            VXNOM(I)  = VXNOMsav(I)
            VYNOM(I)  = VYNOMsav(I)
            VZNOM(I)  = VZNOMsav(I)
            RHONOM(I) = RHONOMsav(I)
            VWXNOM(I) = VWXNOMsav(I)
            VWYNOM(I) = VWYNOMsav(I)
            RNGNOM(I) = RNGNOMsav(I)
            RRTNOM(I) = RRTNOMsav(I)
            TIMNOM(I) = TIMNOMsav(I)
            AZMNOM(I) = AZMNOMsav(I)
            ELVNOM(I) = ELVNOMsav(I)
            AZDNOM(I) = AZDNOMsav(I)
            ELDNOM(I) = ELDNOMsav(I)
                VWXPN(I)  = VWXPNsav(I)
                VWYPN(I)  = VWYPNsav(I)
            RGMEAS(I) = RGMEASsav(I)
            RRMEAS(I) = RRMEASsav(I)
            AZMEAS(I) = AZMEASsav(I)
            ELMEAS(I) = ELMEASsav(I)
            HMFLAG(I) = HMFLAGsav(I)
         END DO C------ Fill additional elements with last nominal values DO I = MIN(1600,COUNTsav+1) , MIN(1600,COUNTsav+10)
            XNOM(I)   = XNOMsav(COUNTsav)
            YNOM(I)   = YNOMsav(COUNTsav)
            ZNOM(I)   = ZNOMsav(COUNTsav)
            VXNOM(I)  = VXNOMsav(COUNTsav)
            VYNOM(I)  = VYNOMsav(COUNTsav)
            VZNOM(I)  = VZNOMsav(COUNTsav)
            RHONOM(I) = RHONOMsav(COUNTsav)
            VWXNOM(I) = VWXNOMsav(COUNTsav)
            VWYNOM(I) = VWYNOMsav(COUNTsav)
            RNGNOM(I) = RNGNOMsav(COUNTsav)
            RRTNOM(I) = RRTNOMsav(COUNTsav)
            TIMNOM(I) = TIMNOMsav(COUNTsav)
            AZMNOM(I) = AZMNOMsav(COUNTsav)
            ELVNOM(I) = ELVNOMsav(COUNTsav)
                VWXPN(I)  = VWXPNsav(COUNTsav)
                VWYPN(I)  = VWYPNsav(COUNTsav)
            RGMEAS(I) = RGMEASsav(COUNTsav)
            RRMEAS(I) = RRMEASsav(COUNTsav)
            AZMEAS(I) = AZMEASsav(COUNTsav)
            ELMEAS(I) = ELMEASsav(COUNTsav)
            HMFLAG(I) = HMFLAGsav(COUNTsav)
         END DO C------ Save modified ZZCOM back into FILE

CALL ZZSVRS2( 1, FILE)

RETURN
         END
C****************************************************************

C****************************************************************
C
         SUBROUTINE SAVECORRECTION( FILE , NBPMAX , ICORRECT )
C
C****************************************************************

$ ZZCOM
```

```
      CHARACTER*10 FILE
      INTEGER NBPMAX, ICORRECT, NBPsav, NBREAKPOINTS, I, J
      REAL RHOCORsav(3200), VWXCORsav(3200), VWYCORsav(3200)
      REAL FLNEAR, ALTITUDE
      REAL SMOOTHED(1600), COEFF(3)
      REAL AVERAGED(1600), WEIGHT0(100)
      INTEGER NWEIGHT/50/
      DATA WEIGHT0 / 25*1., 25*0.5, 50*0.25 /
      INTEGER WEIGHT_POWER/0/, IER_LSQ
      REAL RHO_WEIGHTS(1600)

C------ Transfer xxxTAB into xxxC (with xxx = RHO, VWX, VWY) so that the
C------ estimated parameter xxx is in xxxCOR which then can be smoothed IF (ICORRECT.EQ.0) THEN
         DO I = 1 , COUNT
            ALTITUDE = ALTC(I)
            RHOC(I) = RHOC(I) + FLNEAR(20,20,RHOTAB,ALTITUDE)
            VWXC(I) = VWXC(I) + FLNEAR(20,20,VWXTAB,ALTITUDE)
            VWYC(I) = VWYC(I) + FLNEAR(20,20,VWYTAB,ALTITUDE)
         END DO ! I
      END IF C------ Sum-up correction values at the different breakpoints IF (ICORRECT.NE.0) THEN
         DO I = 1 , COUNT
            ALTITUDE = ALTC(I)
            RHOC(I) = RHOC(I) + FLNEAR(NBPMAX,NBP,RHOCOR,ALTITUDE)
            VWXC(I) = VWXC(I) + FLNEAR(NBPMAX,NBP,VWXCOR,ALTITUDE)
            VWYC(I) = VWYC(I) + FLNEAR(NBPMAX,NBP,VWYCOR,ALTITUDE)
         END DO ! I
      END IF C------ Smooth-out RHOC with a quadratic polynomial IF (DBFLAG.EQ.1.) THEN
         PRINT *, ' TAR> Smooth out RHO ? (1:yes, 0:no) : '
         READ(5,*) I
      ELSE
         I = 1
      END IF

IF (I.EQ.1) THEN

I = MIN( COUNT , NMEAS )
         CALL LSQ_POLY2( COEFF, ALTC, RHOC, I)

DO I = 1 , COUNT
            SMOOTHED(I) = COEFF(3) + ALTC(I) * ( COEFF(2)
     +                             + ALTC(I) * COEFF(1) )
         END DO ! I

CALL PLOTSMOOTHED( SMOOTHED, ALTC, RHOC, COUNT)

IF (DBFLAG.EQ.1.) THEN
            PRINT *, ' TAR> Keep smoothed RHO ? (1:yes, 0:no) : '
            READ(5,*) I
         ELSE
            I = 1
         END IF IF (I.EQ.1) THEN
            DO I = 1 , COUNT
               RHOC(I) = SMOOTHED(I)
            END DO ! I
         END IF

END IF

C------ Smooth-out VWX by averaging

IF (DBFLAG.EQ.1.) THEN
         PRINT *, ' TAR> Smooth out VWX ? (1:yes, 0:no) : '
         READ(5,*) I
      ELSE
         I = 1
      END IF

IF (I.EQ.1) THEN
```

```
200        CONTINUE

J = MIN( COUNT , NMEAS )
       CALL MOV_AVERAGE( AVERAGED, VWXC, J, WEIGHT0, NWEIGHT)

DO I = NMEAS+1 , COUNT
           AVERAGED(I) = AVERAGED(NMEAS)
       END DO

! limit max wind variation to MXWDSL (m/sec)/m
       CALL LIMIT_WIND( AVERAGED, ALTC, COUNT, MXWDSL)

CALL PLOTSMOOTHED( AVERAGED, ALTC, VWXC, COUNT)

IF (DBFLAG.EQ.1.) THEN
           PRINT *, ' TAR> Keep smoothed VWX ? (1:yes, 0:no) : '
           READ(5,*) I
       ELSE
           I = 1
       END IF

IF (I.EQ.1) THEN

DO I = 1 , COUNT
               VWXC(I) = AVERAGED(I)
           END DO ! I
       ELSE
           PRINT *, ' TAR> Change weights ? (1:yes, 0:no) : '
                   READ(5,*) I
           IF (I.NE.1) GO TO 290
           PRINT *, ' TAR> Number of weights ? :', NWEIGHT
           READ(5,*) NWEIGHT
           IF (NWEIGHT.LE.0) GO TO 290
           PRINT *, ' TAR> Enter weights :'
           PRINT 250, (WEIGHT0(I),I=1,NWEIGHT)
250             FORMAT(7X, 10(1X,F5.2), 9(/,7X,10(1X,F5.2)) )
           READ(5,*) WEIGHT0
           GO TO 200
       END IF

END IF

290        CONTINUE

C------ Smooth-out VWY by averaging

IF (DBFLAG.EQ.1.) THEN
       PRINT *, ' TAR> Smooth out VWY ? (1:yes, 0:no) : '
       READ(5,*) I
   ELSE
       I = 1
   END IF

IF (I.EQ.1) THEN

300        CONTINUE

J = MIN( COUNT , NMEAS )
       CALL MOV_AVERAGE( AVERAGED, VWYC, J, WEIGHT0, NWEIGHT)

DO I = NMEAS+1 , COUNT
           AVERAGED(I) = AVERAGED(NMEAS)
       END DO

! limit max wind variation to MXWDSL (m/sec)/m
       CALL LIMIT_WIND( AVERAGED, ALTC, COUNT, MXWDSL)

CALL PLOTSMOOTHED( AVERAGED, ALTC, VWYC, COUNT)

IF (DBFLAG.EQ.1.) THEN
           PRINT *, ' TAR> Keep smoothed VWY ? (1:yes, 0:no) : '
           READ(5,*) I
       ELSE
           I = 1
       END IF IF (I.EQ.1) THEN
           DO I = 1 , COUNT
               VWYC(I) = AVERAGED(I)
           END DO ! I
       ELSE
           PRINT *, ' TAR> Change weights ? (1:yes, 0:no) : '
                   READ(5,*) I
```

```
          IF (I.NE.1) GO TO 390
          PRINT *, ' TAR> Number of weights ? :', NWEIGHT
          READ(5,*) NWEIGHT
          IF (NWEIGHT.LE.0) GO TO 390
          PRINT *, ' TAR> Enter weights :'
          PRINT 250, (WEIGHT0(I),I=1,NWEIGHT)
          READ(5,*) WEIGHT0
          GO TO 300
        END IF

END IF

390   CONTINUE

C------ Load values into "sav" arrays

NBPsav = COUNT

DO I = 1 , NBPsav

J = I+NBPMAX     ! index of independent value

RHOCORsav(I)  = RHOC(I)
        RHOCORsav(J)  = ALTC(I)
        VWXCORsav(I)  = VWXC(I)
        VWXCORsav(J)  = ALTC(I)
        VWYCORsav(I)  = VWYC(I)
        VWYCORsav(J)  = ALTC(I)

END DO ! I

C------ Add values into arrays (for extrapolation use) if enough room

I = COUNT + 1

IF (I.LE.NBPMAX) THEN

NBPsav = I
        J = I+NBPMAX

ALTITUDE = 2.*ALTC(COUNT)

RHOCORsav(I)  = RHOCORsav(COUNT)
        RHOCORsav(J)  = ALTITUDE
        VWXCORsav(I)  = VWXCORsav(COUNT)
        VWXCORsav(J)  = ALTITUDE
        VWYCORsav(I)  = VWYCORsav(COUNT)
        VWYCORsav(J)  = ALTITUDE

END IF

C------ Save correction tables into nominal ZZCOM file

CALL ZZSVRS2( 0 , FILE )  ! restore

NBP = NBPsav

DO I = 1 , NBP

J = I+NBPMAX     ! index of independent value

RHOCOR(I)  = RHOCORsav(I)
        RHOCOR(J)  = RHOCORsav(J)
        VWXCOR(I)  = VWXCORsav(I)
        VWXCOR(J)  = VWXCORsav(J)
        VWYCOR(I)  = VWYCORsav(I)
        VWYCOR(J)  = VWYCORsav(J)

END DO ! I

IF (ICORRECT.EQ.0) THEN         ! erase xxxTAB since their values
        DO I = 1 , 20                 ! have been transfered to xxxC
          RHOTAB(I) = 0.0             ! at the beginning
          VWXTAB(I) = 0.0
          VWYTAB(I) = 0.0
        END DO ! I
      END IF CALL ZZSVRS2( 1 , FILE ) ! save RETURN
      END
C*****************************************************************
```

```
C*********************************************************************
C
      SUBROUTINE PROCESSMEAS
C
C This routine processes the radar measurements prior to their use
C to drive the closed loop estimation algorithm.
C The range, range rate, elevation angle and azimuth angle are considered
C as functions of time and approximated by polynomials of order P_ORDER
C in a least-square sense (approximation up to T=NWEIGH*CINT).
C The purpose is twofold:
C - to provide "pseudo-measurements" when HITMSS is zero,
C - to smooth out the noise in the measurements.
C
C*********************************************************************

$ ZZCOM

C IMPLICIT NONE
C REAL RGMEAS(1), RRMEAS(1), ELMEAS(1), AZMEAS(1), TIMNOM(1)
C REAL MEASW(1), HMFLAG(1), DTORAD
C INTEGER NWEIGH, COUNT, DATLEN

INTEGER
     .   P_ORDER              ! polynomial order
     ., P1                    ! polynomial order + 1

PARAMETER (P_ORDER=2, P1=P_ORDER+1)

INTEGER
     .   N_DATA               ! number of data points for approximation
     ., P1b/3/                ! actual polynomial order + 1
     ., NSEGMENT/2/           ! number of time segments considered in NWEIGH*CI
     ., ISEGMENT   ! index
     ., INDEX1, INDEX2        ! indices
     ., I, J                  ! indices
     ., RNGOPTION/1/          ! option index
     ., NEXTRA                !

REAL
     .   P_COEF(P1)           ! polynomial coefficients
     ., TWORK(1600)           ! work array for time
     ., RGWORK(1600)          ! work array for range
     ., RRWORK(1600)          ! work array for range range
     ., ELWORK(1600)          ! work array for elevation
     ., AZWORK(1600)          ! work array for azimuth
     ., WKARRAY1(1600)        ! work array INTEGER
     .   N_AV_WEIGHT/20/      ! number of weights for moving average
     ., NPOINTS               ! total number of points in sequence to smooth o REAL
     .   AV_WEIGHTS(50)       ! weights for moving average
      DATA AV_WEIGHTS/10*1.,10*0.5,30*0./

C---------------------------------------------------------------------
C------ Parameter initialization
C---------------------------------------------------------------------

IF (NWEIGH.LE.1) RETURN
      PRINT *, 'Processing measurements ...'
      NWEIGH = MIN( NMEAS , NAPEX )

C---------------------------------------------------------------------
C------ Loop over the NSEGMENTs of time to fill out the measurement holes
C------ polynomial approximations
C---------------------------------------------------------------------

100  CONTINUE

IF (DBFLAG.EQ.1.) THEN
         PRINT *, 'Number of time segments (min=1) ? default ='
     .,                   NSEGMENT
         READ(5,*) NSEGMENT
         NSEGMENT = MAX( NSEGMENT , 1 )
      END IF

DO ISEGMENT = 1 , NSEGMENT
```

```
          INDEX1 = NWEIGH*(ISEGMENT-1)/NSEGMENT + 1
          INDEX2 = NWEIGH*ISEGMENT/NSEGMENT

C-------- Make sure there are enough data points

200          N_DATA = 0

PRINT *, INDEX1, INDEX2, NWEIGH

DO I = INDEX1 , INDEX2
          IF (HMFLAG(I).EQ.1.) N_DATA = N_DATA + 1
      END DO

IF (N_DATA.LT.P1b) THEN
          PRINT *, 'Not enough data points.', N_DATA
          IF (ISEGMENT.EQ.1) THEN
              INDEX2 = INDEX2 + 1
              IF (INDEX2.GT.NWEIGH) THEN
                  NWEIGH = NWEIGH + 1
                  IF (NWEIGH.GE.COUNT) THEN
                      PRINT *, 'Not enough data points. Run will be'
     ,                         'terminated after this plot session.'
                      CALL PLOTROUTINE
                      STOP 'Radar performance to be increased !'
                  END IF
                  GO TO 100
              END IF
          ELSE
              INDEX1 = INDEX1 - 1
          END IF
          GO TO 200
      END IF C-------- Process range measurements
      PRINT *, '    range'

N_DATA = 0
      DO I = INDEX1 , INDEX2
          IF (HMFLAG(I).EQ.1.) THEN
              N_DATA             = N_DATA + 1
              WKARRAY1(N_DATA)   = RGMEAS(I)
              TWORK(N_DATA)      = TIMNOM(I)
          END IF
      END DO

IF (N_DATA.LT.3) THEN
          PRINT *, 'Error. N_DATA = ', N_DATA
          STOP
      END IF

CALL LSQ_POLY2( P_COEF, TWORK, WKARRAY1, N_DATA)

DO I = INDEX1 , INDEX2+NEXTRA
          IF (HMFLAG(I).NE.1.) THEN
              RGWORK(I) = P_COEF(1)
              DO J = 2 , P1b
                  RGWORK(I) = RGWORK(I) * TIMNOM(I) + P_COEF(J)
              END DO
          ELSE
              RGWORK(I) = RGMEAS(I)
          END IF
      END DO

IF (ISEGMENT.EQ.NSEGMENT) THEN
          DO I = NWEIGH+1 , NAPEX+NEXTRA
              RGWORK(I) = P_COEF(1)
              DO J = 2 , P1b
                  RGWORK(I) = RGWORK(I) * TIMNOM(I) + P_COEF(J)
              END DO
          END DO
      END IF

C-------- Process range rate measurements
      PRINT *, '    range rate'

N_DATA = 0
      DO I = INDEX1 , INDEX2
          IF (HMFLAG(I).EQ.1.) THEN
              N_DATA             = N_DATA + 1
              WKARRAY1(N_DATA)   = RRMEAS(I)
          END IF
```

```
      END DO

IF (N_DATA.LT.3) THEN
          PRINT *, 'Error. N_DATA = ', N_DATA
          STOP
      END IF

CALL LSQ_POLY2( P_COEF, TWORK, WKARRAY1, N_DATA)

DO I = INDEX1 , INDEX2+NEXTRA
          IF (HMFLAG(I).NE.1.) THEN
              RRWORK(I) = P_COEF(1)
              DO J = 2 , P1B
                  RRWORK(I) = RRWORK(I) * TIMNOM(I) + P_COEF(J)
              END DO
          ELSE
              RRWORK(I) = RRMEAS(I)
          END IF
      END DO

IF (ISEGMENT.EQ.NSEGMENT) THEN
          DO I = NWEIGH+1 , NAPEX+NEXTRA
              RRWORK(I) = P_COEF(1)
              DO J = 2 , P1B
                  RRWORK(I) = RRWORK(I) * TIMNOM(I) + P_COEF(J)
              END DO
          END DO
      END IF

C-------- Process elevation angle measurements
      PRINT *, '    elevation'

N_DATA = 0
      DO I = INDEX1 , INDEX2
          IF (HMFLAG(I).EQ.1.) THEN
              N_DATA             = N_DATA + 1
              WKARRAY1(N_DATA) = ELMEAS(I)
          END IF
      END DO

IF (N_DATA.LT.3) THEN
          PRINT *, 'Error. N_DATA = ', N_DATA
          STOP
      END IF

CALL LSQ_POLY2( P_COEF, TWORK, WKARRAY1, N_DATA)

DO I = INDEX1 , INDEX2+NEXTRA
          IF (HMFLAG(I).NE.1.) THEN
              ELWORK(I) = P_COEF(1)
              DO J = 2 , P1B
                  ELWORK(I) = ELWORK(I) * TIMNOM(I) + P_COEF(J)
              END DO
          ELSE
              ELWORK(I) = ELMEAS(I)
          END IF
      END DO

IF (ISEGMENT.EQ.NSEGMENT) THEN
          DO I = NWEIGH+1 , NAPEX+NEXTRA
              ELWORK(I) = P_COEF(1)
              DO J = 2 , P1B
                  ELWORK(I) = ELWORK(I) * TIMNOM(I) + P_COEF(J)
              END DO
          END DO
      END IF

C-------- Process azimuth angle measurements
      PRINT *, '    azimuth'

N_DATA = 0
      DO I = INDEX1 , INDEX2
          IF (HMFLAG(I).EQ.1.) THEN
              N_DATA             = N_DATA + 1
              WKARRAY1(N_DATA) = AZMEAS(I)
          END IF
      END DO

IF (N_DATA.LT.3) THEN
          PRINT *, 'Error. N_DATA = ', N_DATA
          STOP
      END IF
```

```
          CALL LSQ_POLY2( P_COEF, TWORK, WKARRAY1, N_DATA)

DO I = INDEX1 , INDEX2+NEXTRA
             IF (HMFLAG(I).NE.1.) THEN
                AZWORK(I) = P_COEF(1)
                DO J = 2 , P1B
                   AZWORK(I) = AZWORK(I) * TIMNOM(I) + P_COEF(J)
                END DO
             ELSE
                AZWORK(I) = AZMEAS(I)
             END IF
          END DO

IF (ISEGMENT.EQ.NSEGMENT) THEN
             DO I = NWEIGH+1 , NAPEX+NEXTRA
                AZWORK(I) = P_COEF(1)
                DO J = 2 , P1B
                   AZWORK(I) = AZWORK(I) * TIMNOM(I) + P_COEF(J)
                END DO
             END DO
          END IF

END DO ! ISEGMENT

C--------------------------------------------------------------------
C------ Smoothing range data by integrating range rate
C--------------------------------------------------------------------

300     PRINT *, 'Smooth range ? 1=integ rr, 2=average' , RNGOPTION
       READ(5,*) RNGOPTION IF (RNGOPTION.EQ.1) THEN
          RGWORK(1) = RGMEAS(1)
          RRWORK(1) = RRMEAS(1)
          DO I = 2 , NWEIGH+NEXTRA
             IF (HMFLAG(I).NE.1.) RRMEAS(I) = RRWORK(I)
             RGWORK(I) = RGWORK(I-1) + 0.5*CINT*(RRMEAS(I)+RRMEAS(I-1))
          END DO
       ELSE IF (RNGOPTION.EQ.2) THEN
          CONTINUE
       ELSE
          GO TO 300
       END IF C--------------------------------------------------------------------
C------ Smoothing data with moving average technique
C--------------------------------------------------------------------

PRINT 250, (AV_WEIGHTS(I),I=1,N_AV_WEIGHT)
       PRINT *, ' TAR> Change weights ? (1:yes, 0:no) : '
             READ(5,*) I
       IF (I.NE.1) GO TO 290
       PRINT *, ' TAR> Number of weights ? :', N_AV_WEIGHT
       READ(5,*) I
       IF (I.LE.0) GO TO 290
       N_AV_WEIGHT = I
       PRINT *, ' TAR> Enter weights :'
       PRINT 250, (AV_WEIGHTS(I),I=1,N_AV_WEIGHT)
 250     FORMAT(7X, 10(1X,F5.2), 9(7,7X,10(1X,F5.2)) )
       READ(5,*) AV_WEIGHTS
 290     CONTINUE

NPOINTS = NAPEX + NEXTRA

IF (RNGOPTION.EQ.2) THEN
          CALL MOV_AVERAGE( WKARRAY1, RGWORK, NPOINTS
     .,                    AV_WEIGHTS, N_AV_WEIGHT)
          DO I = 1 , NPOINTS
             RGWORK(I) = WKARRAY1(I)
          END DO
       END IF

C      CALL MOV_AVERAGE( WKARRAY1, RRWORK, NPOINTS
C    .,                    AV_WEIGHTS, N_AV_WEIGHT)
C      DO I = 1 , NPOINTS
C         RRWORK(I) = WKARRAY1(I)
C      END DO

CALL MOV_AVERAGE( WKARRAY1, ELWORK, NPOINTS
     .,                    AV_WEIGHTS, N_AV_WEIGHT)
       DO I = 1 , NPOINTS
          ELWORK(I) = WKARRAY1(I)
       END DO
```

```
      CALL MOV_AVERAGE( WKARRAY1, AZWORK, NPOINTS
     .,                          AV_WEIGHTS, N_AV_WEIGHT)
      DO I = 1 , NPOINTS
         AZWORK(I) = WKARRAY1(I)
      END DO

C-----------------------------------------------------------------------
C------ Keep data at T=0
C------ Make range, range rate, elevation vary linearly for the first seco
C------ (CINT=0.1)
C-----------------------------------------------------------------------

RGWORK(1) = RGMEAS(1)
      RRWORK(1) = RRMEAS(1)
      ELWORK(1) = ELMEAS(1)
      AZWORK(1) = AZMEAS(1)

DO I = 2 , 10
         IF (RNGOPTION.EQ.2)
     .      RGWORK(I) = RGWORK(I-1) + 0.5*CINT*(RRWORK(I)+RRWORK(I-1))
C        RRWORK(I) = RRWORK(1) + (RRWORK(11)-RRWORK(1))*0.1*(I-1)
         ELWORK(I) = ELWORK(1) + (ELWORK(11)-ELWORK(1))*0.1*(I-1)
      END DO

C-----------------------------------------------------------------------
C------ Plot processed measurements
C-----------------------------------------------------------------------

DO I = NAPEX+NEXTRA+1 , COUNT-1
         RGWORK(I) = RGMEAS(I)
         RRWORK(I) = RRMEAS(I)
         ELWORK(I) = ELMEAS(I)
         AZWORK(I) = AZMEAS(I)
      END DO

DO I = 1 , COUNT-1
         CALL SAVEDATA( RGWORK(I), DATLEN, I, 101)
         CALL SAVEDATA( RRWORK(I), DATLEN, I, 102)
         CALL SAVEDATA( ELWORK(I)*DTORAD, DATLEN, I, 103)
         CALL SAVEDATA( AZWORK(I)*DTORAD, DATLEN, I, 104)
      END DO

CALL PLOTROUTINE

C-----------------------------------------------------------------------
C------ Re-run approximation or replace measurements by approximation
C-----------------------------------------------------------------------

C------ Ask if user wants to modify the number of segments

IF (DBFLAG.EQ.1.) THEN
         PRINT 500
500      FORMAT(1X, 'Modify number of time segments ? (1:yes, 0:no)')
         READ(5,*) I
         IF (I.EQ.1) GO TO 100
      END IF C------ Replace real measurements by approximation DO I = 2 , NAPEX+NEXTRA
         RGMEAS(I) = RGWORK(I)
         RRMEAS(I) = RRWORK(I)
         ELMEAS(I) = ELWORK(I)
         AZMEAS(I) = AZWORK(I)
      END DO RETURN
      END
C***********************************************************************
```

```
C*********************************************************************
C
      SUBROUTINE LIMIT_WIND( WIND, ALT, NPOINTS, MAX_SLOPE)
C
C This routine limits the variation of the wind to MAX_SLOPE.
C
C For i=2,NPOINTS, the output WIND verifies:
C
C abs[ (WIND(i)-WIND(i-1)) / (ALT(i)-ALT(i-1)) ] =< MAX_SLOPE
C
C*********************************************************************
      IMPLICIT NONE

INTEGER NPOINTS

REAL WIND(NPOINTS), ALT(NPOINTS), MAX_SLOPE

INTEGER I
      REAL DELTA, MAX_DELTA

DO I = 2 , NPOINTS

MAX_DELTA = MAX_SLOPE * ABS( ALT(I)-ALT(I-1) )
         DELTA     = WIND(I) - WIND(I-1)

IF ( ABS(DELTA).GT.MAX_DELTA ) THEN
            WIND(I) = WIND(I-1) + SIGN(MAX_DELTA,DELTA)
         END IF

END DO

RETURN
      END
C*********************************************************************
```

What is claimed is:

1. A trajectory analysis radar system comprising:
a radar antenna disposed proximate a gun barrel to track a projectile fired from the barrel along an actual trajectory of motion;
a radar transmitter coupled to communicate a sequence of radar signal pulses to the antenna after the projectile is fired from the gun barrel and at least until the projectile reaches a zenith in the trajectory of motion;
a radar receiver coupled to receive from the antenna radar signals reflected from the projectile and generate signals indicative of the position and velocity of the projectile;
a signal processor coupled to receive the position and velocity indicative signals from the radar receiver and generate position and velocity data for each of a plurality of different points along the trajectory of motion of the projectile; and
a data processor coupled to receive the position and velocity information from the signal processor and using the received information to update atmospheric tables for use in a subsequent firing.

2. A trajectory analysis radar system according to claim 1 wherein the radar receiver is a Doppler effect type of receiver.

3. A trajectory analysis radar system comprising:
a radar antenna disposed proximate a gun barrel to track a projectile fired from the barrel along an actual trajectory of motion;
a radar transmitter coupled to communicate a sequence of radar signal pulses to the antenna after the projectile is fired from the gun barrel and at least until the projectile reaches a zenith in the trajectory of motion;
a radar receiver coupled to receive from the antenna radar signals reflected from the projectile and generate signals indicative of the position and velocity of the projectile;
a signal processor coupled to receive the position and velocity indicative signals from the radar receiver and generate position and velocity data for each of a plurality of different points along the trajectory of motion of the projectile; and
a data processor coupled to receive the position and velocity information form the signal processor and using the received information to update atmospheric tables for use in a subsequent firing, the data processor assuming a current atmospheric model and repeatedly calculating a derived trajectory using the current analytical model, deriving error values representing differences between the actual trajectory and the derived trajectory, and using the error values to correct the current atmospheric model to cause the current atmospheric model to converge toward an accurate representation of atmospheric conditions down range of the antenna.

4. A trajectory analysis radar system according to claim 1 wherein the entire radar system is mounted on a weapon firing the projectile.

5. A trajectory analysis radar system for analyzing a trajectory of a projectile fired from a gun at a firing position, the system comprising:
a radar system having an antenna mounted on the gun, the radar system tracking at least a portion of the trajectory of the projectile and generating information representing the tracked trajectory portion;
a signal processing system receiving the trajectory representing information generated by the radar system and converting said information to numeric coordinate data representing the trajectory of the projectile; and a data processing system coupled to receive the numeric coordinate data from the signal processing system and generate in response thereto an atmospheric model accurately representing atmospheric conditions through which the trajectory of the projectile passes.

6. A mobile weapon comprising:
a gun firing a projectile through a trajectory;
a radar system mounted on the weapon and generating radar data representing the actual trajectory of the projectile;
a signal processing system mounted on the weapon, the signal processing system receiving the radar data and converting the radar data to coordinate based numeric data representing the trajectory of the projectile; and
a fire control data processor mounted on the weapon and receiving the coordinate based numeric data from the signal processing system, the fire control data processor analyzing the coordinate based numeric data to generate in response thereto an atmospheric model representing atmospheric conditions along the trajectory of the projectile.

7. A mobile weapon comprising:
a gun firing a projectile through a trajectory;
a radar system mounted on the weapon and generating radar data representing the actual trajectory of the projectile;
a signal processing system mounted on the weapon, the signal processing system receiving the radar data and converting the radar data to coordinate based numeric data representing the trajectory of the projectile; and
a fire control data processor mounted on the weapon and receiving the coordinate based numeric data from the signal processing system, the fire control data processor analyzing the coordinate based numeric data to generate in response thereto an atmospheric model representing atmospheric conditions along the trajectory of the projectile, the fire control data processor including means for establishing a current set of atmospheric parameters and then repeatedly generating a derived trajectory, determining error differences between the actual trajectory and the derived trajectory, and using the error differences to update the current set of atmospheric parameters until the current set of atmospheric parameters converges to a model that accurately represents actual atmospheric conditions.

8. A mobile weapon according to claim 7 wherein the establishing means uses a down range component of projectile position and velocity error to generate a correction value for a down range component of wind velocity, uses a cross range component of projectile position and velocity error to generate a correction value for a cross range component of wind velocity and uses an elevation component of position and velocity error to generate a correction value for air density.

9. A mobile weapon according to claim 8 wherein said atmospheric model represents components of down range and cross range wind and air density at a plurality of different elevation levels separated by no more than 1000 foot elevation intervals.

10. A method of deriving a true atmospheric model using an actual projectile trajectory comprising the steps of:
establishing a current atmospheric model;
deriving a trajectory of the projectile based upon the current atmospheric model;
determining error differences between the actual projectile trajectory and the derived trajectory; and
correcting the current atmospheric model in response to the determined error differences so as to tend to reduce the error differences between a derived trajectory based upon the current atmospheric model and the actual projectile trajectory.

11. A method of deriving a true atmospheric model according to claim 10 further comprising the step of repeating the steps of deriving, determining and correcting until the current atmospheric model represents actual atmospheric conditions with a desired accuracy.

12. A method of deriving a true atmospheric model according to claim 11 wherein the steps of deriving, determining and correcting are repeated exactly once.

13. A method of deriving a true atmospheric model according to claim 10 wherein the atmospheric model represents down range and cross range wind velocity and air density at elevation intervals no greater than 1000 feet.

14. A method of firing a gun of a weapon system comprising the steps of:
firing an initial round of a projectile;
tracking the initial round with a radar system mounted on the weapon system to determine an actual trajectory of the initial round;
determining in response to the actual trajectory an atmospheric model representing atmospheric conditions in the vicinity of the weapon system;
aiming a gun of the weapon system in response to the determined atmospheric model; and
firing at least one round from the gun that is aimed in response to the determined atmospheric model.

15. A method of firing according to claim 14 wherein the determining step further includes the steps
establishing a current atmospheric model;
calculating a projectile trajectory using the atmospheric model;
determining error differences between the actual trajectory and the calculated trajectory; and
correcting the current atmospheric model in response to the error differences to tend to cause the current atmospheric model to more accurately represent actual atmospheric conditions encountered by the initial round of a projectile.

16. A mobile weapon comprising:
a gun firing a projectile through a trajectory;
a radar system mounted on the weapon and generating radar data representing the actual trajectory of the projectile;
a signal processing system mounted on the weapon, the signal processing system receiving the radar data and converting the radar data to coordinate based numeric data representing the trajectory of the projectile; and
a fire control data processor mounted on the weapon and receiving the coordinate based numeric data from the signal processing system, the fire control data processor analyzing the coordinate based numeric data to generate in response thereto an atmospheric model representing atmospheric conditions along the trajectory of the projectile, the fire control data processor establishing a current set of atmospheric parameters and then repeatedly generating a derived trajectory in response to the current set of atmospheric parameters, determining error differences between the actual trajectory and the derived trajectory, and using the error differences to update the current set of atmospheric parameters until the current set of atmospheric parameters converges to a model that accurately represents actual atmospheric conditions.

* * * * *

UNITED STATES PATENT AND TRADEMARK OFFICE
CERTIFICATE OF CORRECTION

PATENT NO. : 5,140,329

DATED : August 18, 1992

INVENTOR(S) : Jeffrey D. Maughan, et al.

It is certified that error appears in the above-identified patent and that said Letters Patent is hereby corrected as shown below:

In column 2, line 46, change "an atmospheric model : that" to read --an atmospheric model that--.

In column 5, line 12, change "1.70 degrees. It will" to read --1.70 degrees and an azimuth beam width of approximately 1.70 degrees. It will--.

In column 9, equation (1), change "$P_x = R \cdot \cos(El) \cdot \cos(Az)$" to read --$P_x = R \cdot \cos(E\ell) \cdot \cos(Az)$--.

In column 9, equation (2), change "$P_y = R \cdot \cos(El) \cdot \sin(Az)$" to read --$P_y = R \cdot \cos(E\ell) \cdot \sin(Az)$--.

In column 9, equation (3), change "$P_z = R \cdot \sin(El)$" to read --$P_z = R \cdot \sin(E\ell)$--.

In column 9, equation (4), change

"$V_x = R \cdot \cos(El) \cdot \cos(Az)$
$- R \cdot El \cdot \sin(El) \cdot \cos(Az)$
$- R \cdot Az \cdot \cos(El) \cdot \sin(Az)$" to read --$V_x = \dot{R} \cdot \cos(E\ell) \cdot \cos(Az)$
$- R \cdot \dot{E\ell} \cdot \sin(E\ell) \cdot \cos(Az)$
$- R \cdot \dot{Az} \cdot \cos(E\ell) \cdot \sin(Az)$--.

UNITED STATES PATENT AND TRADEMARK OFFICE
CERTIFICATE OF CORRECTION

PATENT NO. : 5,140,329

DATED : August 18, 1992

INVENTOR(S) : Jeffrey D. Maughan, et al.

It is certified that error appears in the above-identified patent and that said Letters Patent is hereby corrected as shown below:

In column 9, equation (5), change

"$V_y = R \cdot \cos(El) \cdot \sin(Az)$
$\quad\quad - R \cdot El \cdot \sin(El) \cdot \sin(Az)$
$\quad\quad + R \cdot Az \cdot \cos(El) \cdot \cos(Az)$" to read --$V_y = \dot{R} \cdot \cos(E\ell) \cdot \sin(Az)$
$\quad\quad - R \cdot \dot{E\ell} \cdot \sin(E\ell) \cdot \sin(Az)$
$\quad\quad + R \cdot \dot{Az} \cdot \cos(E\ell) \cdot \cos(Az)$--.

In column 9, equation (6), change

"$V_z = R \cdot \sin(El) + R \cdot El \cdot \cos(El)$" to read

--$V_z = \dot{R} \cdot \sin(E\ell) + R \cdot \dot{E\ell} \cdot \cos(E\ell)$--.

In column 9, <u>second</u> equation (6) is a <u>duplicate</u>, please remove in its entirety.

In column 9, line 36, change "where R denotes range, R denotes range rate, El eleva-" to read --where R denotes range, $\dot{R}$ denotes range rate, $E\ell$ eleva--.

In column 9, line 37, change "angle, El elevation" to read --angle, $\dot{E\ell}$ elevation--.

UNITED STATES PATENT AND TRADEMARK OFFICE
CERTIFICATE OF CORRECTION

PATENT NO. : 5,140,329
DATED : August 18, 1992
INVENTOR(S) : Jeffrey D. Maughan, et al.

It is certified that error appears in the above-identified patent and that said Letters Patent is hereby corrected as shown below:

Col. 9, lines 38-39, change "angular rates, El and Az, are" to read

--angular rates, $\dot{E}\ell$ and $\dot{A}z$, are--.

In column 12, equation (9), change "$\Delta VWY = \Delta YF + \Delta VWY$" to read --$\Delta VWY = \Delta YF + \Delta VYF$--.

In column 12, equation (13),
  change "$\Delta YF = (0.05/(1 + 0.1y\ s)\Delta y$"
to read --$\Delta YF = (0.05/(1 + 0.1y\ s))\Delta y$--.

In column 120, line 39, change "includes the steps" to read --includes the steps of:--

Signed and Sealed this

Fourteenth Day of September, 1993

BRUCE LEHMAN

*Attest:*

*Attesting Officer*         *Commissioner of Patents and Trademarks*